United States Patent
Lee et al.

(10) Patent No.: US 10,618,622 B2
(45) Date of Patent: Apr. 14, 2020

(54) POLLUTANT REDUCTION DEVICE AND METHOD

(71) Applicant: SAMSUNG HEAVY INDUSTRIES CO., LTD., Seoul (KR)

(72) Inventors: Seung Jae Lee, Gyeongsangnam-do (KR); Hee Jun Park, Gyeongsangnam-do (KR); Gun IL Park, Gyeongsangnam-do (KR); Jae Woong Choi, Gyeongsangnam-do (KR)

(73) Assignee: SAMSUNG HEAVY INDUSTRIES CO., LTD., Seoul (KR)

( * ) Notice: Subject to any disclaimer, the term of this patent is extended or adjusted under 35 U.S.C. 154(b) by 324 days.

(21) Appl. No.: 15/555,443

(22) PCT Filed: Mar. 4, 2016

(86) PCT No.: PCT/KR2016/002217
§ 371 (c)(1),
(2) Date: Sep. 1, 2017

(87) PCT Pub. No.: WO2016/140554
PCT Pub. Date: Sep. 9, 2016

(65) Prior Publication Data
US 2018/0037308 A1    Feb. 8, 2018

(30) Foreign Application Priority Data

Mar. 4, 2015   (KR) .................. 10-2015-0030232
Jul. 29, 2015  (KR) .................. 10-2015-0107367
(Continued)

(51) Int. Cl.
*B63H 21/32*   (2006.01)
*C02F 1/66*    (2006.01)
(Continued)

(52) U.S. Cl.
CPC .............. *B63H 21/32* (2013.01); *B01D 53/60* (2013.01); *B63J 4/00* (2013.01); *C02F 1/008* (2013.01);
(Continued)

(58) Field of Classification Search
CPC ........ B01D 2251/102; B01D 2251/108; B01D 2252/1035; B01D 2258/012;
(Continued)

(56) References Cited

U.S. PATENT DOCUMENTS

2004/0216609 A1* 11/2004 Baksh ............... B01D 53/0462
                                                            95/8
2009/0151563 A1*  6/2009 Young ................ B01D 53/18
                                                          95/151

FOREIGN PATENT DOCUMENTS

CN    201815246 U    5/2011
JP    61-501011 A    5/1986
(Continued)

OTHER PUBLICATIONS

Japanese Patent Office, Office Action, dated Jun. 18, 2018, for Japanese Patent Application No. 2017-545645 which was filed on Aug. 29, 2017, 10 pages.
(Continued)

*Primary Examiner* — Cabrena Holecek
(74) *Attorney, Agent, or Firm* — SoCal IP Law Group LLP; Mark Andrew Goldstein

(57) ABSTRACT

A pollutant reduction device and method are provided. The pollutant reduction device comprises: an exhaust gas pipe for discharging exhaust gas of a combustion engine; a cleaning water supply pipe for supplying cleaning water; a scrubber for spraying the cleaning water, which is supplied through the cleaning water supply pipe, at the exhaust gas flowing in through the exhaust gas pipe; and a cleaning
(Continued)

water discharge pipe for discharging the cleaning water inside the scrubber and supplying the same to a ballast water tank.

14 Claims, 37 Drawing Sheets

(30) Foreign Application Priority Data

| | | | |
|---|---|---|---|
| Aug. 31, 2015 | (KR) | ......................... | 10-2015-0123160 |
| Sep. 10, 2015 | (KR) | ......................... | 10-2015-0128595 |
| Sep. 10, 2015 | (KR) | ......................... | 10-2015-0128602 |
| Sep. 11, 2015 | (KR) | ......................... | 10-2015-0129290 |

(51) Int. Cl.

| | |
|---|---|
| *F01N 3/04* | (2006.01) |
| *B63J 4/00* | (2006.01) |
| *B01D 53/60* | (2006.01) |
| *C02F 1/00* | (2006.01) |
| *F01N 3/08* | (2006.01) |
| C02F 1/467 | (2006.01) |
| C02F 1/68 | (2006.01) |
| C02F 103/00 | (2006.01) |
| C02F 1/78 | (2006.01) |
| C02F 1/72 | (2006.01) |
| C02F 103/18 | (2006.01) |
| C02F 1/32 | (2006.01) |
| C02F 1/70 | (2006.01) |
| C02F 1/76 | (2006.01) |
| C02F 1/38 | (2006.01) |

(52) U.S. Cl.
CPC .................. *C02F 1/66* (2013.01); *F01N 3/04* (2013.01); *F01N 3/08* (2013.01); *F01N 3/085* (2013.01); *F01N 3/0842* (2013.01); *B01D 2251/102* (2013.01); *B01D 2251/108* (2013.01); *B01D 2252/1035* (2013.01); *B01D 2258/012* (2013.01); *B01D 2259/4566* (2013.01); *B01D 2259/818* (2013.01); *B63J 4/002* (2013.01); *C02F 1/001* (2013.01); *C02F 1/32* (2013.01); *C02F 1/38* (2013.01); *C02F 1/4674* (2013.01); *C02F 1/686* (2013.01); *C02F 1/70* (2013.01); *C02F 1/722* (2013.01); *C02F 1/76* (2013.01); *C02F 1/78* (2013.01); *C02F 2001/007* (2013.01); *C02F 2103/008* (2013.01); *C02F 2103/18* (2013.01); *C02F 2201/001* (2013.01); *C02F 2201/005* (2013.01); *C02F 2201/46115* (2013.01); *C02F 2201/782* (2013.01); *C02F 2209/003* (2013.01); *C02F 2209/005* (2013.01); *C02F 2209/06* (2013.01); *C02F 2209/40* (2013.01); *C02F 2301/043* (2013.01); *C02F 2301/046* (2013.01); *C02F 2303/04* (2013.01); *C02F 2303/18* (2013.01); *C02F 2307/14* (2013.01); *F01N 3/0814* (2013.01)

(58) Field of Classification Search
CPC ...... B01D 2259/4566; B01D 2259/818; B01D 53/60; B63H 21/32; B63J 4/00; B63J 4/002; C02F 1/001; C02F 1/008; C02F 1/32; C02F 1/38; C02F 1/4674; C02F 1/66; C02F 1/686; C02F 1/70; C02F 1/722; C02F 1/76; C02F 1/78; C02F 2001/007; C02F 2103/008; C02F 2103/18; C02F 2201/001; C02F 2201/005; C02F 2201/46115; C02F 2201/782; C02F 2209/003; C02F 2209/005; C02F 2209/06; C02F 2209/40; C02F 2301/043; C02F 2301/046; C02F 2303/04; C02F 2303/18; C02F 2307/14; F01N 3/04; F01N 3/08; F01N 3/0814; F01N 3/0842; F01N 3/085
See application file for complete search history.

(56) References Cited

FOREIGN PATENT DOCUMENTS

| | | |
|---|---|---|
| JP | 2003104292 A | 4/2003 |
| JP | 2004089770 | 3/2004 |
| JP | 2009112996 A | 5/2009 |
| JP | 2013511384 | 4/2013 |
| JP | 2014159008 | 9/2014 |
| KR | 0167793 B1 | 1/1999 |
| KR | 20090109614 A1 | 10/2009 |
| KR | 20130052261 A | 5/2013 |
| KR | 20140087782 A | 7/2014 |
| KR | 101494812 B1 | 2/2015 |
| KR | 101551806 B1 | 9/2015 |
| WO | 2014/045578 A1 | 3/2014 |
| WO | 2014/048723 A1 | 4/2014 |
| WO | 2014/119513 A1 | 8/2014 |
| WO | 2014118819 A1 | 8/2014 |
| WO | 2016140554 A1 | 9/2016 |

OTHER PUBLICATIONS

European Patent Office, European Search Report for Application No. 16759190.8, dated Oct. 24, 2018, 9 total pages.
Japanese Patent Office, 2nd Office Action for Japanese Patent Application No. 2017-545645 dated Jan. 4, 2019, 4 total pages.
World Intellectual Property Organization, International Search Report for international application No. PCT/KR2016/002217, dated Jun. 24, 2016, 2 total pages.
Korean Intellectual Property Office, Office action for Korean application No. 10-2015-0128602, dated Nov. 29, 2016, 4 total pages.

* cited by examiner

POLLUTANT REDUCTION DEVICE AND METHOD

RELATED APPLICATION INFORMATION

This patent claims priority from International PCT Patent Application No. PCT/KR2016/002217, filed Mar. 4, 2016 entitled, "POLLUTANT REDUCTION DEVICE AND METHOD", which claims priority to Korean Patent Application No. 10-2015-0030232, filed Mar. 4, 2015, and Korean Patent Application No. 10-2015-0107367, filed Jul. 29, 2015, and Korean Patent Application No. 10-2015-0123160, filed on Aug. 31, 2015, and Korean Patent Application No. 10-2015-0128595, filed on Sep. 10, 2015, and Korean Patent Application No. 10-2015-0128602, filed Sep. 10, 2015, and Korean Patent Application No. 10-2015-0129290, filed Sep. 11, 2015, all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The present inventive concept relates to a pollutant reduction device and method, and more particularly, to a pollutant reduction device and method employed to discharge exhaust gas and seawater after removing pollutants contained in the exhaust gas of a combustion engine and killing microorganisms present in the seawater.

Description of the Related Art

Generally, various engines installed in a ship generate power by burning fossil fuels. Here, exhaust gas generated in the fuel combustion process contains harmful substances such as sulfur oxides (SOx), nitrogen oxides (NOx), and dust (PM). Thus, if the exhaust gas is discharged as it is, it can cause air pollution.

In addition, a ship stores ballast water in a ballast water tank provided its hull to maintain balance and draft. The ballast water is loaded to the ship in the sea at the departure point and discharged in the sea at the destination. Therefore, if the ballast water is discharged without treatment, it can cause water pollution and change of the marine ecosystem.

For these reasons, environmental regulations on air pollution and water pollution caused by ships are being strengthened, and various treatment devices are being applied to ships in order to meet various regulations. Of the environmental regulations on air pollution, the regulation that requires the sulfur oxide content of exhaust gas emitted from an engine to be 0.1% or less while a ship is travelling or docking in an emission control area (ECA) is in effect. A wet scrubber is generally used to remove sulfur oxides. The wet scrubber removes sulfur oxides by bringing exhaust gas into contact fresh water or an alkaline solution. In addition, of the environmental regulations on water pollution, the regulation that requires microorganisms of a certain size or more in ballast water of a ship to be killed is in effect. To kill microorganisms, treatment methods such as electrolysis, ozone and ultraviolet rays are being used.

DISCLOSURE

Technical Problem

Aspects of the inventive concept provide a pollutant reduction device capable of discharging exhaust gas and seawater after removing pollutants contained in the exhaust gas of a combustion engine and killing microorganisms present in the seawater.

Aspects of the inventive concept also provide a pollutant reduction method employed to discharge exhaust gas and seawater after removing pollutants contained in the exhaust gas of a combustion engine and killing microorganisms present in the seawater.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

Technical Solution

According to an aspect of the inventive concept, there is provided a pollutant reduction device including: an exhaust gas pipe which discharges exhaust gas of a combustion engine; a cleaning water supply pipe which supplies cleaning water; a scrubber which sprays the cleaning water supplied through the cleaning water supply pipe to the exhaust gas introduced through the exhaust gas pipe; and a cleaning water discharge pipe which discharges the cleaning water inside the scrubber and supplies the cleaning water to a ballast water tank.

A pH value of the cleaning water flowing in the cleaning water discharge pipe is lower than that of the cleaning water flowing in the cleaning water supply pipe.

The pollutant reduction device further includes a purification unit which is connected to the exhaust gas pipe or the scrubber to oxidize nitrogen-based oxides, neutralize acidified cleaning water, or kill microorganisms present in cleaning water.

The pollutant reduction device further includes a seawater supply pipe which receives seawater from the outside and supplies ballast water to the ballast water tank, wherein the cleaning water supply pipe branches from the seawater supply pipe.

The pollutant reduction device further includes: a control vale which controls the amount of seawater introduced to the scrubber through the cleaning water supply pipe; and a control unit which controls the control valve according to the concentration or the degree of contamination of the exhaust gas or the pH value of the cleaning water that passes through the scrubber.

The concentration or the degree of contamination of the exhaust gas is determined based on the amount of at least one of sulfur oxides and nitrogen oxides in the exhaust gas.

The control valve includes a three-way valve which connects the seawater supply pipe and the cleaning water supply pipe and adjusts the amount or proportion of seawater supplied to the cleaning water supply pipe.

The pollutant reduction device further includes a circulation pipe which connects the cleaning water discharge pipe and the cleaning water supply pipe, wherein the cleaning water discharged through the cleaning water discharge pipe is recirculated to the cleaning water supply pipe through the circulation pipe.

The pollutant reduction device further includes: a recirculation tank which is disposed between the cleaning water discharge pipe and the circulation pipe; a filter unit which is connected to the recirculation tank and separates sold-phase particles from the discharged cleaning water; and a sludge tank which is connected to the filter unit and in which the solid-phase particles filtered out by the filter unit are collected.

The purification unit is connected to the exhaust gas pipe, the seawater supply pipe or the scrubber to supply an oxidizing agent for oxidizing nitrogen-based oxides, a neutralizing agent for neutralizing acidified cleaning water, or a sterilizing agent for killing microorganisms present in seawater by electrolyzing seawater.

The oxidizing agent is sodium hypochlorite or hypochlorous acid produced by the electrolysis of the seawater, the sterilizing agent is sodium hypochlorite or hypochlorous acid produced by the electrolysis of the seawater or nitric acid and sulfuric acid produced by the reaction of the sodium hypochlorite or the hypochlorous acid with the exhaust gas and the seawater, and the neutralizing agent is sodium hypochlorite produced by the electrolysis of the seawater or a diluted solution of the sodium hypochlorite.

The pollutant reduction device further includes a plasma purification unit which is connected to the exhaust gas pipe, performs pulse corona discharge to oxide the exhaust gas, and generates ozone to sterilize the cleaning water.

The plasma purification unit includes a reaction module including a first electrode which is shaped like a container or a pair of plates disposed parallel to each other and second electrodes which are shaped like wires, arranged at intervals inside the first electrode or between the plates of the first electrode, and extend in a direction perpendicular to a direction of flow of the exhaust gas.

The pollutant reduction device further includes a neutralizing agent supply unit which supplies a neutralizing agent to the scrubber or a rear part of a mixing pipe.

According to another aspect of the inventive concept, there is provided a pollutant reduction method including: (a) receiving exhaust gas from a combustion engine and seawater from the outside; (b) oxidizing nitrogen-based oxides in the exhaust gas by spraying an oxidizing agent to the exhaust gas and then supplying the exhaust gas to a scrubber; and (c) separating pollutants from the exhaust gas and, at the same time, killing microorganisms present in the seawater by spraying the seawater to the scrubber, wherein the exhaust gas and the seawater are selectively purified by varying the amount of the exhaust gas introduced from the combustion engine and the amount of the seawater introduced from the outside.

Advantageous Effects

A pollutant reduction device according to embodiments of the inventive concept can supply cleaning water that passes through a wet scrubber system to a ballast water tank. Since the wet scrubber system and a ballast water treatment system are combined into one system, the installation and maintenance cost of the system can reduced, and space utilization in a ship can be increased.

DETAILED DESCRIPTION

Mode for Invention

Figure 1:
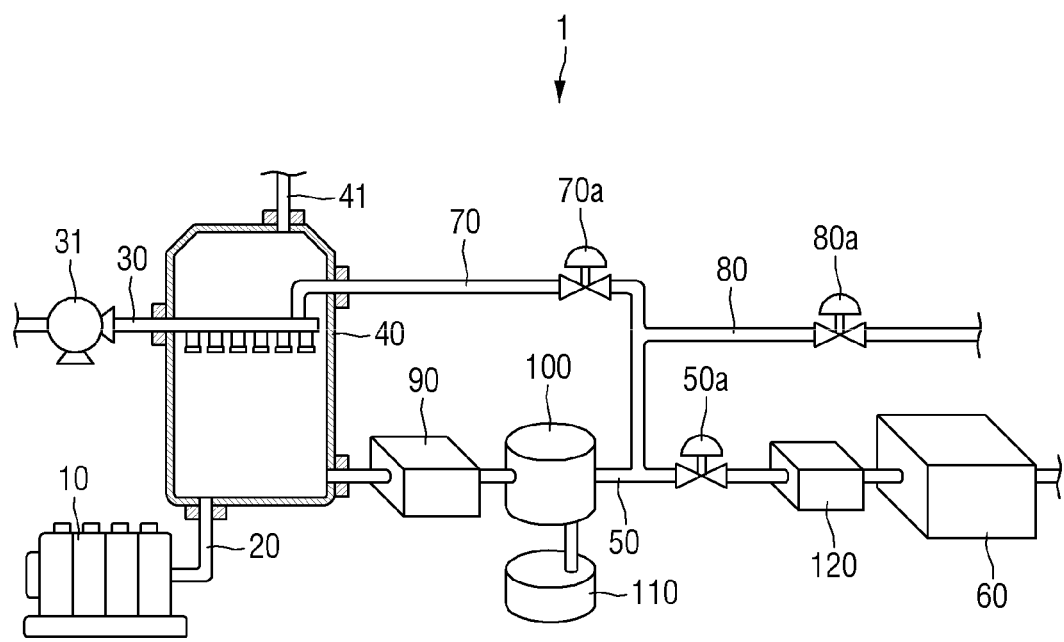
FIG. 1 is a schematic view of a pollutant reduction device according to a first embodiment of the inventive concept.

Advantages and features of the present inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

Hereinafter, pollutant reduction device according to a first embodiment of inventive concept will be described in detail with reference to FIGS. 1 through 3.

FIG. 1 is a schematic view of a pollutant reduction device according to a first embodiment of the lave concept.

The pollutant reduction device 1 according to the first embodiment of the invention concept is a device capable of simultaneously removing sulfur oxides contained in exhaust gas G1 (see FIG. 2) and treating microorganisms present in ballast water. The pollutant reduction device 1 may neutralize cleaning water W (see FIG. 2) acidified by a wet scrubber system to a pH value satisfying the treated water standard of the International Maritime Organization (IMO) and then supply the neutralized cleaning water W to a ballast water tank 60 to use the neutralized cleaning water W as ballast water. That is, a wet scrubber system and a ballast water treatment system are combined into one system. This not only reduces the installation and maintenance cost of the system but also increases space utilization in a ship. In addition, since the pollutant reduction device 1 can be implemented by adding only pipes to the ballast water treatment system, it can be easily applied to existing ships.

The pollutant reduction device 1 according to the inventive concept includes a combustion engine 10, an exhaust gas pipe 20, a cleaning water supply pipe 30, a scrubber 40, and a cleaning water discharge pipe 50.

The combustion engine 10 generates various power required for a ship by burning fuel. The combustion engine 10 may be formed of, for example, a main engine, a generator engine, etc. Since the combustion engine 10 normally generates power by burning fossil fuel, it generates the exhaust gas G1 due to the combustion of the fossil fuel. The generated exhaust gas G1 contains a large amount of sulfur oxides, nitrogen oxides and dust and is discharged to the outside through the exhaust gas pipe 20 connected to a side of the combustion engine 10.

The exhaust gas pipe 20 may be connected to exhaust pipes of a plurality of combustion engines, and the combustion engines may selectively operate as needed. The exhaust gas pipe 20 is a pipe for discharging the exhaust gas G1 of the combustion engine 10. An end of the exhaust gas pipe 20 is connected to the combustion engine 10, and the other end is connected to a side of the scrubber 40 to be described later. Since the hot exhaust gas G1 flows in the exhaust gas pipe 20, the exhaust gas pipe 20 may be formed of a material having excellent heat resistance.

The cleaning water supply pipe 30 is a pipe for supplying the scrubber 40 with cleaning water W1 (see FIG. 2) which is at least one of seawater, freshwater, and a mixture of seawater and freshwater. An end of the cleaning water supply pipe 30 may be connected to a seawater inlet (not illustrated) or a freshwater tank (not illustrated), and the other end of the cleaning water supply pipe 30 may be connected to the scrubber 40. Based on the assumption that the cleaning water W1 is limited to seawater, a structure in which one end of the cleaning water supply pipe 30 is connected to the seawater inlet and the other end of the cleaning water supply pipe 30 is connected to the scrubber 40 will hereinafter be described more specifically. At least one pump 31 may be installed on the cleaning water supply pipe 30 to smoothly supply the cleaning water W1 to the scrubber 40.

The scrubber 40 sprays the cleaning water W1 supplied through the cleaning water supply pipe 30 to the exhaust gas G1 introduced through the exhaust gas pipe 20, so that the exhaust gas G1 and the cleaning water W1 can contact each other. The scrubber 40 may be a wet scrubber. Here, an end of the cleaning water supply pipe 30 which is disposed inside the scrubber 40 may be located in an upper part of the scrubber 40 and may branch into a plurality of parts to spray the cleaning water W1 in the form of fine particles. That is, the cleaning water supply pipe 30 disposed in the upper part of the scrubber 40 sprays the cleaning water W1 toward a lower part of the scrubber 40 where the exhaust gas pipe 20 is located, thereby effectively bringing the exhaust gas G1 and the cleaning water W1 into contact with each other. As the exhaust gas G1 and the cleaning water W1 come into contact with each other within the scrubber 40, the sulfur oxides, the nitrogen oxides and the dust contained in the exhaust gas G1 may be removed. The exhaust gas G2 (see FIG. 2) from which the sulfur oxides, the nitrogen oxides and the dust have been removed may be discharged to the outside through a discharge pipe 41. Since the exhaust gas G2 discharged through the discharge pipe 41 is without the sulfur oxides, the nitrogen oxides and the dust, it does not cause air pollution even if it is discharged into the atmosphere as it is.

The end of the cleaning water supply pipe 30 which is located inside the scrubber 40 does not necessarily branch into a plurality of parts. For example, the end of the cleaning water supply pipe 30 may be formed as an unbranched end and may spray the cleaning water W1 in the form of fine particles.

The cleaning water W2, which has absorbed the sulfur oxides, the nitrogen oxides and dust through the contact with the exhaust gas G1 containing the sulfur oxides, the nitrogen oxides and the dust, is discharged through the cleaning water discharge pipe 50.

The cleaning water discharge pipe 50 is a pipe for discharging the cleaning water W2 inside the scrubber 40 and supplying the cleaning water W2 to the ballast water tank 60. An end of the cleaning water discharge pipe 50 is connected to the scrubber 40, and the other end of the cleaning water discharge pipe 50 is connected to a side of the ballast water tank 60. Here, a neutralization unit 90 and a purification unit 100 may be installed on the cleaning water discharge pipe 50.

The neutralization unit 90 is installed behind the scrubber 40 and neutralizes the cleaning water W2, which flows through the cleaning water discharge pipe 50 after being discharged from the scrubber 40, to a pH value satisfying the IMO treated water standard. Since the cleaning water W2 discharged from the scrubber 40 through the cleaning water discharge pipe 50 has absorbed the sulfur oxides, the nitrogen oxides and the dust contained in the exhaust gas G1, a hydrogen ion exponent, i.e., a pH value of the cleaning water W2 flowing in the cleaning water supply pipe 30 is lower than that of the cleaning water W1 flowing in the cleaning water supply pipe 30. In other words, since the cleaning water W2 flowing in the cleaning water discharge pipe 50 has been acidified by the sulfur oxides and the nitrogen oxides, the pH value of the cleaning water W2 is lower than that of the cleaning water W1 flowing in the cleaning water supply pipe 30. Therefore, if the cleaning water W2 having a low pH value is discharged to the sea as it is, it can cause problems such as water pollution and marine ecosystem change. However, since the neutralization unit 90 neutralizes the cleaning water W2 to a pH value satisfying the IMO treated water standard, the neutralized cleaning water W2 can be supplied to the ballast water tank 60 as ballast water. In addition, even if the cleaning water W2 is discharged to the sea through an outlet pipe 80 which will be described later, the problems such as water pollution and marine ecosystem change do not occur. However, the neutralization unit 90 is not necessarily installed on the cleaning water discharge pipe 50. For example, the neutralization unit 90 can be installed inside the scrubber 40. The cleaning water W2 neutralized by the neutralization unit 90 is supplied to the purification unit 100.

The purification unit 100 is installed behind the scrubber 40, in particular, behind the neutralization unit 90 and separates sludge S (see FIG. 2) from the cleaning water W2 discharged from the scrubber 40. The sludge S may be separated using at least one of a centrifuge, a gravity separator, and a filter. Since the purification unit 100 is formed on the cleaning water discharge pipe 50, the cleaning water W2 without the sludge S can be supplied to the ballast water tank 60. A sludge storage tank 110 is connected to a side of the purification unit 100. Therefore, the sludge S separated from the cleaning water W2 can be stored in the sludge storage tank 110. The cleaning water W2 having the sludge S removed by the purification unit 100 is supplied to the ballast water tank 60.

The ballast water tank 60 stores the cleaning water W2 discharged through the cleaning water discharge pipe 50 to maintain the balance of the ship. At least one ballast water tank 60 may be installed in the ship. As described above, since the cleaning water W2 flowing in the cleaning water discharge pipe 50 has been acidified by the sulfur oxides and the nitrogen oxides, the pH value of the cleaning water W2 is lower than that of the cleaning water W1 flowing in the cleaning water supply pipe 30. Therefore, a survival rate of microorganisms present in the cleaning water W2 flowing in the cleaning water discharge pipe 50 is lower than that of microorganisms present in the cleaning water W1 flowing in the cleaning water supply pipe 30.

That is, since the survival rate of microorganisms is low in the acidified cleaning water W2 flowing in the cleaning water discharge pipe 50, the cleaning water W2 satisfies ballast water regulatory conditions that require microorganisms to be killed. Therefore, the cleaning water W2 is suitable for use as ballast water. If the cleaning water W2 having a low survival rate of microorganisms and converted to a pH value satisfying the IMO treated water standard is supplied to the ballast water tank 60 and used as ballast water, the ballast water treatment system for killing microorganisms can be omitted. This not only reduces the installation and maintenance cost of the system but also increases space utilization in the ship. In addition, since the pollutant reduction device 1 can be implemented by adding only pipes to the ballast water treatment system, it can be easily applied to existing ships.

At least one first valve 50a may be installed on the cleaning water discharge pipe 50 to control the flow of the cleaning water W2. The first valve 50a may be installed in front of the ballast water tank 60, and the cleaning water W2 passing through the first valve 50a may be supplied to a sterilization unit 120.

The sterilization unit 120 is installed on at least one of front and rear sides of the ballast water tank 60 to additionally kill microorganisms present in the cleaning water W2 flowing into the ballast water tank 60 or in the cleaning water W2 flowing out of the ballast water tank 60. In other words, the sterilization unit 120 additionally kills microorganisms remaining in the cleaning water W2. The sterilization unit 120 may be, for example, a strong acidification device, an electrolytic device, an ozone generation device, an ultraviolet device, a plasma device, or the like. The sterilization unit 120 may selectively operate to additionally kill microorganisms when the ballast water regulatory conditions are strict. The cleaning water W2 passing through the sterilization unit 120 is supplied to the ballast water tank 60 and used as ballast water. The cleaning water W2 discharged from the ballast water tank 60 may be discharged to the sea or supplied to various destinations such as a heat exchanger and used as cooling water.

A circulation pipe 70 may be disposed on a side of the cleaning water discharge pipe 50. The circulation pipe 70 branches from the cleaning water discharge pipe 50 and circulates the cleaning water W2 discharged from the scrubber 40 back to the scrubber 40. The circulation pipe 70 may branch from the cleaning water discharge pipe 50 located behind the purification unit 100. Since the circulation pipe 70 branches from the cleaning water discharge pipe 50 located behind the purification unit 100, the cleaning water W2 without the sludge S can be circulated to the scrubber 40. In the drawing, an end of the circulation pipe 70 which is located inside the scrubber 40 is connected to the cleaning water supply pipe 30. However, the inventive concept is not limited to this case. For example, the circulation pipe 70 and the cleaning water supply pipe 30 may be separated from each other and may independently spray the cleaning water W2 and the cleaning water W1, respectively. At least one second valve 70a may be installed on the circulation pipe 70 to control the flow of the cleaning water W2.

In addition, the outlet pipe 80 may be disposed on a side of the cleaning water discharge pipe 50. The outlet pipe 80 branches from the cleaning water discharge pipe 50 and discharges the cleaning water W2 discharged from the scrubber 40 to the sea. Like the circulation pipe 70, the outlet pipe 80 may branch from the cleaning water discharge pipe 50 located behind the purification unit 100. Since the outlet pipe 80 branches from the cleaning water discharge pipe 50 located behind the purification unit 100, the cleaning water W2 converted to a pH value satisfying the IMO treated water standard and having the sludge S removed can be discharged to the sea. However, the outlet pipe 80 does not necessarily discharge the cleaning water W2 to the sea. For example, the outlet pipe 80 can supply the cleaning water W2 to various places of use. At, least one third valve 80a may be installed on the outlet pipe 80 to control the flow of the cleaning water W2.

The operation of the pollutant reduction device 1 will now be described in more detail with reference to FIGS. 2 and 3.

Figure 2:
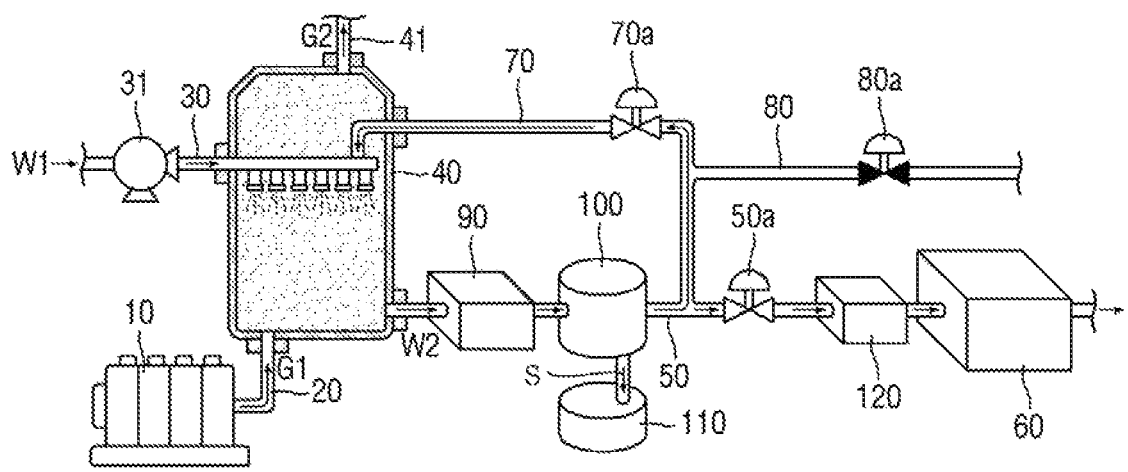
FIGS. 2 and 3 illustrate the operation of the pollutant reduction device of FIG. 1.
Figure 3:
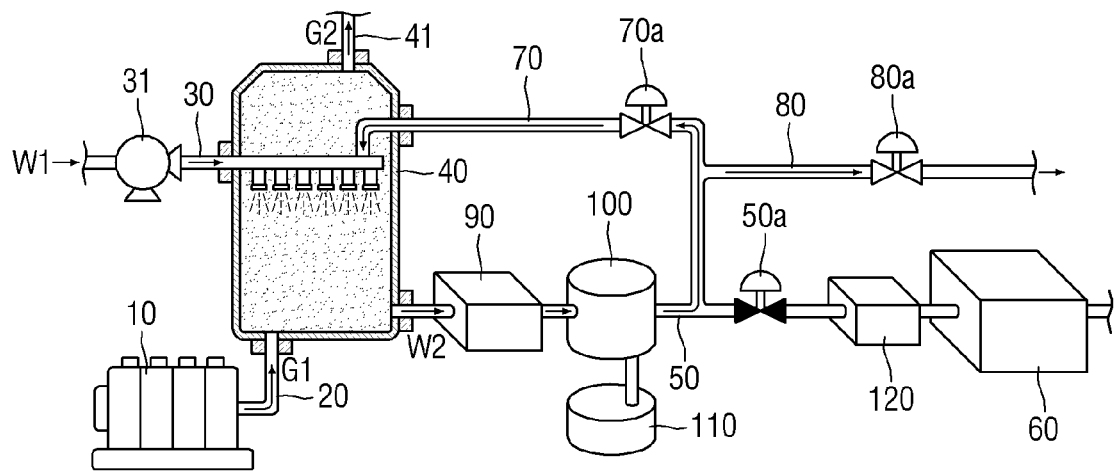

FIGS. 2 and 3 illustrate the operation of the pollutant reduction device of FIG. 1.

The pollutant reduction device 1 according to the first embodiment of the inventive concept may neutralize the cleaning water W2 acidified by the scrubber 40 to a pH value satisfying the IMO treated water standard and then supply the neutralized cleaning water W to the ballast water tank 60 so as to use the neutralized cleaning water W as ballast water. Therefore, the ballast water treatment system for killing microorganisms can be omitted. This not only reduces the installation and maintenance cost of the system, but also increases space utilization in the ship. In addition, since the pollutant reduction device 1 can be implemented by adding only pipes to the ballast water treatment system, it can be easily applied to existing ships.

FIG. 2 illustrates a process in which cleaning water discharged from the scrubber is supplied to the ballast water tank.

Exhaust gas G1 of the combustion engine 10 flows into the scrubber 40 through the exhaust gas pipe 20, and cleaning water W1 is supplied to the scrubber 40 through the cleaning water supply pipe 30. At this time, the cleaning water supply pipe 30 located in the upper part of the scrubber 40 sprays the cleaning water W1 toward the lower part of the scrubber 40 where the exhaust gas pipe 20 is located. Therefore, the exhaust gas G1 and the cleaning water W1 can be effectively brought into contact with each other. As the exhaust gas G1 and the cleaning water W1 come into contact with each other, sulfur oxides, nitrogen oxides and dust contained in the exhaust gas G1 may be removed. The exhaust gas G2 from which the sulfur oxides, the nitrogen oxides and the dust have been removed is discharged to the outside through the discharge pipe 41. The cleaning water W2, which has absorbed the sulfur oxides, the nitrogen oxides and the dust through the contact with the exhaust gas G1, is discharged through the cleaning water discharge pipe 50 and then neutralized by the neutralization unit 90 to a pH value satisfying the IMO treated water standard. Sludge S contained in the cleaning water W2 is separated from the cleaning water W2 by the purification unit 100 installed on the cleaning water discharge pipe 50 and stored in the sludge storage tank 110.

When the cleaning water W2 discharged from the scrubber 40 is supplied to the ballast water tank 60, the first valve 50a of the cleaning water discharge pipe 50 is opened, and the third valve 80a of the outlet pipe 80 is closed. At this time, the second valve 70a of the circulation pipe 70 may be selectively opened. Since the first valve 50a installed in front of the ballast water tank 60 is opened, the cleaning water W2 flowing through the cleaning water discharge pipe 50 can flow into the ballast water tank 60 via the sterilization unit 120 to maintain the balance of the ship. The cleaning water W2 flowing through the cleaning water discharge pipe 50 is suitable for use as ballast water because it has a low survival rate of microorganisms and has been converted to a pH value satisfying the IMO treated water standard.

The cleaning water W2 discharged from the ballast water tank 60 may be discharged to the sea or supplied to various places of use.

When the second valve 70a is opened as illustrated in the drawing, the cleaning water W2 flowing through the cleaning water discharge pipe 50 is circulated to the scrubber 40 through the circulation pipe 70. Since a portion of the cleaning water W2 flowing through the cleaning water discharge pipe 50 is circulated to the scrubber 40 through the circulation pipe 70, the amount of the cleaning water W1 supplied through the cleaning water supply pipe 30 can be reduced.

FIG. 3 illustrates a process in which cleaning water discharged from the scrubber is discharged to the sea.

Exhaust gas G1 of the combustion engine 10 and cleaning water W1 are supplied to the scrubber 40 through the exhaust gas pipe 20 and the cleaning water supply pipe 30, respectively. As the exhaust gas G1 and the cleaning water W1 come into contact with each other, sulfur oxides, nitrogen oxides and dust contained in the exhaust gas G1 may be removed. The exhaust gas G2 from which the sulfur oxides, the nitrogen oxides and the dust have been removed is discharged to the outside through the discharge pipe 41. The cleaning water W2, which has absorbed the sulfur oxides, the nitrogen oxides and the dust, is discharged through the cleaning water discharge pipe 50 and then neutralized by the neutralization unit 90 to a pH value satisfying the IMO treated water standard. Sludge S contained in the cleaning water W2 is separated from the cleaning water W2 by the purification unit 100 installed on the cleaning water discharge pipe 50 and stored in the sludge storage tank 110.

When the cleaning water W2 discharged from the scrubber 40 is discharged to the sea, the third valve 80a is opened, and the first valve 50a is closed. At this time, the second valve 70a may be selectively opened. Since the third valve 80a is opened, the cleaning water W2 flowing through the cleaning water discharge pipe 50 can be discharged to the sea through the outlet pipe 80 or supplied to various places of use.

When the second valve 70a is opened as illustrated in the drawing, the cleaning water W2 is circulated to the scrubber 40 through the circulation pipe 70.

Hereinafter, a pollutant reduction device 1-1 according to a second embodiment of the inventive will be described in detail with reference to FIG. 4.

Figure 4:
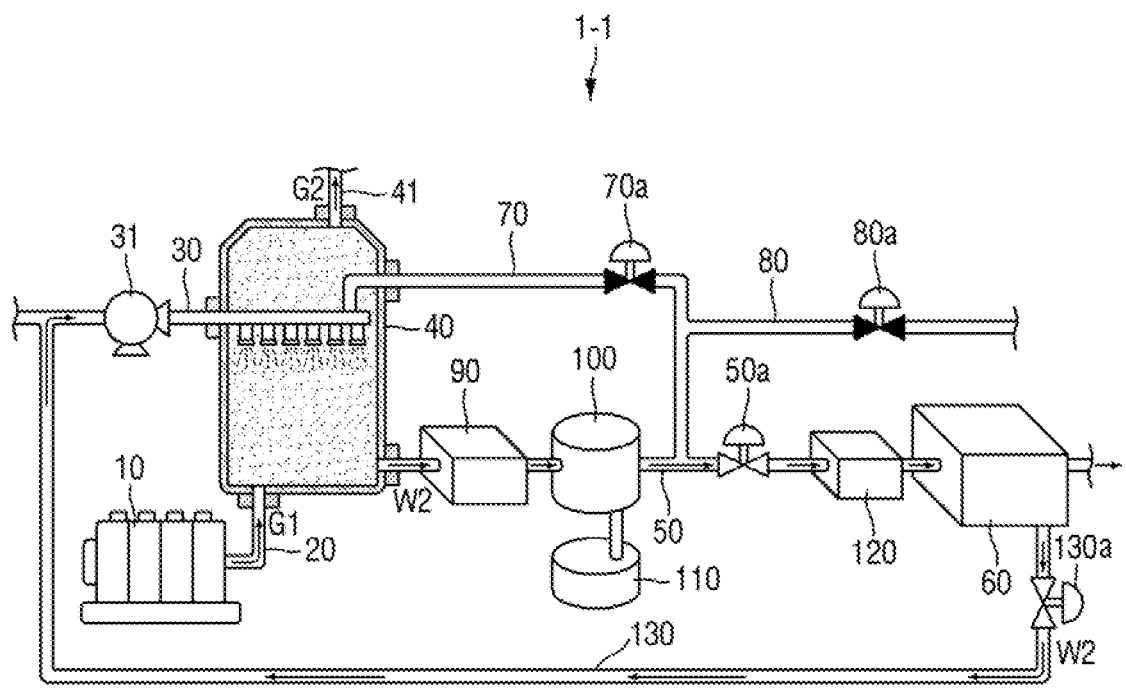
FIG. 4 illustrates the operation of a pollutant reduction device according to a second embodiment of the inventive concept.

FIG. 4 illustrates the operation of a pollutant reduction device according to a second embodiment of the inventive concept.

The pollutant reduction device 1-1 according to the second embodiment of the inventive concept further includes a cleaning water resupply pipe 130 having one end connected to a ballast water tank 60 and the other end connected to a cleaning water supply pipe 30. The pollutant reduction device 1-1 according to the second embodiment of the inventive concept is substantially the same as the above-described embodiment, except that it further includes the cleaning water resupply pipe 130 having one end connected to the ballast water tank 60 and the other end connected to the cleaning water supply pipe 30. Therefore, the cleaning water resupply pipe 130 will be mainly described, and the description of the other elements will be replaced by the above description unless otherwise stated.

The cleaning water resupply pipe 130 is a pipe for resupplying cleaning water W2 stored in the ballast water tank 60 to the cleaning water supply pipe 30. An end of the cleaning water resupply pipe 130 is connected to the ballast water tank 60, and the other end of the cleaning water resupply pipe 130 is connected to a side of the cleaning water supply pipe 30. Since the cleaning water resupply pipe 130 is connected to a side of the ballast water tank 60, when the cleaning water W2 stored in the ballast water tank 60 has to be removed in order to maintain the balance of a ship, a portion of the cleaning water W2 discharged to the sea can be supplied to the cleaning water supply pipe 30. Therefore, even if cleaning water W1 is not supplied from a seawater inlet or a freshwater tank, sulfur oxides, nitrogen oxides and dust contained in exhaust gas G1 can be removed.

Hereinafter, a pollutant reduction device 1-2 according to a third embodiment of the inventive concept will be described in detail with reference to FIGS. 5 through 7.

Figure 5:
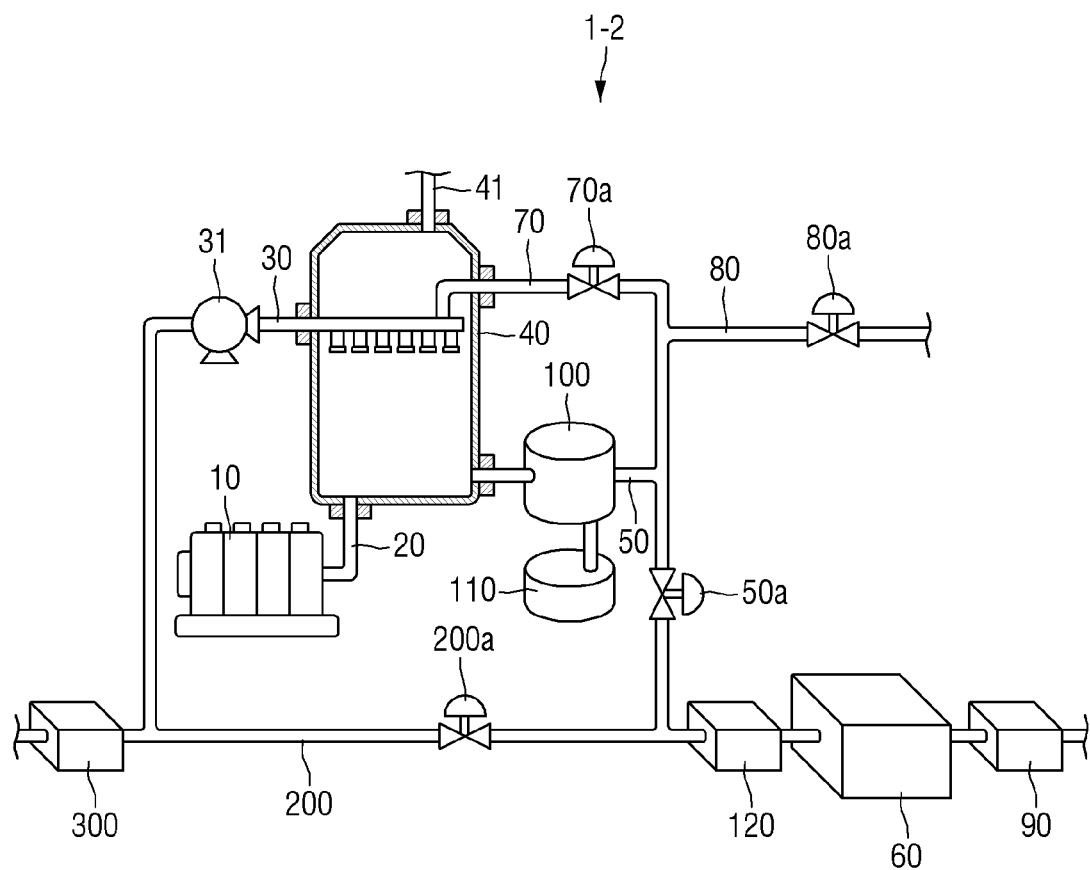
FIG. 5 is a schematic view of a pollutant reduction device according to a third embodiment of the inventive concept.

FIG. 5 is a schematic view of a pollutant reduction device according to a third embodiment of the inventive concept.

In the pollutant reduction device 1-2 according to the third embodiment of the inventive concept, a cleaning water supply pipe 30 branches from a seawater flow pipe 200 and is connected to a scrubber 40. The pollutant reduction device 1-2 according to the third embodiment of the inventive concept is substantially the same as the above-described embodiments, except that the cleaning water supply pipe 30 branches from the seawater flow pipe 200 and is connected to the scrubber 40. Therefore, the above difference will be mainly, described, and the description of the other elements will be replaced by the above description unless otherwise stated.

The cleaning water supply pipe 30 is a pipe for supplying cleaning water W1 (see FIG. 6), which is at least one of seawater, freshwater, and a mixture of seawater and freshwater, to the scrubber 40. The cleaning water supply pipe 30 may branch from the seawater flow pipe 200 and may be connected to the scrubber 40.

The seawater flow pipe 200 is a pipe for supplying at least one of seawater, freshwater and a mixture of seawater and freshwater to a ballast water tank 60. An end of the seawater flow pipe 200 may be connected to at least one of a seawater inlet (not illustrated) and a freshwater tank, and the other end of the seawater flow pipe 200 may be connected to the ballast water tank 60. A pretreatment filter 300 for removing microorganisms having a specific size or more is installed on the seawater flow pipe 200, and the cleaning water supply pipe 30 branches behind the pretreatment filter 300. At least one fifth valve 200a may be installed on the seawater flow pipe 200 to control the flow of at least one of seawater, freshwater, and a mixture of seawater and freshwater. Based on the assumption that the cleaning water W1 is limited to seawater W (see FIG. 6), a structure in which an end of the seawater flow pipe 200 is connected to the seawater inlet and the cleaning water supply pipe 30 branches from the seawater flow pipe 200 will hereinafter be described more specifically.

A portion of the seawater W flowing into the seawater flow pipe 200 through the seawater inlet is supplied to the ballast water tank 60, and the remaining portion of the seawater W is supplied to the scrubber 40 through the cleaning water supply pipe 30. At this time, a ratio of the seawater W supplied to the ballast water tank 60 to the cleaning water supplied to the scrubber 40 may be about 9:1. At least one pump 31 may be installed on the cleaning water supply pipe 30 to smoothly supply the cleaning water W1 to the scrubber 40.

The scrubber 40 sprays the cleaning water W1 supplied through the cleaning water supply pipe 30 to exhaust gas G1 (see FIG. 6) introduced through an exhaust gas pipe 20, so that the exhaust gas and the cleaning water W1 can contact each other. The scrubber 40 may be a conventional wet scrubber. As the exhaust gas G1 and the cleaning water W1 come into contact with each other within the scrubber 40, sulfur oxides, nitrogen oxides and dust contained in the exhaust gas G1 may be removed. The exhaust gas G2 (see FIG. 6) from which the sulfur oxides, the nitrogen oxides and the dust have been removed may be discharged to the outside through a discharge pipe 41. Since the exhaust gas G2 discharged through the discharge pipe 41 is without the sulfur oxides, the nitrogen oxides and the dust, it does not cause air pollution even if it is discharged into the atmosphere as it is.

The acidified cleaning water W2 (see FIG. 6), which has absorbed the sulfur oxides, the nitrogen oxides and dust through the contact with the exhaust gas G1 containing the sulfur oxides, the nitrogen oxides and the dust, is discharged through a cleaning water discharge pipe 50.

The cleaning water discharge pipe 50 is a pipe for discharging the cleaning water W2 inside the scrubber 40 and supplying the cleaning water W2 to the ballast water tank 60. An end of the cleaning water discharge pipe 50 is connected to the scrubber 40, and the other end of the cleaning water discharge pipe 50 is connected to a side of the ballast water tank 60. Here, the other end of the cleaning water discharge pipe 50 may be connected to the seawater flow pipe 200 and connected to the ballast water tank 60 by the seawater flow pipe 200. Since the cleaning water discharge pipe 50 is connected to the seawater flow pipe 200, the cleaning water W2 flowing through the cleaning water discharge pipe 50 may be mixed with the seawater W flowing through the seawater flow pipe 200 and then supplied to the ballast water tank 60. As described above, the cleaning water W2 discharged from the scrubber 40 has been acidified by the sulfur oxides, the nitrogen oxides and the dust that it absorbed. Since this cleaning water W2 is mixed with the seawater W flowing through the seawater flow pipe 200 and then supplied to the ballast water tank 60, microorganisms present in the seawater W can be killed. In other words, since the microorganisms present in the seawater W are killed by the acidified cleaning water W2, the mixture of the cleaning water W2 and the seawater W is suitable for use as ballast water.

Sludge S (see FIG. 6) is separated from the cleaning water W2 flowing through the cleaning water discharge pipe 50 by a purification unit 100 before the cleaning water W2 is mixed with the seawater W. The separated sludge S is stored in a sludge storage tank 110. The mixture of the cleaning water W2 and the seawater W may be additionally sterilized by a sterilization unit 120 and then supplied to the ballast water tank 60. The mixture of the cleaning water W2 and the seawater W discharged from the ballast water tank 60 may be neutralized to a pH value satisfying the IMO treated water standard by a neutralization unit 90 and then discharged to the sea or used in various necessary places.

At least one first valve 50a may be installed on the cleaning water discharge pipe 50 to control the flow of the cleaning water W2. The first valve 50a may be disposed behind the purification unit 100. A circulation pipe 70 and an outlet pipe 80 may each branch from the cleaning water discharge pipe 50 in front of the first valve 50a. Since the circulation pipe 70 and the outlet pipe 80 branch in front of the first valve 50a, the cleaning water W2 without the sludge S can be circulated to the scrubber 40 or discharged to the sea. Here, a neutralization unit may be installed on the outlet pipe 80 to convert the cleaning water W2 to a pH value satisfying the IMO treated water standard and then discharge the cleaning water W2 to the sea.

The operation of the pollutant reduction device 1-2 will now be described in more detail with reference to FIGS. 6 and 7.

Figure 6:
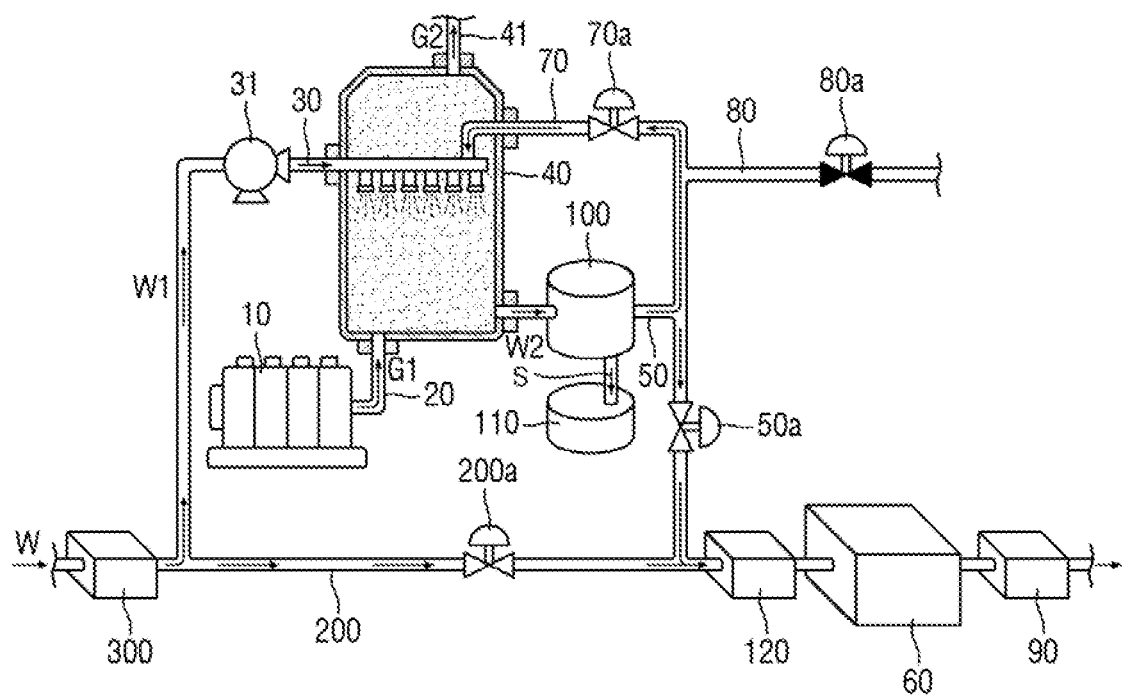
FIGS. 6 and 7 illustrate the operation of the pollutant reduction device of FIG. 5.
Figure 7:
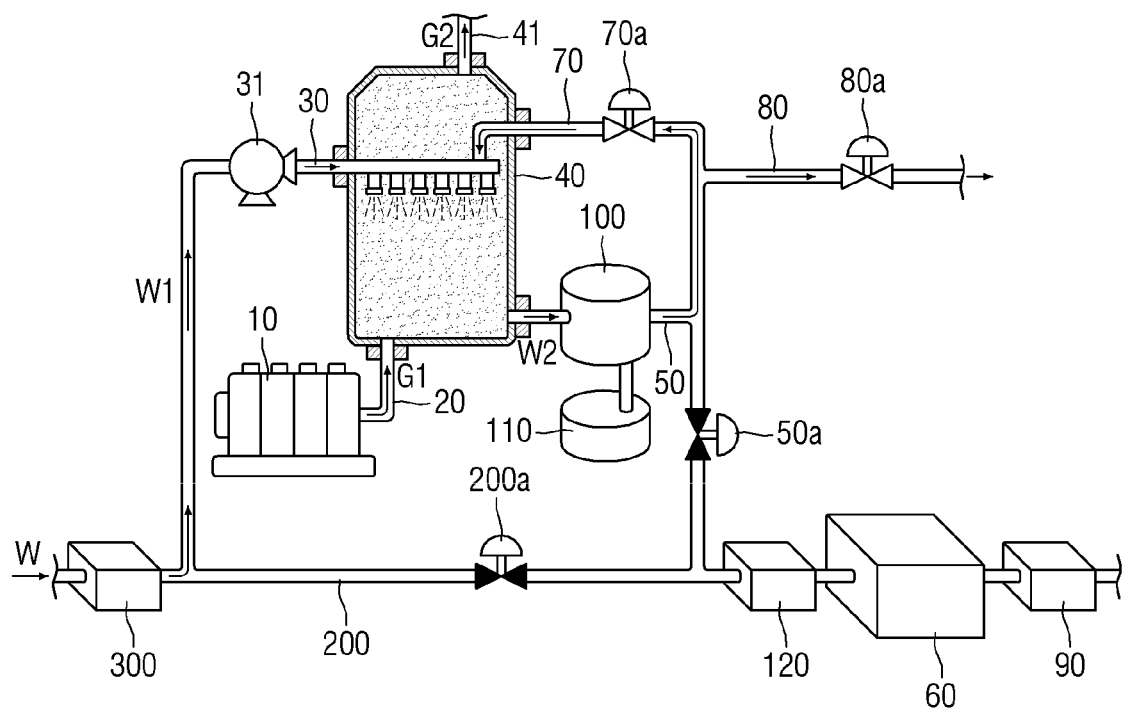

FIGS. 6 and 7 illustrate the operation of the pollutant reduction device of FIG. 5.

The pollutant reduction device 1-2 according to the third embodiment of the inventive concept mixes cleaning water W2 acidified by the scrubber 40 with seawater W flowing through the seawater flow pipe 200 and supplies the mixture of the cleaning water W2 and the seawater W to the ballast water tank 60. Therefore, microorganisms present in the seawater W can be killed, and thus a separate process for killing microorganisms can be omitted.

FIG. 6 illustrates a process in which cleaning water discharged from the scrubber is supplied to the ballast water tank.

Exhaust gas G1 of a combustion engine 10 flows into the scrubber 40 through the exhaust gas pipe 20. A portion of seawater W that passes through the pretreatment filter 300 of the seawater flow pipe 200 is supplied as cleaning water W1 to the scrubber 40 through the cleaning water supply pipe 30, and the remaining portion of the seawater W is supplied to the ballast water tank 60. The cleaning water supply pipe 30 located in an upper part of the scrubber 40 sprays the cleaning water W1 toward a lower part of the scrubber 40 where the exhaust gas pipe 20 is located, thereby effectively bringing the exhaust gas G1 and the cleaning water W1 into contact with each other. As the exhaust gas and the cleaning water W1 come into contact with each other, sulfur oxides, nitrogen oxides and dust contained in the exhaust gas G1 may be removed. The exhaust gas G2 from which the sulfur oxides, the nitrogen oxides and the dust have been removed is discharged to the outside through the discharge pipe 41. The acidified cleaning water W2, which has absorbed the sulfur oxides, the nitrogen oxides and the dust through the contact with the exhaust gas G1, is discharged through the cleaning water discharge pipe 50, and sludge S is separated from the cleaning water W2 by the purification unit 100. The separated sludge S is stored in the sludge storage tank 110.

When the cleaning water W2 discharged from the scrubber 40 is supplied to the ballast water tank 60, the first valve 50a of the cleaning water discharge pipe 50 is opened, and a third valve 80a is closed. At this time, a second valve 70a of the circulation pipe 70 may be selectively opened. Since the first valve 50a is opened, the cleaning water W2 flowing through the cleaning water discharge pipe 50 can join the seawater W flowing through the seawater flow pipe 200 and flow to the ballast water tank 60 via the sterilization unit 120. Since the cleaning water W2 flowing through the cleaning water discharge pipe 50 has been acidified by the sulfur oxides and the nitrogen oxides, microorganisms present in the seawater W can be killed. Accordingly, the mixture of the cleaning water W2 and the seawater W whose microorganisms have been killed can be stored in the ballast water tank 60 as ballast water.

The mixture of the cleaning water W2 and the seawater W discharged from the ballast water tank 60 may be neutralized to a pH value satisfying the IMO treated water standard by the neutralization unit 90 and then discharged to the sea or supplied to various places of use.

When the second valve 70a is opened as illustrated in the drawing, the cleaning water W2 flowing through the cleaning water discharge pipe 50 is circulated to the scrubber 40 through the circulation pipe 70. Since a portion of the cleaning water W2 flowing through the cleaning water discharge pipe 50 is circulated to the scrubber 40 through the circulation pipe 70, the amount of the cleaning water W1 supplied through the cleaning water supply pipe 30 can be reduced.

FIG. 7 illustrates a process in which cleaning water discharged from the scrubber is discharged to the sea.

Exhaust gas G1 of the combustion engine 10 and cleaning water W1 are supplied to the scrubber 40 through the exhaust gas pipe 20 and the cleaning water supply pipe 30, respectively. As the exhaust gas G1 and the cleaning water W1 come into contact with each other, sulfur oxides, nitrogen oxides and dust contained in the exhaust gas G1 may be removed. The exhaust gas G2 from which the sulfur oxides, the nitrogen oxides and the dust have been removed is discharged to the outside through the discharge pipe 41. The cleaning water W2, which has absorbed the sulfur oxides, the nitrogen oxides and the dust, is discharged through the cleaning water discharge pipe 50. Sludge S contained in the cleaning water W2 is separated from the cleaning water W2 by the purification unit 100 and stored in the sludge storage tank 110.

When the cleaning water W2 discharged from the scrubber 40 is discharged to the sea, the third valve 80a is opened, and the first valve 50a is closed. At this time, the second valve 70a and the fifth valve 200a may be selectively opened. Since the third valve 80a is opened, the cleaning water W2 flowing through the cleaning water discharge pipe 50 can be discharged to the sea through the outlet pipe 80 or supplied to various places of use. Here, since a neutralization unit is installed on the outlet pipe 80, the cleaning water W2 may be neutralized to a pH value satisfying the IMO treated water standard and then discharged to the sea or supplied to places of use.

When be second valve 70a is opened as illustrated in the drawing, the cleaning water W2 is circulated to the scrubber 40 through the circulation pipe 70. When the fifth valve 200a is closed, the flow of seawater W into the ballast water tank 60 is blocked.

Hereinafter, a pollutant reduction device 1-3 according to a fourth embodiment of the inventive concept will be described in detail with reference to FIG. 8.

Figure 8:
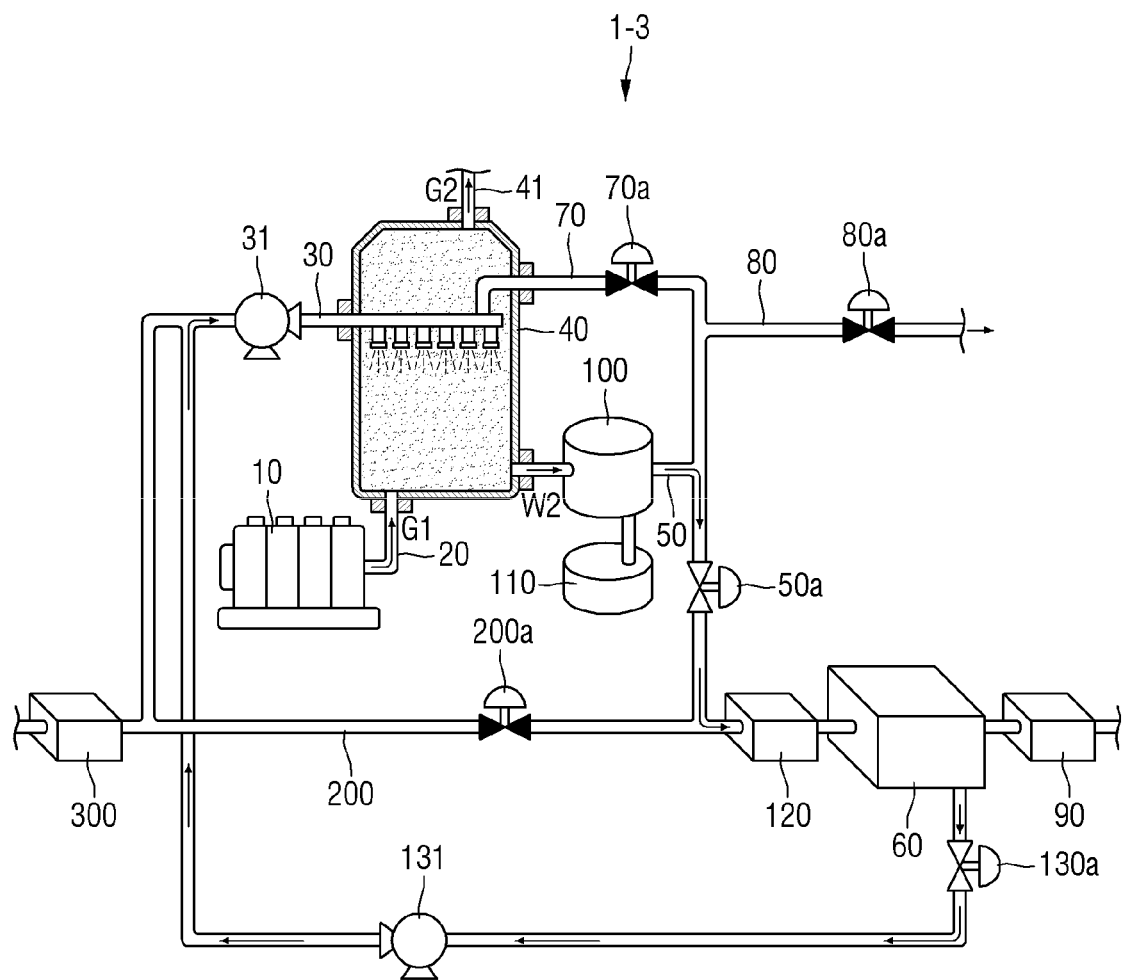
FIG. 8 illustrates the operation of a pollutant reduction device according embodiment of the inventive concept.

FIG. 8 illustrates the operation of a pollutant reduction device according to a fourth embodiment of the inventive concept.

The pollutant reduction device 1-3 according to the fourth embodiment of the inventive concept further includes a cleaning water resupply pipe 131 having one end connected to a ballast water tank 60 and the other end connected to a cleaning water supply pipe 30. The pollutant reduction device 1-3 according to the fourth embodiment of the inventive concept is substantially the same as the above-described embodiments, except that it further includes the cleaning water resupply pipe 130 having one end connected to the ballast water tank 60 and the other end connected to the cleaning water supply pipe 30. Therefore, the cleaning water resupply pipe 130 will be mainly described, and the description of the other elements will be replaced by the above description unless otherwise stated.

The cleaning water resupply pipe 130 is a pipe for resupplying a mixture of cleaning water W2 and seawater W stored in the ballast water tank 60 to the cleaning water supply pipe 30. An end of the cleaning water resupply pipe 130 is connected to the ballast water tank 60, and the other end of the cleaning water resupply pipe 130 is connected to a side of the cleaning water supply pipe 30. Since the cleaning water resupply pipe 130 is connected to a side of the ballast tank 60, when the mixture of the cleaning water W2 and the seawater W stored in the ballast water tank 60 has to be removed in order to maintain the balance of a ship, a portion of the mixture of the cleaning water W2 and the seawater W discharged to the sea can be supplied to the cleaning water supply pipe 30. Therefore, even if cleaning water W1 is not supplied from a seawater inlet or a freshwater tank, sulfur oxides, nitrogen oxides and dust contained in exhaust gas G1 can be removed. At least one pump 131 may be installed on the cleaning water resupply pipe 130 to smoothly supply the mixture of the cleaning water W2 and the seawater W to the cleaning water supply pipe 30.

Hereinafter, a pollutant reduction device according to a fifth embodiment of the inventive concept will be described in detail with reference to FIGS. 9 through 15.

Figure 9:
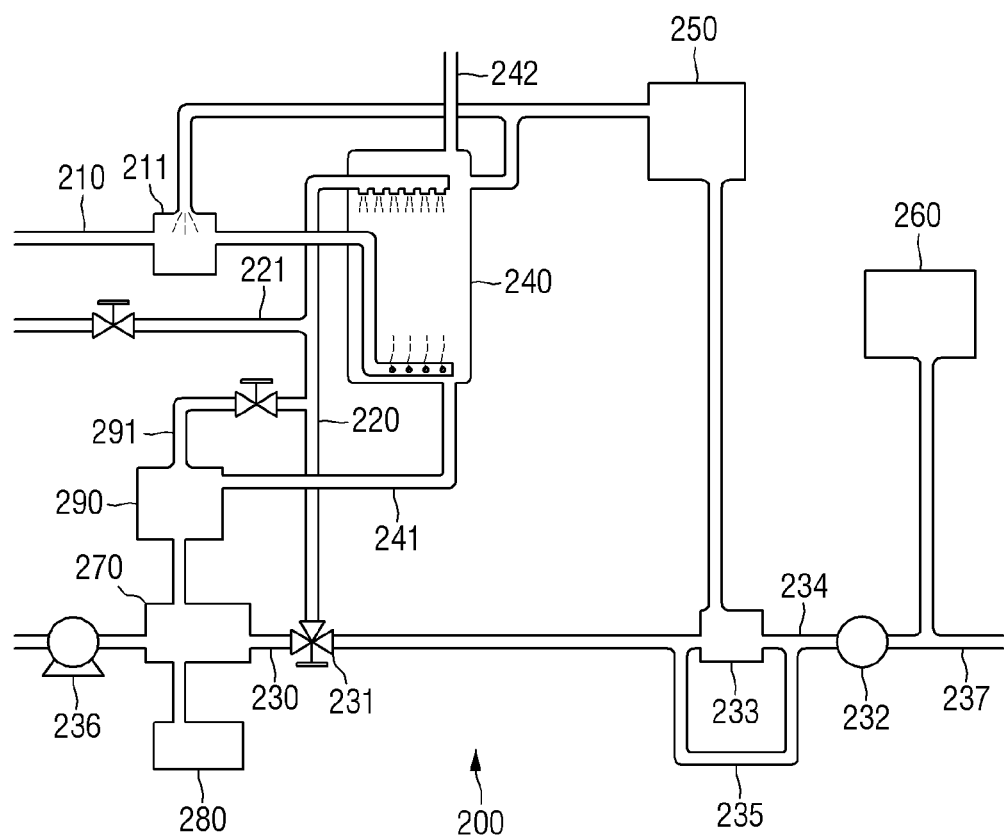
FIG. 9 is a schematic view of a pollutant reduction device according to a fifth embodiment of the inventive concept.

FIG. 9 is a schematic view of a pollutant reduction device according to a fifth embodiment of the inventive concept.

The pollutant reduction device 200 according to the fifth embodiment of the inventive concept is a device which can emit air that meets the exhaust standard by reducing the concentration of various pollutants oxides, sulfur oxides, dust, etc.) contained in exhaust gas and, at the same time, kill microorganisms present in seawater to use the seawater as ballast water or to discharge the seawater. The pollutant reduction device 200 may be mounted mostly on a ship to remove pollutants contained in exhaust gas generated from the ship and, at the same time, kill microorganisms present in seawater used as ballast water. In addition, the pollutant reduction device 200 can separately operate the function of removing pollutants from exhaust gas and the function of killing microorganism contained in ballast water or can adjust an operation ratio of the two functions as needed, and a sterilization device included in a ballast water treatment system can be removed. Since the pollutant reduction device 200 can be implemented by adding only pipes to the ballast water treatment system, it can be easily applied to existing ships.

The pollutant reduction device 200 according to the inventive concept includes an exhaust gas pipe 210, a cleaning water supply pipe 220, a scrubber 240, a purification unit 250, a cleaning water discharge pipe 241, and a seawater supply pipe 230.

The exhaust gas pipe 210 is a pipe through which exhaust gas moves from a combustion engine and is connected to the scrubber 240. The exhaust gas pipe 210 may be directly connected to an exhaust pipe of the combustion engine and serve as a passage through which hot exhaust gas moves or waste gas remaining after most of the exhaust heat is recycled by various heat exchangers moves.

The cleaning water supply pipe 220 is a pipe for supplying the scrubber 240 with cleaning water which is at least one of seawater, freshwater, and a mixture of seawater and freshwater. An end of the cleaning water supply pipe 220 may be connected to the seawater supply pipe 230 or a freshwater supply pipe 221, and the other end of the cleaning water supply pipe 220 may be connected to the scrubber 240. That is, the cleaning water supply pipe 220 can selectively receive seawater and freshwater.

Based on the assumption that the cleaning water is mostly limited to seawater, a process in which the seawater is supplied into the scrubber 240 through the cleaning water supply pipe 220 will be mainly described below.

A pump 236 may be installed on the seawater supply pipe 230 to smoothly supply the cleaning water to the scrubber 240. In particular, the cleaning water supply pipe 220 branches from the seawater supply pipe 230 and is connected to the scrubber 240, and a control valve 231 is installed at a connection portion between the cleaning water supply pipe 220 and the seawater supply pipe 230. The control valve 231 may control the amount of seawater supplied through the cleaning water supply pipe 220 or adjust a ratio of seawater supplied to the cleaning water supply pipe 220 to seawater supplied to a ballast water tank 260 through the seawater supply pipe 230.

The scrubber 240 is a device for spraying the cleaning water supplied through the cleaning water supply pipe 220 to exhaust gas introduced through the exhaust gas pipe 210 so that the exhaust gas and the cleaning water can contact each other. The scrubber 40 may be a wet scrubber. As the exhaust gas and the cleaning water into contact with each other within the scrubber 240, pollutants such as nitrogen oxides, sulfur oxides and dust contained in the exhaust gas may be removed. The exhaust gas G (see FIG. 12) from which the pollutants such as the nitrogen oxides, the sulfur oxides and the dust have been removed may be discharged to the outside through a discharge pipe 242.

The cleaning water, which has absorbed the nitrogen oxides, the sulfur oxides and the dust through the contact with the pollutant-containing exhaust gas in the scrubber 240, is discharged through the cleaning water discharge pipe 241.

The purification unit 250 may be connected to the exhaust gas pipe 210 or the scrubber 240 to physically or chemically oxidize nitrogen-based oxides, to neutralize acidified cleaning water, or to kill microorganisms present in cleaning water. The purification unit 250 may supply an oxidizing agent, a neutralizing agent or a sterilizing agent to the exhaust gas pipe 210 or the scrubber 240. For example, the purification unit 250 may be a device that produces all of the oxidizing agent, the neutralizing agent and the sterilizing agent by electrolyzing seawater or a device that produces the oxidizing agent and the sterilizing agent by using plasma. The purification unit 250 is not limited to the electrolytic device or the plasma device but may be any device capable of oxidizing nitrogen-based oxides, neutralizing acidified cleaning water, or killing microorganisms present in cleaning water.

The purification unit 250 may oxidize nitrogen monoxide contained in the exhaust gas into nitrogen dioxide by spraying the oxidizing agent to the exhaust gas pipe 210. The nitrogen dioxide is easily dissolved in water as compared with the nitrogen monoxide. Therefore, the nitrogen dioxide can be easily dissolved in the cleaning water in the scrubber 240 and thus can be easily removed. The purification unit 250 may atomize a liquid oxidizing agent and spray the atomized liquid oxidizing agent to the exhaust gas pipe 210. The purification unit 250 may atomize a liquid oxidizing agent and spray the atomized liquid oxidizing agent directly to the exhaust gas pipe 210 or spray a liquid oxidizing agent to the exhaust gas through a spray unit 211 installed on the exhaust gas pipe 210.

Here, the purification unit 250 may also spray the neutralizing agent to the exhaust gas pipe 210 or may spray the neutralizing agent to the scrubber 240. The neutralizing agent can neutralize the cleaning water acidified by the reaction of the nitrogen oxides and the sulfur oxides with the cleaning water. Since the nitrogen oxides and the sulfur oxides react with seawater to produce nitric acid ($HNO_3$) and sulfuric acid ($H_2SO_4$), respectively, the purification unit 250 may neutralize the acidified cleaning water by spraying sodium hypochlorite (NaOCl) to the scrubber 240.

In addition, the purification unit 250 may neutralize ballast water by spraying the neutralizing agent to the ballast water tank 260 or spraying the neutralizing agent to a seawater discharge pipe 237. The purification unit 250 can inject the neutralizing agent (NaOH) directly into the scrubber 240. If the cleaning water is not sufficiently neutralized by the purification unit 250, a neutralizing agent injection unit (not illustrated) may be added to perform an additional neutralization operation.

The cleaning water discharge pipe 241 is a pipe for discharging the cleaning water inside the scrubber 240 and may be connected back to the seawater supply pipe 230 by a filter unit 270. That is, after solid-phase particles are separated from the cleaning water discharge pipe 241 by the filter unit 270, the cleaning water discharge pipe 241 may be stored in the ballast water tank 260 or discharged to the outside. The cleaning water discharge pipe 241 is not necessarily connected to the seawater supply pipe 230 but can be connected to the ballast water tank 260 independently or to the outside of a ship.

A circulation pipe 291 may be connected to the cleaning water discharge pipe 241. The circulation pipe 291 is designed to recirculate the cleaning water discharged through the cleaning water discharge pipe 241 to the cleaning water supply pipe 220. When the cleaning water is not used as ballast water or it is not necessary to discharge the cleaning water to the outside, the cleaning water may be circulated to the scrubber 240 and used continuously.

A recirculation tank 290 may be installed between the cleaning water discharge pipe 241 and the circulation pipe 291. The recirculation tank 290 may store some of the cleaning water discharged through the scrubber 240 and may serve as a kind of buffer tank that allows a certain amount of cleaning water to be circulated through the circulation pipe 291.

The recirculation tank 290, like the filter unit 270, may include any one of a centrifuge, a gravity separator and a filter to remove solid-phase particles included in the cleaning water and to recirculate the cleaning water through the circulation pipe 291.

Since the cleaning water supply pipe 220 is connected to the seawater supply pipe 230, the freshwater supply pipe 221 and the circulation pipe 291, it can appropriately mix seawater, freshwater and circulating water in view of the concentration of the exhaust gas, the treatment capacity of the scrubber 240, the concentration and the degree of contamination of the cleaning water, etc. and supply the mixture to the scrubber 240.

The filter unit 270 is installed behind the scrubber 240 to separate solid-phase particles from the cleaning water discharged from the scrubber 240. The filter unit 270 may separate the solid-phase particles using at least one of a centrifuge, a gravity separator and a filter and discharge the solid-phase particles to a sludge tank 280. The filter unit 270 may be connected to the seawater supply pipe 230 between the pump 236 and the control valve 231. That is, the seawater supplied from the seawater supply pipe 230 may be supplied to the scrubber 240 via the filter unit 270, and the cleaning water passing through the scrubber 240 may pass through the filter unit 270 again. That is, both the seawater introduced from the outside and the cleaning water that passes through the scrubber 240 can be filtered by one filter unit 270. In addition, a junction pipe 238 (see FIG. 14) connected directly to the seawater supply pipe 230 behind the control valve 231 may be installed on a side of the filter unit 270.

The neutralizing agent or the sterilizing agent supplied from the purification unit 250 may be sprayed to the cleaning water or the seawater that passes through the filter unit 270. A mixing pipe 234 to which a mixture of the seawater and the cleaning water is discharged may be installed between the filter unit 270 and the seawater discharge pipe 237, and an injection unit 233 may be installed to inject the neutralizing agent or the sterilizing agent supplied from the purification unit 250 into the mixing pipe 234. The injection unit 233 may inject the neutralizing agent or the sterilizing agent into the seawater and the cleaning water in a liquid or gaseous state.

A sensor unit 232 may be installed behind the injection unit 233 to identify, in real time, total residual oxidant, pH concentration, microbial concentration, etc. in the cleaning water and the seawater discharged through the mixing pipe 234. The purification unit 250 appropriately adjusts the amounts of the oxidizing agent, the neutralizing agent and the sterilizing agent according to the result value of the sensor unit 232.

The cleaning water and the seawater discharged through the mixing pipe 234 may, flow into the ballast water tank 260 or may be discharged to the outside.

The ballast water tank 260 maintains the balance of the ship using the cleaning water discharged through the cleaning water discharge pipe 241. At least one ballast water tank 260 may be installed in the ship. As described above, the cleaning water discharged through the cleaning water discharge pipe 241 has absorbed the nitrogen oxides, the sulfur oxides and the dust contained in the exhaust gas. Therefore, the hydrogen ion exponent, i.e., the pH value of the cleaning water flowing in the cleaning water discharge pipe 241 is lower than that of the cleaning water flowing in the cleaning water supply pipe 220. In other words, since the cleaning water flowing in the cleaning water discharge pipe 241 has been acidified by the sulfur oxides and the nitrogen oxides, the pH value of the cleaning water flowing in the cleaning water discharge pipe 241 is lower than that of the cleaning water flowing in the cleaning water supply pipe 220. Therefore, the survival rate of microorganisms present in the cleaning water flowing in the cleaning water discharge pipe 241 is lower than that of microorganisms present in the cleaning water flowing in the cleaning water supply pipe 220.

That is, since the survival rate of microorganisms is law in the acidified cleaning water flowing in the cleaning water discharge pipe 241, the cleaning water satisfies the ballast water regulatory conditions that require microorganisms having a certain size or more to be killed. Therefore, the cleaning water is suitable for use as ballast water. If the cleaning water without microorganisms discharged from the scrubber 240 is used, a ballast water treatment system for killing microorganisms can be omitted. This not only reduces the installation and maintenance cost of the system but also increases space utilization in the ship. In addition, since the pollutant reduction device 200 can be implemented by adding only pipes to a ballast water treatment system, it can be easily applied to existing ships.

The purification unit 250 can supply the sterilizing agent directly to the ballast water tank 260 the concentration of microorganisms in the ballast water stored in the ballast water tank 260 is high, the sterilizing agent may be sprayed directly to the ballast water tank 260 to adjust the concentration of microorganisms. Therefore, the concentration of microorganisms in the ballast water stored in the ballast water tank 260 can be adjusted to below the microbial limit before the ballast water is discharged to the outside, thereby preventing marine pollution and ecosystem disturbance.

The operation of the pollutant reduction device 200 will now be described in more detail with reference to FIGS. 10 through 15.

Figure 10:
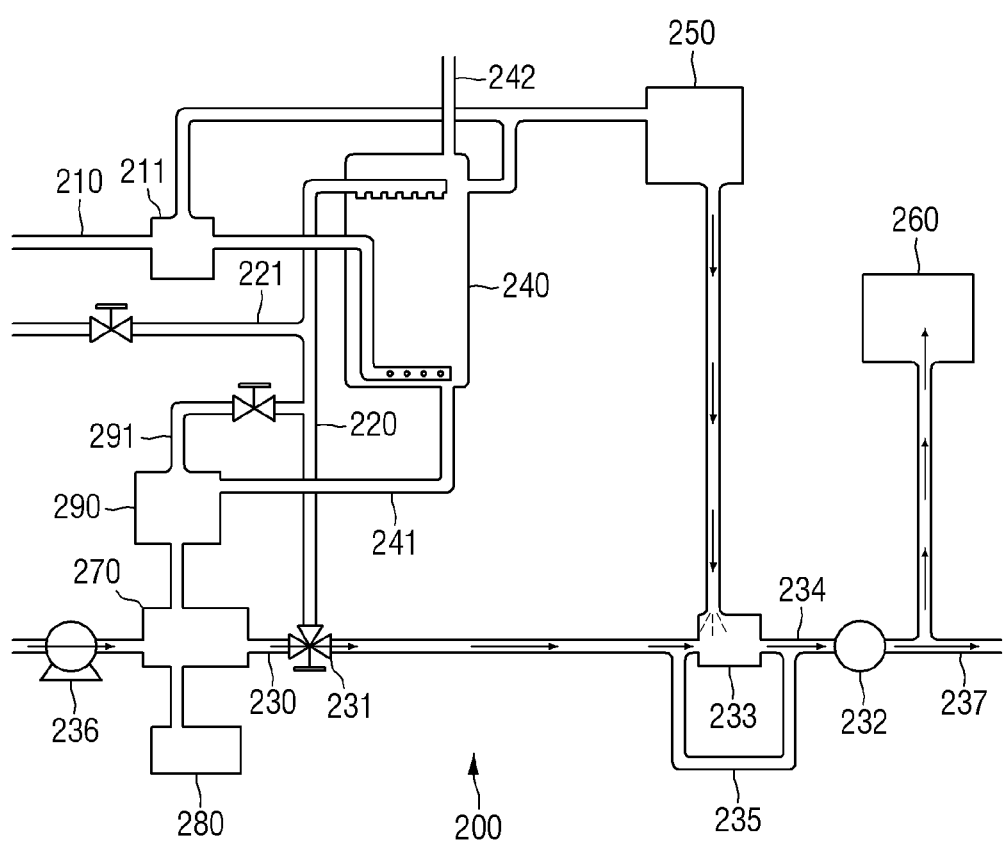
FIGS. 10 through 15 illustrate the operation of the pollutant reduction device according to the fifth embodiment of the inventive concept.
Figure 11:
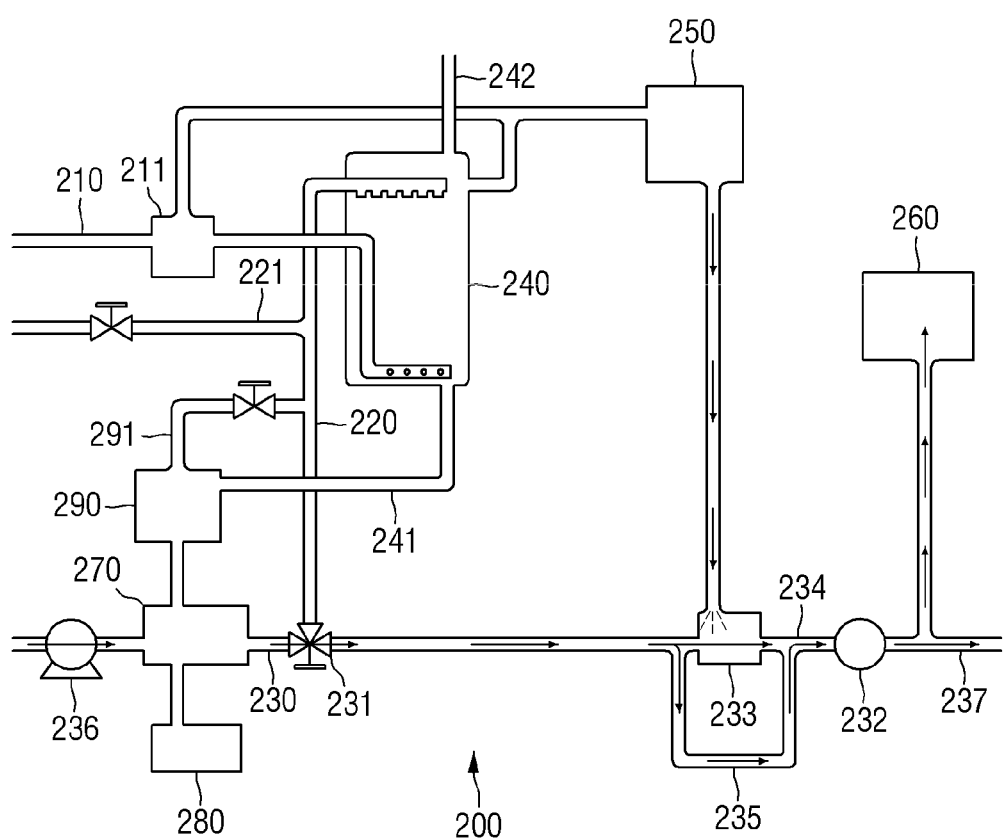

FIGS. 10 and 11 illustrate a process in which seawater introduced through the seawater supply pipe 230 is supplied as ballast water. FIG. 10 illustrates a direct sterilization method in which a sterilizing material is injected into the entire seawater supplied as ballast water. FIG. 11 illustrates an indirect sterilization method in which a sterilizing material is injected into a portion of seawater supplied as ballast water, and the portion of the seawater is mixed with seawater supplied from the outside.

Referring to FIG. 10, as seawater supplied through the seawater supply pipe 230 passes through the filter unit 270, microorganisms having large particles are removed. For example, the filter unit 270 may separate microorganisms having a diameter of 50 µm or more which are not easily killed by a sterilizing material.

A sterilizing agent supplied from the purification unit 250 may be sprayed to the seawater that passed through the filter unit 270. The seawater whose microorganisms have been killed by the spraying of the sterilizing agent may be supplied to the ballast water tank 260 and used as ballast water.

Referring to FIG. 11, as seawater supplied through the seawater supply pipe 230 passes through the filter unit 270, microorganisms having large particles are removed. A portion of the seawater may be discharged through the mixing pipe 234, and the remaining portion of the seawater may be discharged through a bypass pipe 235. The mixing pipe 234 is a pipe to which a sterilizing agent is sprayed from the purification unit 250, and the bypass pipe 235 is a pipe through which the seawater that passes through the filter unit 270 directly flows into the ballast water tank 260.

The seawater that passes through the mixing pipe 234 is without microorganisms because the microorganisms have been killed by the sterilizing agent contained in the seawater. If the seawater that passes through the mixing pipe 234 and the seawater that passes through the bypass pipe 235 are mixed with each other, microorganisms present in the seawater that passes through the bypass pipe 235 may all be killed.

The amounts or the proportions of the seawater passing through the mixing pipe 234 and the seawater passing through the bypass pipe 235 can be selectively adjusted according to the concentration of microorganisms in the seawater.

As described above with reference to FIGS. 10 and 11, the pollutant reduction device 200 can treat ballast water independently without using the exhaust removal function.

A process in which the pollutant reduction device 200 operates to remove only pollutants of exhaust gas will now be described with reference to FIGS. 12 and 13.

Figure 12:
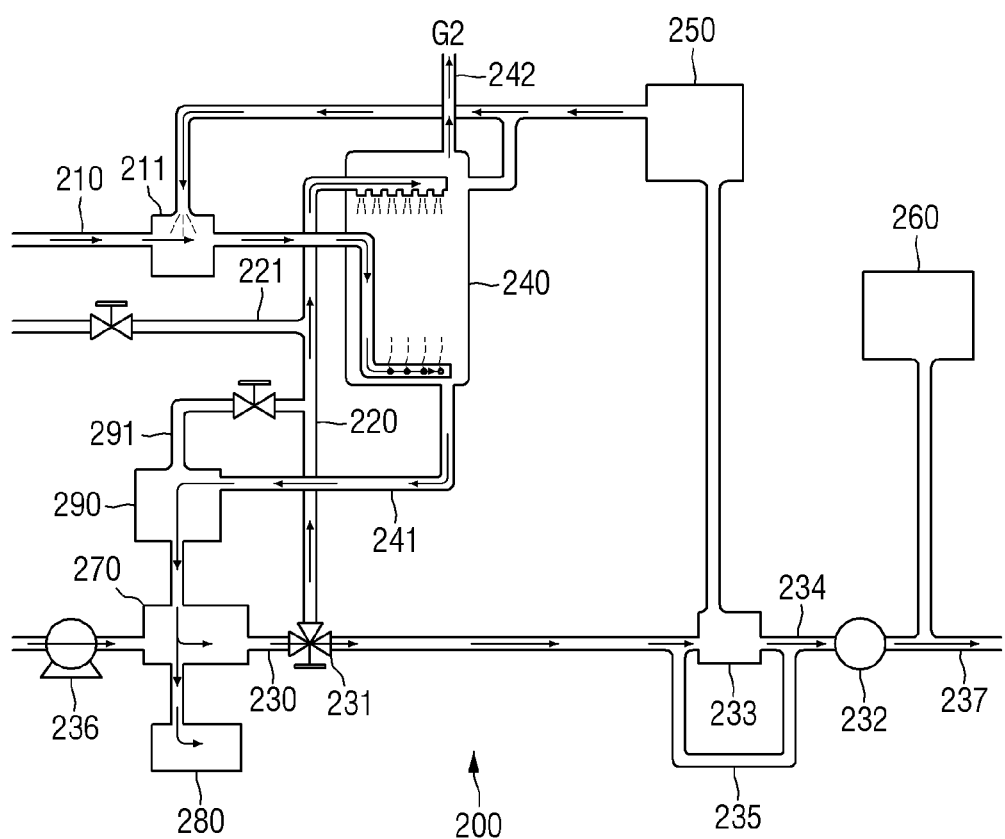

FIG. 12 illustrates a process in which seawater supplied to the seawater supply pipe 230 is directly discharged to the outside after passing through the scrubber 240. FIG. 13 illustrates a process in which seawater supplied to the seawater supply pipe 230 is recirculated through the circulation pipe 291 and reused after passing through the scrubber 240.

Referring to FIG. 12, seawater introduced through the seawater supply pipe 230 is supplied to the scrubber 240 through the cleaning water supply pipe 220. Cleaning water is sprayed from an upper part of the scrubber 240 and may fill a lower part of the scrubber 240 to a certain level.

At this time, exhaust gas supplied through the exhaust gas pipe 210 may be sprayed from the lower part of the scrubber 240. The purification unit 250 may oxidize nitrogen monoxide of the exhaust gas into nitrogen dioxide by spraying an oxidizing agent before the exhaust gas is supplied to the scrubber 240. The purification unit 250 may also spray a neutralizing agent to the exhaust gas pipe 210 or the scrubber 240 in view of the pH value of the cleaning water.

Since the exhaust gas can be sprayed within the cleaning water filling the lower part of the scrubber 240, pollutants such as nitrogen oxides, sulfur oxides and dust can be removed within the cleaning water filling the lower part of the scrubber 240. In addition, the pollutants can be removed again by the cleaning water sprayed from the upper part of the scrubber 240. Through this process, the pollutants in the exhaust gas are removed, and the exhaust gas from which the pollutants have been removed is discharged to the outside through the discharge pipe 242.

The cleaning water that passes through the scrubber 240 contains the pollutants such as the nitrogen oxides, the sulfur oxides and the dust and moves to the filter unit 270 through the cleaning water discharge pipe 241. The filter unit 270 separates pollutants such as solid-phase particles from the cleaning water and stores the separated pollutants in the sludge tank 280. The clean cleaning water is discharged to the outside through the mixing pipe 234 and the seawater discharge pipe 237. Here, if the pH value of the cleaning water passing through the mixing pipe 234 is outside a reference range, the purification unit 250 adjusts the pH value to be within the reference range by injecting the neutralizing agent into the mixing pipe 234 and then discharges the cleaning water to the outside.

Figure 13:
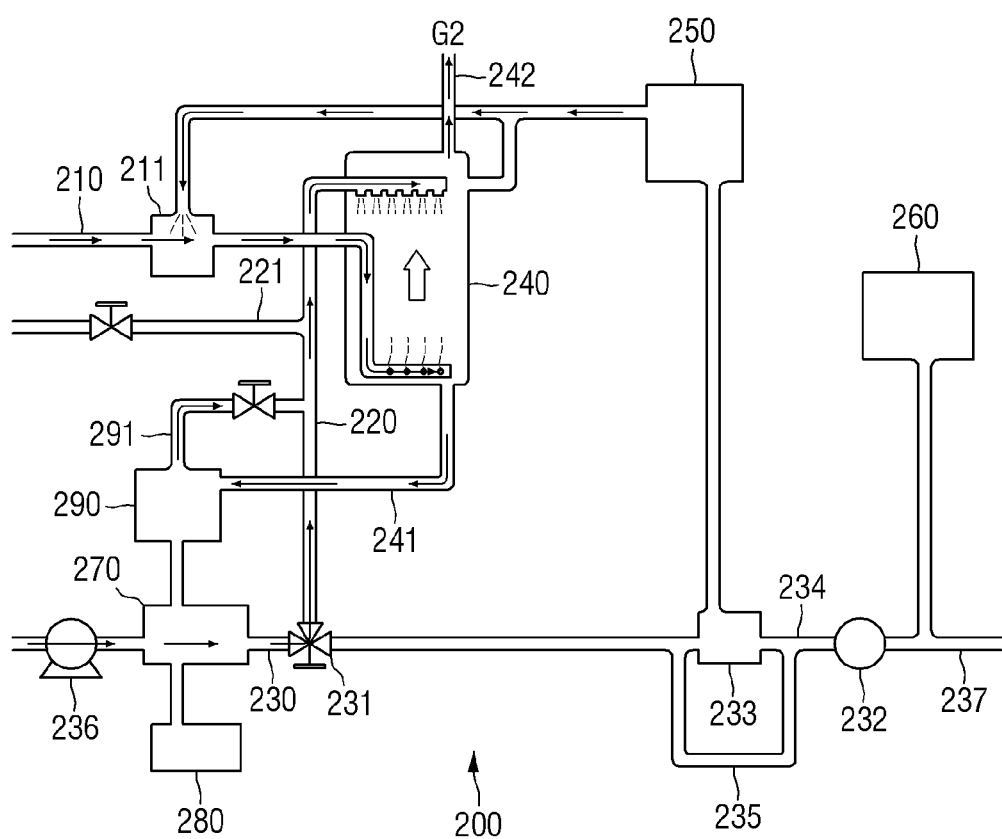

Referring to FIG. 13, seawater introduced through the seawater supply pipe 230 passes through the scrubber 240 to be discharged to the cleaning water discharge pipe 241, and cleaning water discharged to the cleaning water discharge pipe 241 is temporarily stored in the recirculation tank 290 and then circulated back to the cleaning water supply pipe 220 through the circulation pipe 291. That is, the process of FIG. 13 is substantially the same as the process of FIG. 12, except that the cleaning water is recirculated through the circulation pipe 291 to be reused.

The seawater introduced through the seawater supply pipe 230 is circulated sequentially through the cleaning water supply pipe 220, the scrubber 240, the cleaning water discharge pipe 241 and the circulation pipe 291. The process of FIG. 13 and the process of FIG. 12 may be performed together in view of the degree of contamination of the seawater, the pH value, etc. The process of FIG. 13 may be used when the seawater cannot be discharged to the outside, for example, when the ship is passing through an area where the discharge of the seawater is limited. If the cleaning water is highly contaminated due to several recirculations of the cleaning water, it may be discharged to the outside after solid-phase particles are removed from the cleaning water by the filter unit 270. Then, new seawater may be supplied again to the scrubber 240.

The process of FIG. 12 and the process of FIG. 13 can be selectively or sequentially used as needed.

A process in which the pollutant reduction device 200 removes pollutants from exhaust gas and treats ballast water at the same time will now be described with reference to FIGS. 14 and 15.

Figure 14:
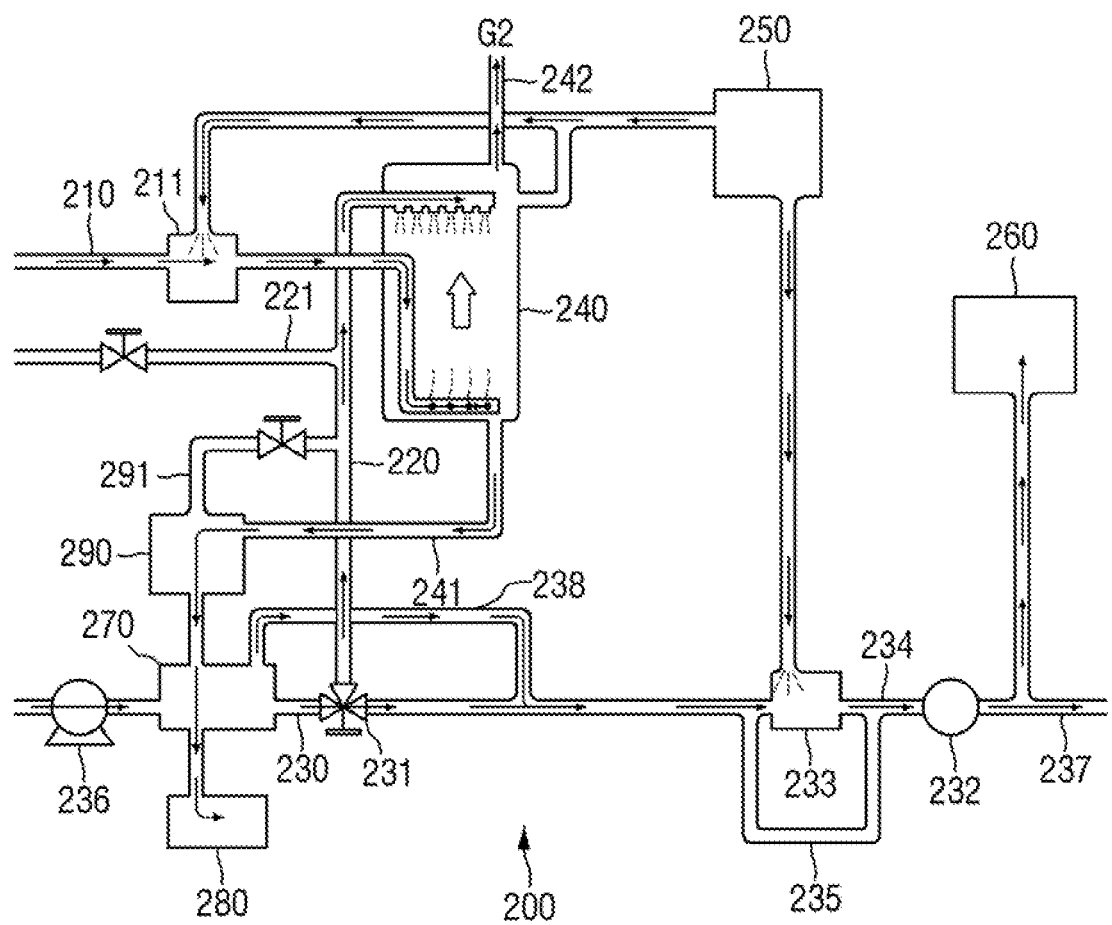

FIG. 14 illustrates an open loop type pollutant removal method and a direct sterilization type ballast water treatment process. FIG. 15 illustrates a closed loop type pollutant removal method and an indirect sterilization type ballast water treatment process.

Referring to FIG. 14, seawater introduced through the seawater supply pipe 230 is supplied to the scrubber 240 through the cleaning water supply pipe 220. Cleaning water is sprayed from the upper part of the scrubber 240 and may fill the lower part of the scrubber 240 to a certain level.

At this time, exhaust gas supplied through the exhaust gas pipe 210 may be sprayed from the lower part of the scrubber 240. The purification unit 250 may oxidize nitrogen monoxide of the exhaust gas into nitrogen dioxide by spraying an oxidizing agent before the exhaust gas is supplied to the scrubber 240. The purification unit 250 may also spray a neutralizing agent to the exhaust gas pipe 210 or the scrubber 240 in view of the pH value of the cleaning water.

Since the exhaust gas can be sprayed within the cleaning water filling the lower part of the scrubber 240, pollutants such as nitrogen oxides, sulfur oxides and dust can be removed within the cleaning water filling the lower part of the scrubber 240. In addition, the pollutants can be removed again by the cleaning water sprayed from the upper part of the scrubber 240. Through this process, the pollutants in the exhaust gas are removed, and the exhaust gas from which the pollutants have been removed is discharged to the outside through the discharge pipe 242.

The cleaning water that passes through the scrubber 240 contains the pollutants such as the nitrogen oxides, the sulfur oxides and the dust and moves to the filter unit 270 through the cleaning water discharge pipe 241. The filter unit 270 separates pollutants such as solid-phase particles from the cleaning water and stores the separated pollutants in the sludge tank 280. The clean cleaning water may flow to the ballast water tank 260 through the seawater supply pipe 230 and the mixing pipe 234 or may be discharged to the outside through the seawater discharge pipe 237. Here, the seawater which was introduced from the outside and has not passed through the scrubber 240 can flow to the seawater supply pipe 230 through the junction pipe 238 installed on a side of the filter unit 270 and can be mixed with the clean cleaning water flowing in the seawater supply pipe 230.

Meanwhile, a sterilizing agent supplied from the purification unit 250 may be injected into a mixture of the cleaning water and the seawater flowing in the seawater supply pipe 230 by the injection unit 233.

Figure 15:
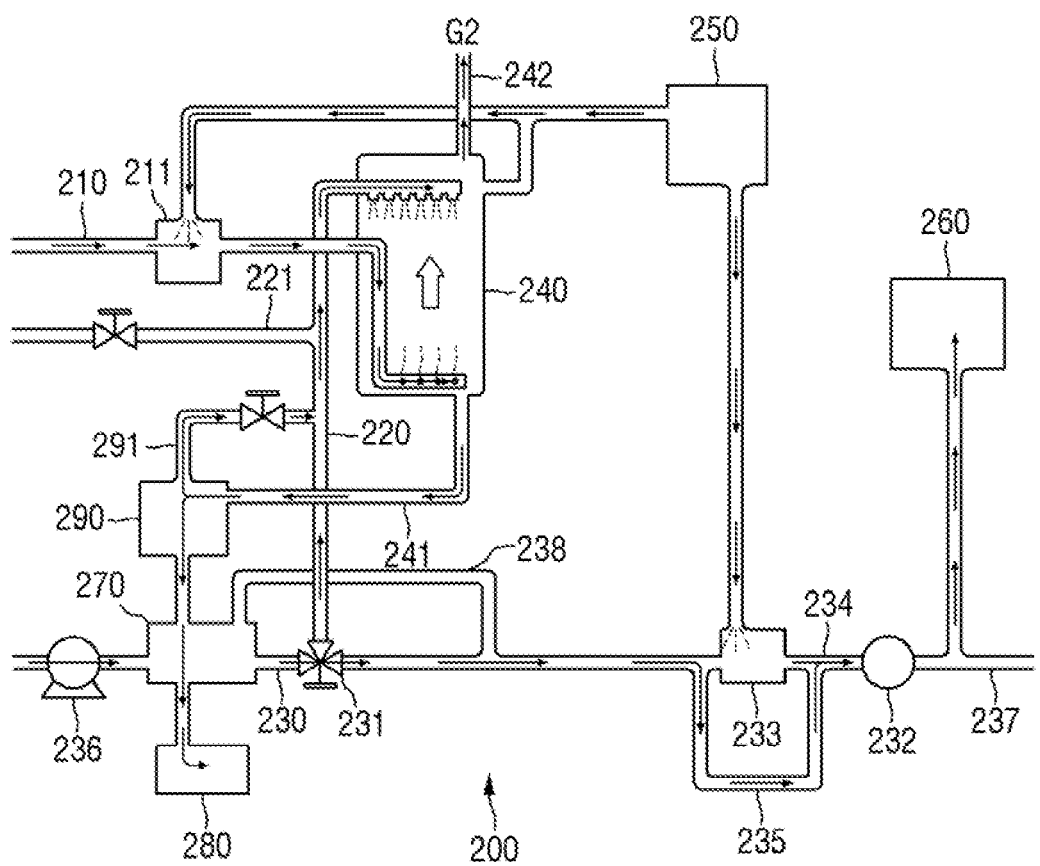

Referring to FIG. 15, seawater introduced through the seawater supply pipe 230 is supplied to the scrubber 240 through the cleaning water supply pipe 220. A portion of cleaning water that passes through the scrubber 240 may be recirculated to the scrubber 240 via the recirculation tank 290, the circulation pipe 291 and the cleaning water supply pipe 220, and the remaining portion of the cleaning water may move to the filter unit 270. That is, the process of FIG. 15 is substantially the same as the process of FIG. 14, except that a portion of the cleaning water that passes through the scrubber 240 is recirculated to the scrubber 240 via the recirculation tank 290, the circulation pipe 291 and the cleaning water supply pipe 220 without being discharged to the outside through the seawater discharge pipe 237.

Meanwhile, a sterilizing agent may be injected into a portion of the seawater flowing in the seawater supply pipe 230 by the injection unit 233, and the remaining portion of the seawater may bypass the injection unit 233 by flowing along the bypass pipe 235 and then may be mixed with seawater flowing in the mixing pipe 234.

The process of FIG. 14 and the process of FIG. 15 may be selectively performed in view of the amount or type of microorganisms present in the seawater, the amount of ballast water required, and the like.

Hereinafter, a pollutant reduction device according to a sixth embodiment of the inventive concept will be described in detail with reference to FIGS. 16 through 23.

Figure 16:
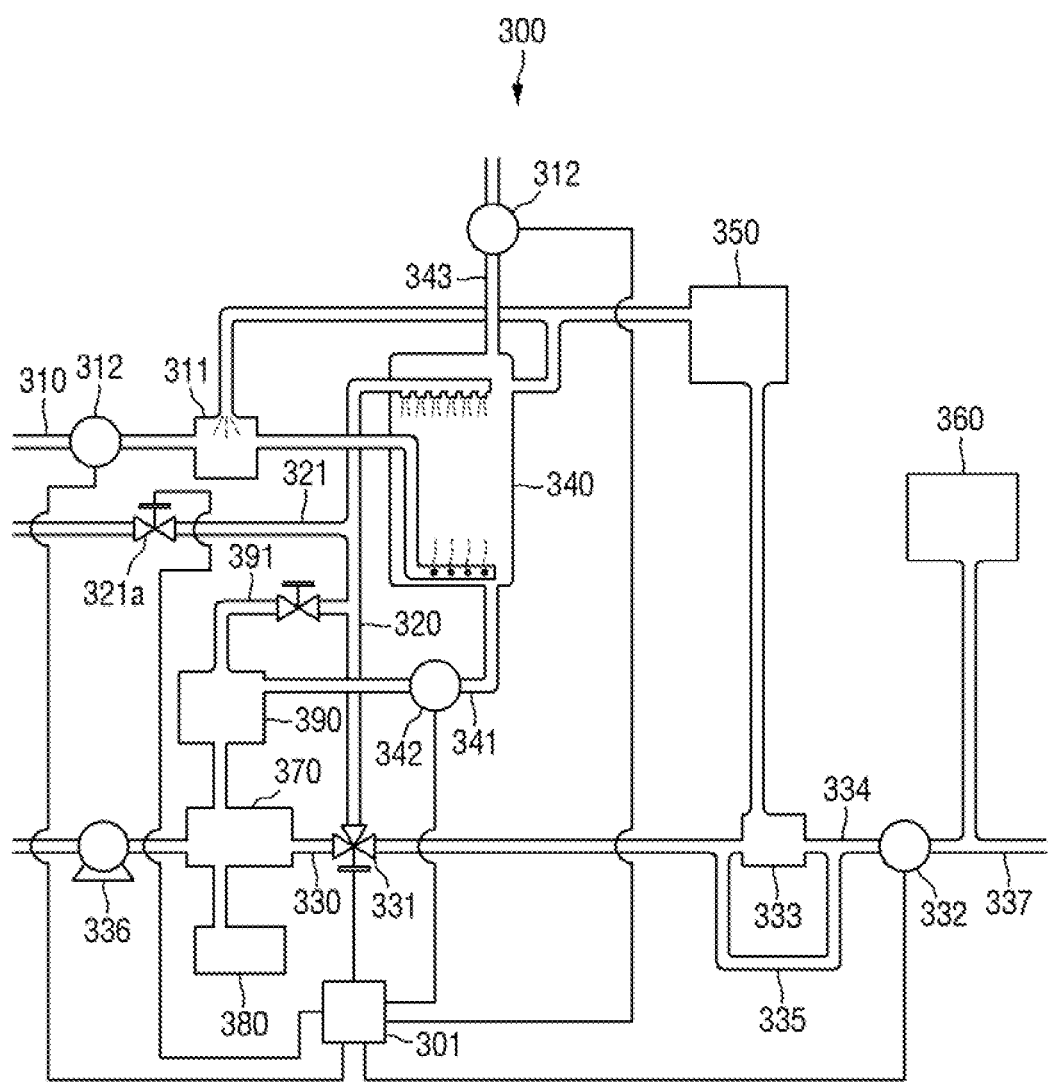
FIGS. 16 and 17 are schematic views of a pollutant reduction device according to a sixth embodiment of the inventive concept.
Figure 17:
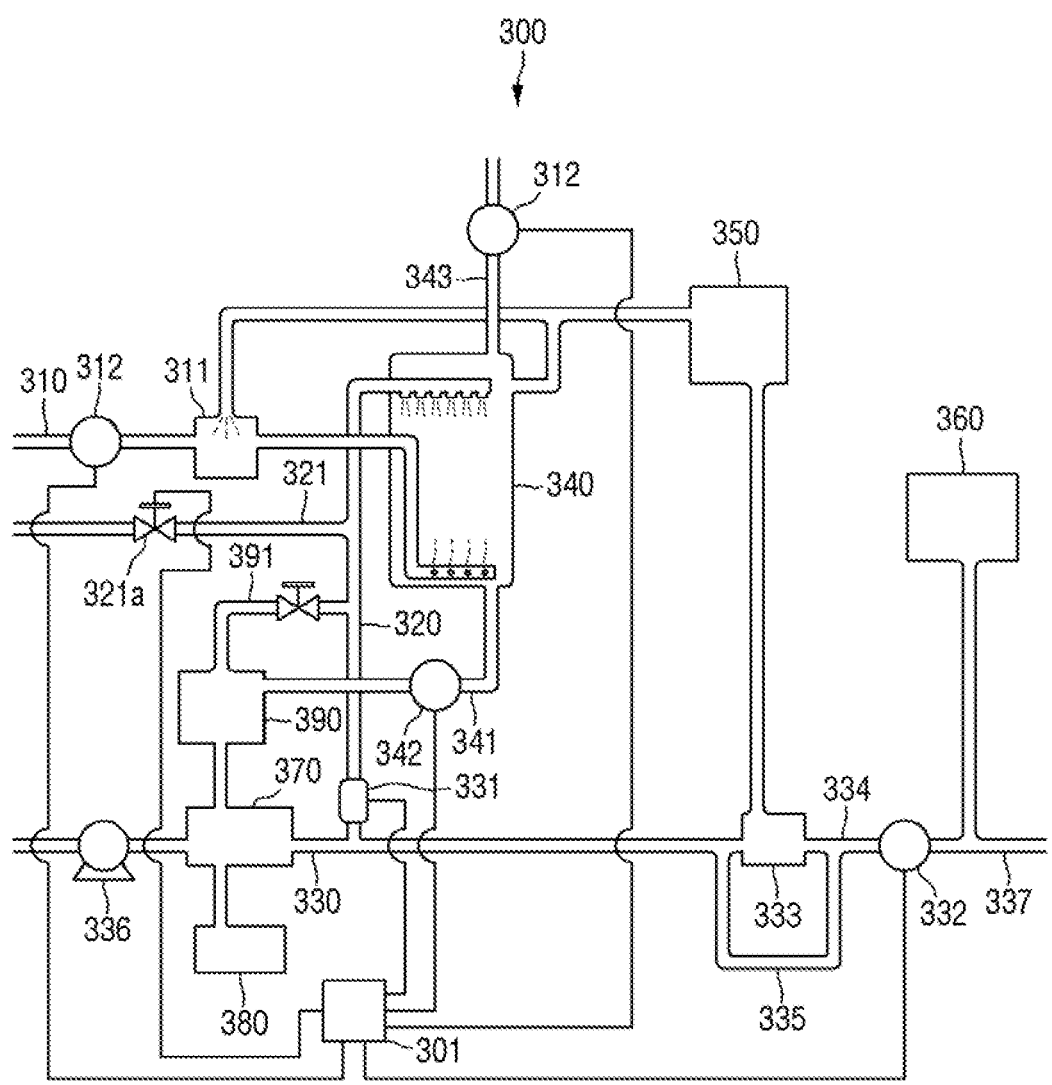

FIGS. 16 and 17 are schematic views of a pollutant reduction device according to a sixth embodiment of the inventive concept.

The pollutant reduction device 300 according to the sixth embodiment of the inventive concept can appropriately maintain and adjust the pH value of treated water discharged from a scrubber system when the pollutant treatment situation varies, for example, when the amount of pollutants contained in exhaust gas increases or decreases relatively. In other words, the pollutant reduction device 300 can control the pH value of the treated water that passes through the scrubber to be maintained at an appropriate level in view of the concentration or the degree of contamination of the exhaust gas, the pollutant treatment capability of the scrubber, and the like. Accordingly, the treated water that passes through the scrubber can be easily handled in various ways, for example, can be reused as ballast water or discharged out of a ship.

The pollutant reduction device 300 according to the inventive concept includes an exhaust gas pipe 310, a cleaning water supply pipe 320, a scrubber 340, a purification unit 350, a cleaning water discharge pipe 341, a control valve 331 which controls the amount of seawater flowing into the scrubber, and a control unit 301 which controls the control valve 331 according to the concentration or the degree of contamination of exhaust gas or the pH value of cleaning water (that is, treated water mentioned above) that passes through the scrubber.

The exhaust gas pipe 310 is a pipe through which exhaust gas moves from a combustion engine and is connected to the scrubber 340. Generated exhaust gas contains a large amount of nitrogen oxides, sulfur oxides and dust and is supplied to the scrubber 340 through the exhaust gas pipe 310 connected to a side of the combustion engine.

The cleaning water supply pipe 320 is a pipe for supplying the scrubber 340 with cleaning water which is at least one of seawater, freshwater, and a mixture of seawater and freshwater. The cleaning water supply pipe 320 branches from a seawater supply pipe 330 which supplies ballast water to a ballast water tank. An end of the cleaning water supply pipe 320 may be connected to the scrubber 340, and a freshwater supply pipe 321 for supplying freshwater may be connected to a side of the cleaning water supply pipe 320. Therefore, the cleaning water supply pipe 320 can selectively receive seawater and freshwater.

A pump 336 may be installed on the seawater supply pipe 330 to smoothly supply the cleaning water to the scrubber 340. The seawater supply pipe 330 receives seawater from the outside and supplies ballast water to the ballast water tank. In particular, the cleaning water supply pipe 320 branches from the seawater supply pipe 330 and is connected to the scrubber 340, and the control valve 331 is installed at a connection portion between the cleaning water supply pipe 320 and the seawater supply pipe 330. The control valve 331 may control the amount seawater supplied through the cleaning water supply pipe 320 or adjust a ratio of seawater supplied to the cleaning water supply pipe 320 to seawater supplied to the ballast water tank 360 through the seawater supply pipe 330.

The control valve 331 controls the amount of seawater flowing into the scrubber 340 through the cleaning water supply pipe 320. For example, as illustrated in FIG. 16, the control valve 331 may include a three-way value which connects the seawater supply pipe 330 and the cleaning water supply pipe 320 and adjusts the amount or proportion of seawater supplied to the cleaning water supply pipe 320. However, the control valve 331 is not limited to the three-way valve. As illustrated in FIG. 17, the control valve 331 may also be formed by connecting a flow control device (such as a flow rate controller) to the cleaning water supply pipe 320 instead of the three-way valve.

That is, although the control valve 331 is expressed as a valve, it is not limited to the valve and can be implemented in various forms including various types of devices capable of controlling the flow amount, flow, flow rate, etc. of a fluid flowing through a pipeline. The control valve 331 may be formed to operate in response to an electric signal of the control unit 301 and may be formed to open or close a pipeline or vary the degree of opening or closing of the pipeline according to a control sequence of the control unit 301.

The control valve 331 may be formed in various forms as long as it can adjust the amount of seawater flowing into the scrubber 340 through the cleaning water supply pipe 320. The control valve 331 may be coupled to a different position on a pipeline according to the form of the control valve 331. For example, when formed as a flow rate controller, the control valve 331 may be formed on the side of the cleaning water supply pipe 320 as illustrated in FIG. 17. When formed as a three-way value, the control valve 331 may be f gamed between the seawater supply pipe 330 and the cleaning water supply pipe 320 as illustrated in FIG. 16. In any case, the control valve 331 may be formed at a position where it can easily adjust the amount of fluid flowing into the scrubber 340 through the cleaning water supply pipe 320. The following description will be made based on the control valve 331 including a three-way valve. The control unit 301 controls the control valve 331 according to the concentration or the degree of contamination of the exhaust gas supplied to the exhaust gas pipe 310 or the pH value of the cleaning water that passes through the scrubber 340. The control unit 301 may include a computing device capable of performing signal input/output, data operation, and the like.

The control unit 301 may receive sensed data from various sensors connected to a pipeline and perform an operation on the sensed data to control the control valve 331. If necessary, it is also possible to input a special control sequence to the control unit 301 so that the control unit 301 can perform the control sequence in response to sensed data.

The concentration or the degree of contamination of the exhaust gas may be determined based on the amount of at least one of sulfur oxides (SOx) and nitrogen oxides (NOx) contained in the exhaust gas. That is, the concentration or the degree of contamination of the exhaust gas may be measured by measuring the amount or concentration of the sulfur oxides in the exhaust gas, the amount or concentration of the nitrogen oxides in the exhaust gas, or the amounts or concentrations of the sulfur oxides and the nitrogen oxides in the exhaust gas. Then, the amount of oxidizing agent injected into the scrubber 340 from the purification unit 350 or the amount of seawater supplied to the scrubber 340 may be adjusted according to the concentration or the degree of contamination of the exhaust gas. To this end, the exhaust gas pipe 310 may be provided with an oxide sensor unit 312 which measures the concentration or amount of at least one of the sulfur oxides and the nitrogen oxides contained in the exhaust gas. However, the inventive concept is not limited to this case, and the oxide sensor unit 312 can also be installed on a discharge pipe 343. In addition, a mixing pipe 334 through which a mixture of the seawater and the cleaning water moves may be formed between a seawater discharge pipe 337, through which the seawater is discharged to the outside, and the control valve 331. A H sensor unit 342 which measures the pH value of the cleaning water or the mixture of the seawater and the cleaning water may be formed on at least one of the cleaning water discharge pipe 341, through which the cleaning water is discharged from the scrubber 340, and the mixing pipe 334. The cleaning water discharge pipe 341 and the mixing pipe 334 will be described in more detail later.

That is, the control unit 301 may measure the concentration or the degree of contamination of the exhaust gas based on a sensing signal of the oxide sensor unit 312 and may measure the pH of the cleaning water that passes through the scrubber 340 based on a sensing signal of the pH sensor unit 342. In this way, the control unit 301 may identify the degree of contamination of the contaminated exhaust gas and the pH value of the treated water discharged from the scrubber 340 after the removal of pollutants (that is, the cleaning water that passes through the scrubber) based on the measured value of each sensor unit. Then, the control unit 301 may appropriately adjust the amount of cleaning water introduced into the scrubber 340 so that the pH value of the cleaning water that passes through the scrubber 340 can be maintained at an appropriate level. The pH value of the cleaning water can also be adjusted by injecting a neutralizing agent into the cleaning water using the purification device 350 or a neutralizing agent storage tank (not illustrated).

In addition, the control unit 301 may control the amount of freshwater supplied to the freshwater supply pipe 321 according to the concentration or the degree of contamination of the exhaust gas or the pH value of the cleaning water that passes through the scrubber 340. For example, a valve 321a formed on the side of the freshwater supply pipe 321 may be connected to the control unit 301 and may be opened or closed by a control signal of the control unit 301. The amount of freshwater supplied can be changed by opening or closing the valve 321a using the control signal of the control unit 301. In this way, according to the concentration or the degree of contamination of the exhaust gas, it is possible to adjust the proportion of seawater or freshwater supplied to the scrubber 340 and maintain the pH value of the cleaning water (at least one of seawater, freshwater, and a mixture of seawater and freshwater) that passes through the scrubber 340 at an appropriate level. This will be described in detail later.

The scrubber 340 is a device for spraying the cleaning water supplied through the cleaning water supply pipe 320 to the exhaust gas introduced through the exhaust gas pipe 310 so that the exhaust gas and the cleaning water can contact each other. The scrubber 340 may be a wet scrubber. Here, an end of the cleaning water supply pipe 320 which is located in the scrubber 340 may be disposed in an upper part of the scrubber 340 and may branch into a plurality of parts to spray the cleaning water in the form of fine particles. That is, the cleaning water supply pipe 320 disposed in the upper part of the scrubber 340 may spray the cleaning water toward a lower part of the scrubber 340 into which the exhaust gas is introduced, thereby effectively bringing the exhaust gas and the cleaning water into contact with each other. As the exhaust gas and the cleaning water come into contact with each other in the scrubber 340, pollutants such as nitrogen oxides, sulfur oxides and dust contained in the exhaust gas may be removed. The exhaust gas from which the pollutants such as the nitrogen oxides, the sulfur oxides and the dust have been removed may be discharged to the outside through the discharge pipe 343. Since the exhaust gas G2 discharged through the discharge pipe 343 is without the pollutants such as the nitrogen oxides, the sulfur oxides and the dust, it meets the exhaust standard and thus can be discharged to the atmosphere as it is. Here, as described above, the exhaust pipe 343 may also be provided with an oxide sensor unit 312 which measures the concentration or amount of at least one of the sulfur oxides and the nitrogen oxides contained in the exhaust gas. Therefore, it is possible to more accurately calculate and compare harmful gas removal or treatment rates by comparing the concentrations of the sulfur oxides and the nitrogen oxides measured at the exhaust gas pipe 310 and the discharge pipe 343, respectively.

Nitric acid ($HNO_3$) and sulfuric acid ($H_2SO_4$) are produced as the nitrogen oxides (NOx) and the sulfur oxides (SOx) are dissolved in the cleaning water, i.e., the seawater. Since the nitric acid and the sulfuric acid are acidic, they can kill microorganisms present in the seawater in the scrubber 340. Here, the pH value of the cleaning water, i.e., the seawater existing in the scrubber 340 may be maintained at 4 to 5.5 at which the maximum sterilizing power is ensured.

The cleaning water, which has absorbed the nitrogen oxides, the sulfur oxides and the dust through the contact with the pollutant-containing exhaust gas in the scrubber 340, is discharged through the cleaning water discharge pipe 341. The cleaning water may be acidic.

The purification unit 350 may be connected to the exhaust gas pipe 310 or the scrubber 340 to physically or chemically oxidize nitrogen-based oxides, to neutralize acidified cleaning water, or to kill microorganisms present in cleaning water. The purification unit 350 may supply an oxidizing agent, a neutralizing agent or a sterilizing agent to the exhaust gas pipe 310 or the scrubber 340. For example, the purification unit 350 may be a device that produces all of the oxidizing agent, the neutralizing agent and the sterilizing agent by electrolyzing seawater or a device that produces the oxidizing agent and the sterilizing agent by using plasma. The purification unit 350 is not limited to the electrolytic device or the plasma device but may be any device capable of oxidizing nitrogen-based oxides, neutralizing acidified cleaning water, or killing microorganisms present in cleaning water.

The purification unit 350 may oxidize nitrogen monoxide contained in the exhaust gas into nitrogen dioxide by spraying the oxidizing agent to the exhaust gas pipe 210. The nitrogen dioxide is easily dissolved in water as compared with the nitrogen monoxide. Therefore, the nitrogen dioxide can be easily dissolved in the cleaning water in the scrubber 340 and thus can be easily removed. The purification unit 350 may atomize a liquid oxidizing agent and spray the atomized liquid oxidizing agent to the exhaust gas pipe 310. The purification 350 may atomize a liquid oxidizing agent and spray the atomized liquid oxidizing agent directly to the exhaust gas pipe 310 or spray a liquid oxidizing agent to the exhaust gas through a spray unit 311 installed on the exhaust gas pipe 310. The oxidizing agent sprayed to the exhaust gas may be produced by the electrolysis of the seawater as described above, may be produced by corona discharge in the exhaust gas, or may be produced by an ozone generator. The oxidizing agent may be, for example, at least one of sodium hypochlorite (NaOCl), hypochlorous acid (HOCl), and ozone. That is, when the oxidizing agent s produced by the electrolysis of the seawater, it may be sodium hypochlorite (NaOCl) or hypochlorous acid (HOCl). When the oxidizing agent is produced by corona discharge in the exhaust gas or produced by the ozone generator, it may be ozone. Since the ozone has excellent sterilizing power, it can kill microorganisms present in the seawater. However, the oxidizing agent is not limited to at least one of sodium hypochlorite (NaOCl), hypochlorous acid (HOCl), and ozone. For example, the oxidizing agent may also be a chemical such as hydrogen peroxide ($H_2O_2$) or chlorine dioxide ($ClO_2$). The purification unit 350 may increase the amount of the oxidizing agent injected into the exhaust gas pipe 310 when the concentration of the exhaust gas discharged from the ship has to be lowered.

The purification unit 350 may receive a sensing signal from, e.g., the oxide sensor unit 312 described above and may adjust the amount of the oxidizing agent injected into the exhaust gas pipe 310 according to the amount of at least one of the sulfur oxides and the nitrogen oxides in the exhaust gas. For example, the control unit 301 may be connected to the purification unit 350 and control the purification unit 350 to operate as described above. Here, the purification unit 350 may also spray the neutralizing agent to the exhaust gas pipe 310 or spray the neutralizing agent to the scrubber 340. The neutralizing agent can neutralize the cleaning water acidified by the reaction of the nitrogen oxides and the sulfur oxides with the cleaning water. Since the nitrogen oxides and the sulfur oxides react with seawater to produce nitric acid ($HNO_3$) and sulfuric acid ($H_2SO_4$), respectively, the purification unit 350 may neutralize the acidified cleaning water by spraying sodium hypochlorite (NaOCl) to the scrubber 340. The purification unit 350 may also neutralize ballast water or reduce excessive total residual oxidant by spraying the neutralizing agent to the ballast water tank 360 or spraying the neutralizing agent to the seawater discharge pipe 337. Here, the purification unit 350 may spray sodium thiosulfate ($Na_2S_2O_3$) at the same time as spraying the neutralizing agent to the ballast water tank 360. In addition, when the amount of seawater introduced from the outside increases, the purification unit 350 may kill microorganisms by increasing the amount of the sterilizing agent injected into the scrubber 340. At this time, the sterilizing power can be improved by irradiating ultraviolet rays into the scrubber 340 or injecting a photocatalyst into the scrubber 340.

Furthermore, the neutralizing agent or the sterilizing agent may be injected into the seawater supply pipe 330 or the ballast water tank 360 depending on the measured value of the pH sensor unit 342 described above, and the amount of the neutralizing agent or the sterilizing agent injected may be appropriately changed according to the measured value of the pH sensor unit 342. Even in this case, the purification unit 350 can be easily controlled by, for example, connecting the control unit 301 to the purification unit 350.

The purification unit 350 can inject the neutralizing agent (NaOH) directly into the scrubber 340. If the cleaning water is not sufficiently neutralized by the purification unit 350, a neutralizing agent injection unit (not illustrated) may be added to perform an additional neutralization operation.

The cleaning water discharge pipe 341 is a pipe for discharging the cleaning water inside the scrubber 340 and may be connected back to the seawater supply pipe 330 by a filter unit 370.

A circulation pipe 391 may be connected to the cleaning water discharge pipe 341.

A recirculation tank 390 may be installed between the cleaning water discharge pipe 341 and the circulation pipe 391.

The recirculation tank 390, like the filter unit 370, may include any one of a centrifuge, a gravity separator and a filter to remove solid-phase particles included in the cleaning water and to recirculate the cleaning water through the circulation pipe 391.

Since the cleaning water supply pipe 320 is connected to the seawater supply pipe 330, the freshwater supply pipe 321 and the circulation pipe 391, it can appropriately mix seawater, freshwater and circulating water in view of the concentration of the exhaust gas, the treatment capacity of the scrubber 340, the concentration and the degree of contamination of the cleaning water, etc. and supply the mixture to the scrubber 340.

The filter unit 370 is installed behind the scrubber 340 to separate solid-phase particles from the cleaning water discharged from the scrubber 340. The filter unit 370 may separate the solid-phase particles using at least one of a centrifuge, a gravity separator and a filter and discharge the solid-phase particles to a sludge tank 380. Both the seawater introduced from the outside and the cleaning water that passes through the scrubber 340 can be filtered by one filter unit 370. In addition, a junction pipe 338 (see FIG. 22) connected directly to the seawater supply pipe 330 behind the control valve 331 may be installed on a side of the filter unit 370.

The neutralizing agent or the sterilizing agent supplied from the purification unit 350 may be sprayed to the cleaning water or the seawater that passes through the filter unit 370 as described above. In addition, one or two filter units 370 may be used. Here, the one or two filter units 370 may be used in common or independently to remove a material having large particles from the cleaning water that passes through the cleaning water discharge pipe 341 or from the seawater that passes through the seawater supply pipe 330. The mixing pipe 334 for discharging a mixture of the seawater and the cleaning water may be installed between the filter unit 370 and the seawater discharge pipe 337, and an injection unit 333 may be installed to inject the neutralizing agent or the sterilizing agent supplied from the purification unit 350 into the mixing pipe 334. The injection unit 333 may inject the neutralizing agent or the sterilizing agent into the seawater and the cleaning water in a liquid or gaseous state.

A sensor unit 332 may be installed behind the injection unit 333 to identify, in real time, total residual oxidant, pH concentration, microbial concentration, etc. in the cleaning water and the seawater discharged through the mixing pipe 334. The purification unit 350 appropriately adjusts the amounts of the oxidizing agent, the neutralizing agent and the sterilizing agent supplied according to the result value of the sensor unit 332. The cleaning water and the seawater discharged through the mixing pipe 334 may flow into the ballast water tank 360 or may be discharged to the outside. The sensor unit 332 may be installed on the mixing pipe 334 to measure the pH value. The sensor unit 332 can be thought as a pH sensor unit installed on the mixing pipe 334. That is, the pH value of the cleaning water that passes through the scrubber 340 can be measured directly by the pH sensor unit 342 installed on the cleaning water discharge pipe 341 or can be measured indirectly from the pH value of the sensor unit 332 installed on the mixing pipe 334. By utilizing the measured value of each sensor unit in a complementary manner or selectively taking an appropriate value, it is possible to more accurately identify the pH value or the variation in the pH value of treated water that passes through the scrubber 340.

The ballast water tank 360 stores the cleaning water discharged through the cleaning water discharge pipe 341. At least one ballast water tank 360 may be installed in the ship. As described above, the cleaning water discharged through the cleaning water discharge pipe 341 has absorbed the nitrogen oxides, the sulfur oxides and the dust contained in the exhaust gas. Therefore, the hydrogen ion exponent, i.e., the pH value of the cleaning water flowing in the cleaning water discharge pipe 341 is lower than that of the cleaning water flowing in the cleaning water supply pipe 320.

That is, since the survival rate of microorganisms is low in the acidified cleaning water flowing in the cleaning water discharge pipe 341, the cleaning water satisfies the ballast water regulatory conditions that require microorganisms having a certain size or more to be killed. Therefore, the cleaning water can be used as ballast water.

The purification unit 350 can supply the sterilizing agent directly to the ballast water tank 360.

A method of reducing exhaust and water pollutants according to the inventive concept includes: (a) receiving exhaust gas from a combustion engine and seawater from the outside; (b) oxidizing nitrogen-based oxides in the exhaust gas by spraying an oxidizing agent to the exhaust gas and then supplying the exhaust gas to the scrubber 340; and spraying the seawater into the scrubber 340 to remove pollutants contained in the exhaust gas and, at the same time, to kill microorganisms present in the seawater. The exhaust gas and the seawater can be selectively purified by varying the amount of the exhaust gas introduced from the combustion engine and the amount of the seawater introduced from the outside.

In addition, the method of reducing exhaust and water pollutants may further include: (d) separating solid-phase particles from the seawater that passes through the scrubber 340; and (e) injecting a neutralizing agent into the seawater from which the solid-phase particles have been separated or into cleaning water acidified in the scrubber after operation (c).

The exhaust gas of the combustion engine may be introduced into the scrubber 340 through the exhaust gas pipe 310, and the seawater may be introduced into the scrubber 340 through the seawater supply pipe 330 and the cleaning water supply pipe 320 (operation Here, the purification unit 350 may oxidize the nitrogen-based oxides by spraying the oxidizing agent to the exhaust gas before the exhaust gas is introduced into the scrubber 340 (operation (b)). The oxidizing agent may be produced by the electrolysis of the seawater, by corona discharge in the exhaust gas, or by an ozone generator. The oxidizing agent may be at least one of sodium hypochlorite (NaOCl), hypochlorous acid (HOCl), and ozone. In addition, the purification unit 350 may increase the amount of the oxidizing agent injected into the exhaust gas pipe 310 when the concentration of the exhaust gas discharged from the ship has to be lowered, for example, when the ship enters an emission control area (ECA).

The scrubber 340 may spray the seawater to the exhaust gas introduced through the exhaust gas pipe 310 to remove pollutants such as the nitrogen-based oxides, sulfur oxides and dust contained in the exhaust gas and, at the same time, to kill microorganisms present in the seawater (operation (c)). That is, the nitrogen-based oxides and the sulfur oxides contained in the exhaust gas may be dissolved in the seawater and thus removed, and nitric acid and sulfuric acid produced by the dissolution of the nitrogen-based oxides and the sulfur oxides in the seawater may kill the microorganisms present in the seawater. Here, the microorganisms present in the seawater may also be killed by the ozone produced by the corona discharge in the exhaust gas or produced by the ozone generator. The pH value of the seawater existing in the scrubber 340 may be maintained at 4 to 5.5 at which the maximum sterilizing power can be ensured.

The microorganisms present in the seawater can also be killed by a sterilizing agent supplied from the purification unit 350. When the amount of the seawater introduced from the outside increases, the purification unit 350 may increase the amount of the sterilizing agent introduced into the scrubber 340 to kill microorganisms present in the seawater. The seawater whose microorganisms have been killed can be used as ballast water of the ship. When the ship loads the ballast water into the ballast water tank 360 or discharges the ballast water from the ballast water tank 360, the purification unit 350 may increase the amount of the sterilizing agent injected.

The solid-phase particles may be separated from the seawater that passes through the scrubber 340 by the filter unit 370 (operation (d)). The seawater from which the solid-phase particles have been separated may be used as the ballast water of the ship, may be discharged directly to the outside, or may be recirculated back to the scrubber 340. Alternatively, the seawater from which the solid-phase particles have been separated may be mixed with seawater directly introduced from the outside and then used as the ballast water or discharged to the outside. Here, the neutralizing agent may be injected from the purification unit 350 into the seawater from which the solid-phase particles have been separated by the filter unit 370.

The operation of the pollutant reduction device 300 will now be described in more detail with reference to FIGS. 18 through 23.

Figure 18:
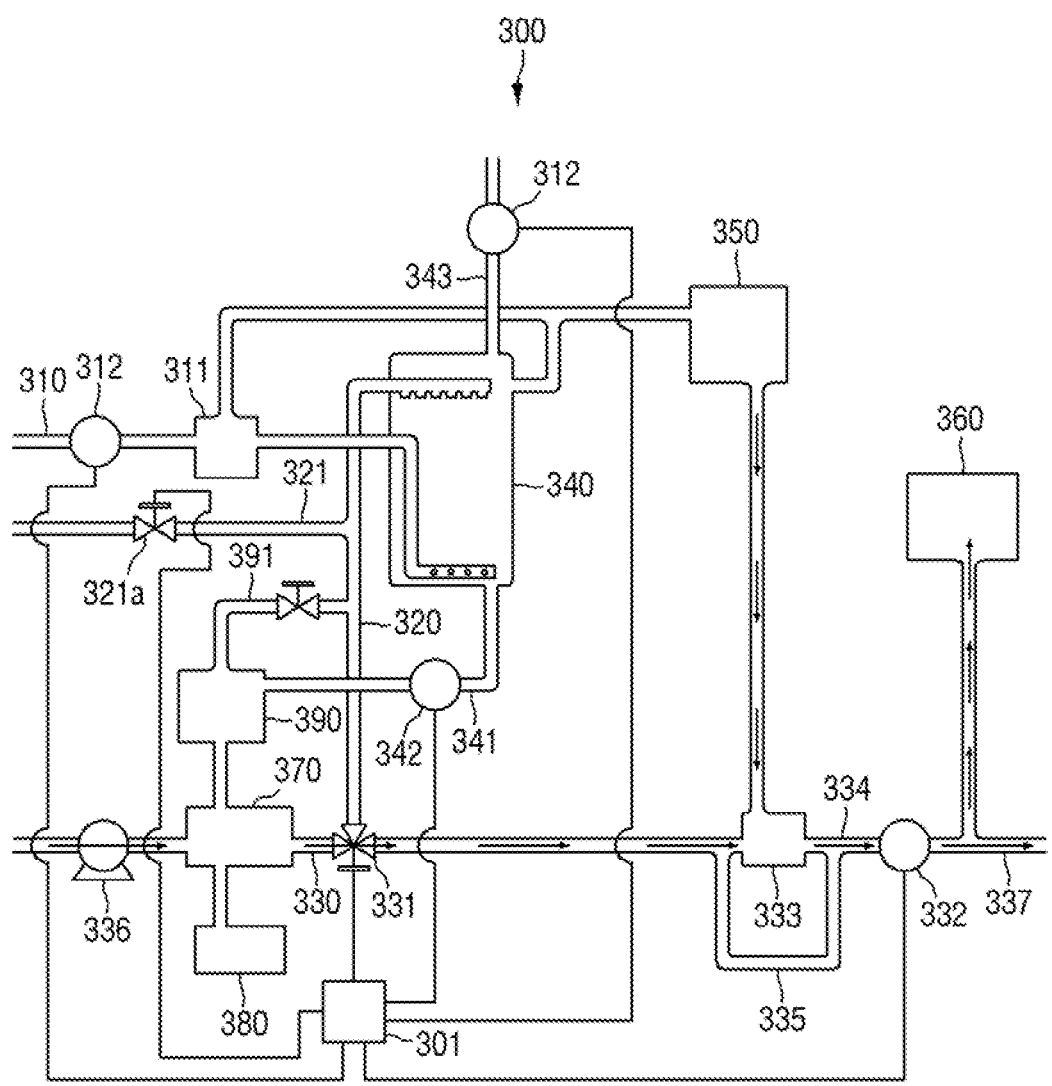
FIGS. 18 through 23 illustrate the operation of the pollutant reduction device according to the sixth embodiment of the inventive concept.
Figure 19:
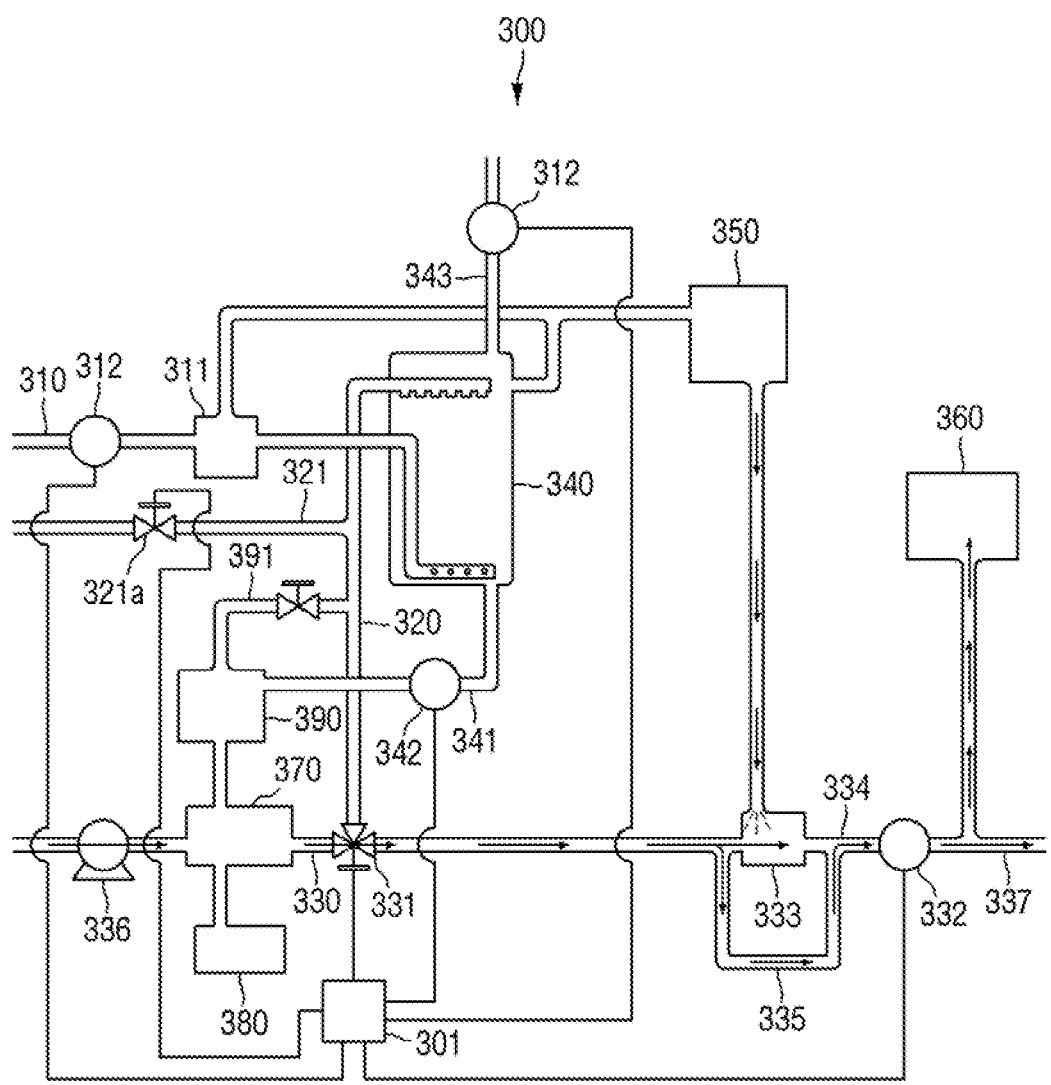

FIGS. 18 and 19 illustrate a process in which seawater introduced through the seawater supply pipe 330 is supplied as ballast water. FIG. 18 illustrates a direct sterilization method in which a sterilizing material is injected into the entire seawater supplied as ballast water. FIG. 19 illustrates an indirect sterilization method in which a sterilizing material is injected into a portion of seawater supplied as ballast water, and the portion of the seawater is mixed with seawater supplied from the outside.

Referring to FIG. 18, as seawater supplied through the seawater supply pipe 330 passes through the filter unit 370, microorganisms having large particles are removed.

A sterilizing agent supplied from the purification unit 350 may be sprayed to the seawater that passed through the filter unit 370. The seawater whose microorganisms have been killed by the spraying of the sterilizing agent may be supplied to the ballast water tank 360 and used as ballast water.

Referring to FIG. 19, as seawater supplied through the seawater supply pipe 330 passes through the filter unit 370, microorganisms having large particles are removed. A portion of the seawater may be discharged through the mixing pipe 334, and most of the seawater may be discharged through a bypass pipe 335. The mixing pipe 334 is a pipe to which a sterilizing agent is sprayed from the purification unit 350, and the bypass pipe 335 is a pipe through which the seawater that passes through the filter unit 370 directly flows into the ballast water tank 360.

The seawater that passes through the mixing pipe 334 is without microorganisms because the microorganisms have been killed by the sterilizing agent contained in the seawater. If the seawater that passes through the mixing pipe 334 and the seawater that passes through the bypass pipe 335 are mixed with each other, microorganisms present in the seawater that passes through the bypass pipe 335 may all be killed.

The amounts or the proportions of the seawater passing through the mixing pipe 334 and the seawater passing through the bypass pipe 335 can be selectively adjusted according to the concentration of microorganisms in the seawater, the microorganism removal method, and the like.

As described above with reference to FIGS. 18 and 19, the pollutant reduction device 300 can treat ballast water independently without using the exhaust removal function. The processes of FIG. 18 and FIG. 19 can be used mostly when a ship fills the ballast water tank 360 with ballast water at a harbor or empties the ballast water tank 360.

A process in which the pollutant reduction device 300 operates to remove only pollutants of exhaust gas will now be described with reference to FIGS. 20 and 21.

Figure 20:
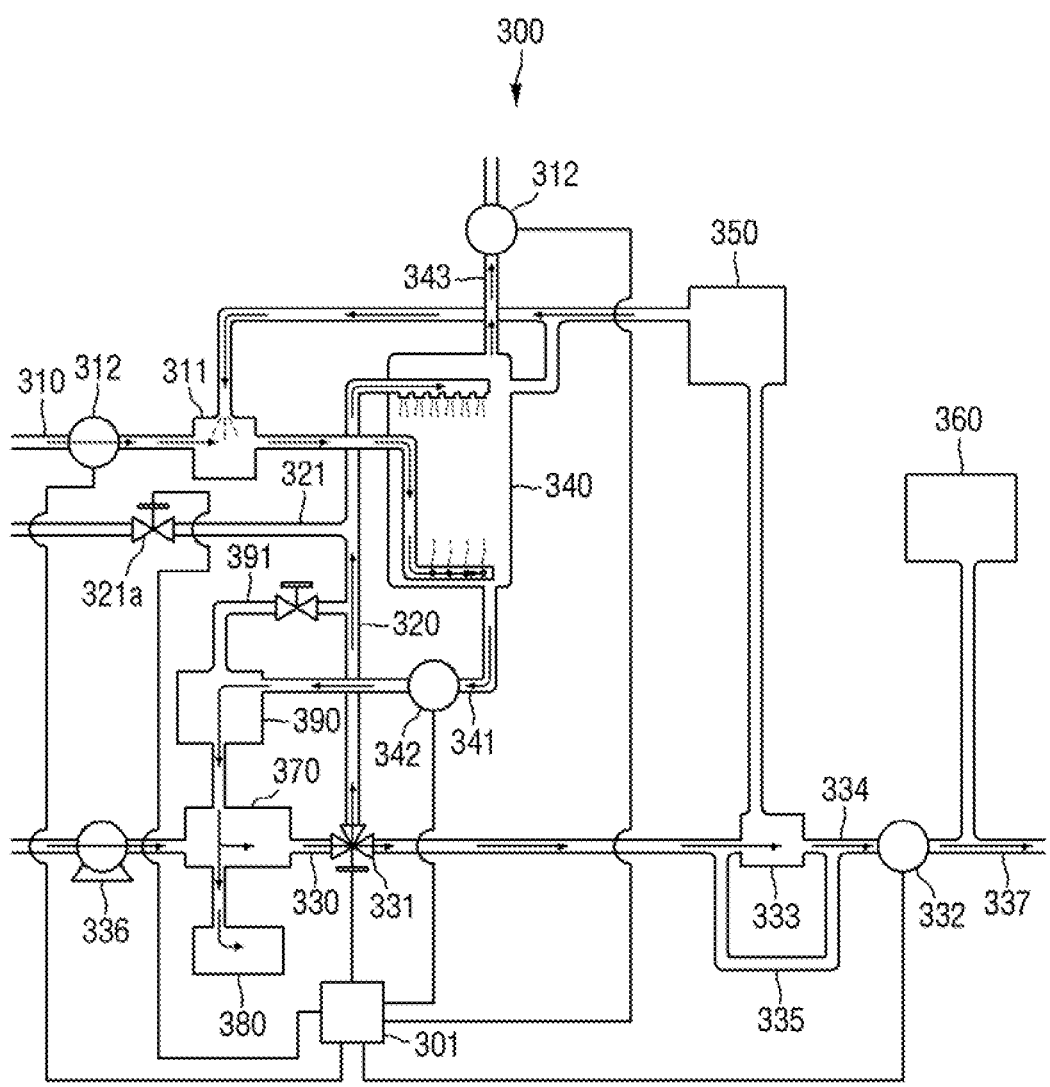

FIG. 20 illustrates a process in which seawater supplied to the seawater supply pipe 330 is directly discharged to the outside after passing through the scrubber 340. FIG. 21 illustrates a process in which seawater supplied to the seawater supply pipe 330 is recirculated through the circulation pipe 391 and reused after passing through the scrubber 340.

Referring to FIG. 20, seawater introduced through the seawater supply pipe 330 is supplied to the scrubber 340 through the cleaning water supply pipe 320.

At this time, exhaust gas supplied through the exhaust gas pipe 310 may be sprayed from the lower part of the scrubber 340. The purification unit 350 may oxidize nitrogen monoxide of the exhaust gas into nitrogen dioxide by spraying an oxidizing agent before the exhaust gas is supplied to the scrubber 340. The purification unit 350 may also spray a neutralizing agent to the scrubber 340 in view of the pH value of cleaning water.

Since the exhaust gas can be sprayed within the cleaning water filling the lower part of the scrubber 340, pollutants such as nitrogen oxides, sulfur oxides and dust can be removed within the cleaning water filling the lower part of the scrubber 340. In addition, the pollutants can be removed again by the cleaning water sprayed from the upper part of the scrubber 340. Through this process, the pollutants in the exhaust gas are removed, and the exhaust gas from which the pollutants have been removed is discharged to the outside through the discharge pipe 343.

The cleaning water that passes through the scrubber 340 contains the pollutants such as the nitrogen oxides, the sulfur oxides and the dust and moves to the filter unit 370 through the cleaning water discharge pipe 341. The filter unit 370 separates pollutants such as solid-phase particles from the cleaning water and stores the separated pollutants in the sludge tank 380. The clean cleaning water is discharged to the outside through the mixing pipe 334 and the seawater discharge pipe 337. Here, if the pH value of the cleaning water passing through the mixing pipe 234 is outside a reference range, the purification unit 350 adjusts the pH value to be within the reference range by injecting the neutralizing agent into the mixing pipe 334 and then discharges the cleaning water to the outside.

In particular, the oxide sensor unit 312 measures the concentration or amount of at least one of the sulfur oxides and the nitrogen oxides in the exhaust gas supplied to the exhaust gas pipe 310 and transmits the measured concentration or amount to the control unit 301. Then, the control unit 301 identifies the concentration or the degree of contamination of the exhaust gas based on the measured concentration or amount. Therefore, the controller 301 can appropriately adjust the amount of seawater introduced to the scrubber 340 through the cleaning water supply pipe 320 by controlling the control valve 331 based on the identified concentration or degree of contamination of the exhaust gas. Further, the control unit 301 can adjust the amount of freshwater supplied to the scrubber 340 by controlling the valve 321a formed on the side of the freshwater supply pipe 321.

That is, using the control unit 301, it is possible to adjust the amount of seawater or freshwater supplied to the scrubber 340 and appropriately adjust the supplied amount of the cleaning water which is at least one of seawater, freshwater and a mixture of seawater and freshwater, so that the scrubber 340 can smoothly treat pollutants according to the degree of contamination of the exhaust gas or a change in the concentration of the exhaust gas. Such control takes into account only the degree of contamination or the concentration of the exhaust gas or the inflow rate of the exhaust gas, but also the pH value of the cleaning water that passes through the scrubber 340. That is, a pH value measured by the pH sensor unit 342 and a pH value measured by the sensor unit 332 may be continuously monitored to identify the pH value distribution, fluctuations, etc. of the cleaning water that passes through the scrubber 340 or a mixture of the cleaning water and the seawater. Then, the amount of the cleaning water supplied to the scrubber 340 can be very easily adjusted so that the pH value does not deviate from an appropriate level.

For example, when fuels (such as marine gas oil (MGO) and heavy fuel oil (HFO)) having different concentrations of sulfur oxides or nitrogen oxides are used in a generator or a boiler, the amount of the cleaning water supplied to the scrubber 340 to treat the exhaust gas generated from the fuels can be more accurately adjusted based on values of the sulfur oxides and the nitrogen oxides measured by the oxide sensor unit 312 installed on the exhaust gas pipe 310. In addition, when the concentrations of the sulfur oxides and the nitrogen oxides are relatively high, the amount of the oxidizing agent supplied frog the purification unit 350 to the exhaust gas pipe 310 may be increased so that the pollutants can be more easily dissolved in the cleaning water.

Furthermore, since the cleaning water is acidified as the pollutants such as the nitrogen oxides and the sulfur oxides are treated into nitric acid and sulfuric acid in the scrubber 340, the amount of the cleaning water injected into the scrubber 340 may be changed through the control of the controller 301, and the pH value of the cleaning water passing through the scrubber 340 may be adjusted by increasing or decreasing the amount of the cleaning water supplied. The cleaning water that passes through the scrubber 340 is mixed with the seawater and then discharged to the outside as illustrated in FIG. 20. Therefore, the amount of the cleaning water supplied to the scrubber 340 may be adjusted so that the cleaning water is maintained at a pH value of 6.5 or more. If necessary, the amount of the neutralizing agent injected may also be adjusted to control the pH value.

Figure 21:
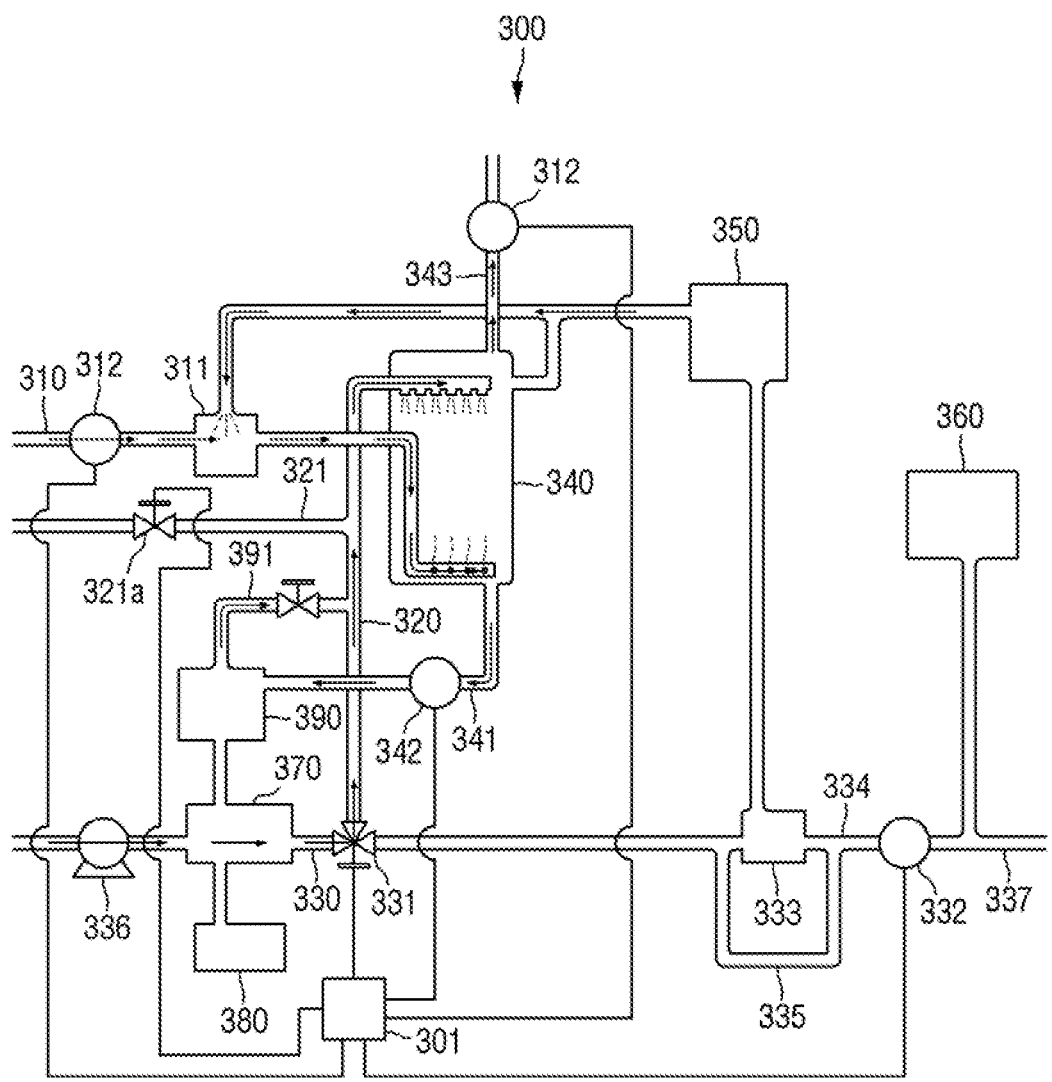

Referring to FIG. 21, seawater introduced through the seawater supply pipe 330 passes through the scrubber 340 to be discharged to the cleaning water discharge pipe 341, and cleaning water discharged to the cleaning water discharge pipe 341 is temporarily stored in the recirculation tank 390 and then circulated back to the cleaning water supply pipe 320 through the circulation pipe 391. That is, the process of FIG. 21 is substantially the same as the process of FIG. 20, except that the cleaning water is recirculated through the circulation pipe 391 to be reused.

The seawater introduced through the seawater supply pipe 330 is circulated sequentially through the cleaning water supply pipe 320, the scrubber 340, the cleaning water discharge pipe 341 and the circulation pipe 391. The process of FIG. 21 and the process of FIG. 20 may be performed together in view of the degree of contamination of the seawater, the pH value, etc. The process of FIG. 21 may be used when the seawater cannot be discharged to the outside, for example, when the ship is passing through an ECA where the discharge of the seawater is limited. If the cleaning water is highly contaminated due to several recirculations of the cleaning water, it may be discharged to the outside after solid-phase particles are removed from the cleaning water by the filter unit 370. Then, new seawater may be supplied again to the scrubber 340.

The process of FIG. 20 and the process of FIG. 21 can be selectively or sequentially used as needed.

A process in which the pollutant reduction device 300 removes pollutants from exhaust gas and treats ballast water at the same time will now be described with reference to FIGS. 22 and 23.

Figure 22:
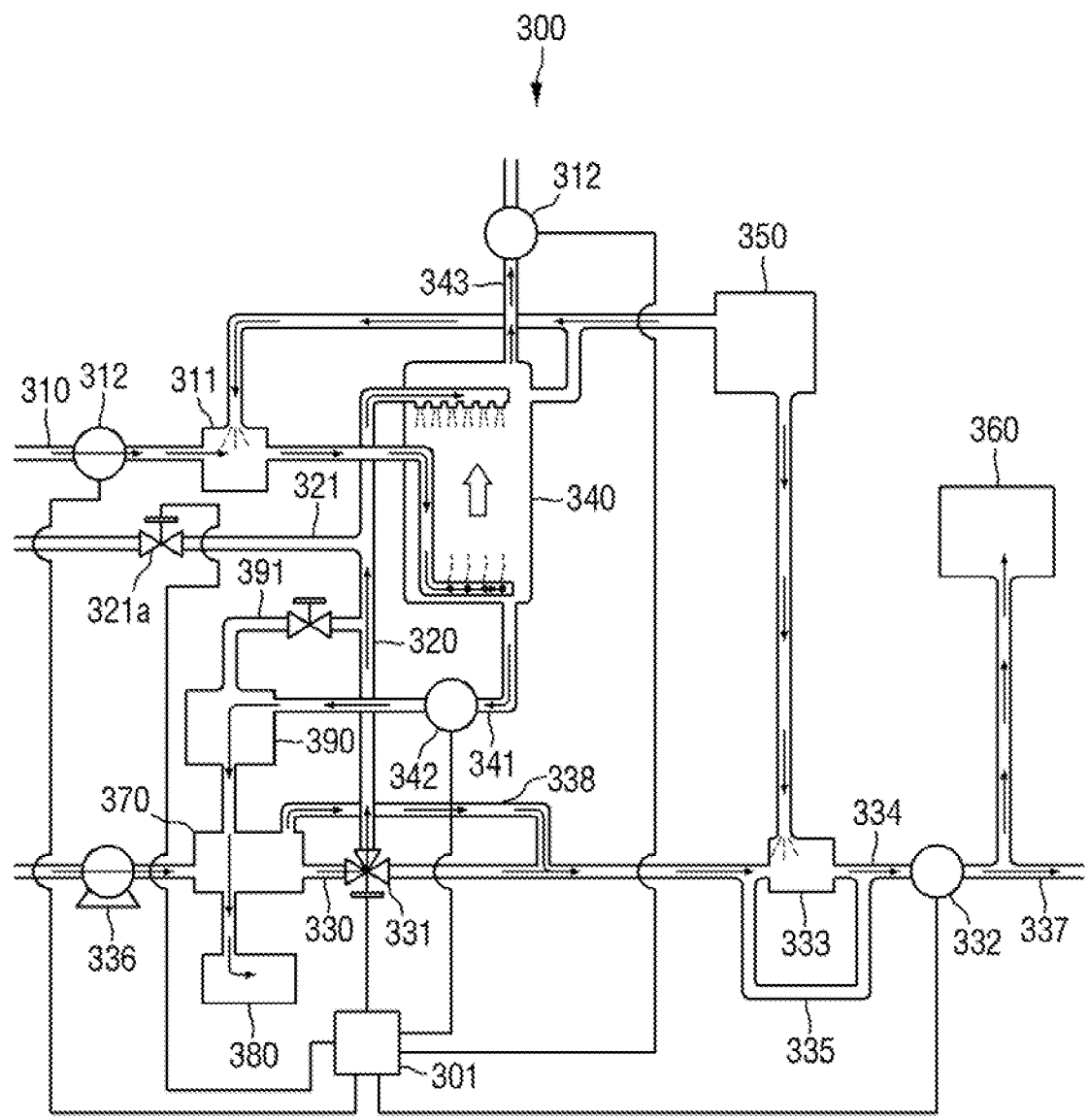

FIG. 22 illustrates an open loop type pollutant removal method and a direct sterilization type ballast water treatment process. FIG. 23 illustrates a closed loop type pollutant removal method and an indirect sterilization type ballast water treatment process.

Referring to FIG. 22, seawater introduced through the seawater supply pipe 330 is supplied to the scrubber 340 through the cleaning water supply pipe 320.

At this time, exhaust gas supplied through the exhaust gas pipe 310 may be sprayed from the lower part of the scrubber 340. The purification unit 350 may oxidize nitrogen monoxide of the exhaust gas into nitrogen dioxide by spraying an oxidizing agent before the exhaust gas is supplied to the scrubber 340. The purification unit 350 may also spray a neutralizing agent to the scrubber 340 in view of the pH value of cleaning water.

Since the exhaust gas can be sprayed within the cleaning water filling the lower part of the scrubber 340, pollutants such as nitrogen oxides, sulfur oxides and dust can be removed within the cleaning water filling the lower part of the scrubber 340. In addition, the pollutants can be removed again by the cleaning water sprayed from the upper part of the scrubber 340. Through this process, the pollutants in the exhaust gas are removed, and the exhaust gas from which the pollutants have been removed is discharged to the outside through the discharge pipe 343.

The cleaning water that passes through the scrubber 340 contains the pollutants such as the nitrogen oxides, the sulfur oxides and the dust and moves to the filter unit 370 through the cleaning water discharge pipe 341. The filter unit 370 separates pollutants such as solid-phase particles from the cleaning water and stores the separated pollutants in the sludge tank 380. The clean cleaning water may flow to the ballast water tank 360 through the seawater supply pipe 330 and the mixing pipe 334 or may be discharged to the outside through the seawater discharge pipe 337.

Meanwhile, a sterilizing agent supplied from the purification unit 350 may be injected into a mixture of the cleaning water and the seawater flowing in the seawater supply pipe 330 by the injection unit 333.

Even in this case, the oxide sensor unit 312 measures the concentration or amount of at least one of the sulfur oxides and the nitrogen oxides in the exhaust gas supplied to the exhaust gas pipe 310 and transmits the measured concentration or amount to the control unit 301. Then, the control unit 301 identifies the concentration or the degree of contamination of the exhaust gas based on the measured concentration or amount. Therefore, the controller 301 can appropriately adjust the amount of seawater introduced to the scrubber 340 through the cleaning water supply pipe 320 by controlling the control valve 331 based on the identified concentration or degree of contamination of the exhaust gas. Further, the control unit 301 can adjust the amount of freshwater supplied to the scrubber 340 by controlling the valve 321a formed on the side of the freshwater supply pipe 321.

That is, even when removal of pollutants from exhaust gas and ballast water treatment are performed simultaneously, it is possible, by using the control unit 301, to adjust the amount of seawater or freshwater supplied to the scrubber 340 and appropriately adjust the supplied amount of cleaning water which is at least one of seawater, freshwater and a mixture of seawater and freshwater, so that the scrubber 340 can smoothly treat pollutants according to the degree of contamination of exhaust gas or a change in the concentration of the exhaust gas. As described above, such control also takes into account the pH value of the cleaning water that passes through the scrubber 340. A pH value measured by the pH sensor unit 342 and a pH value measured by the sensor unit 332 may be continuously monitored to identify the pH value distribution, fluctuations, etc. of the cleaning water that passes through the scrubber 340 or a mixture of the cleaning water and the seawater. Then, the amount of the cleaning water supplied to the scrubber 340 can be very easily adjusted so that the pH value does not deviate from an appropriate level.

Figure 23:
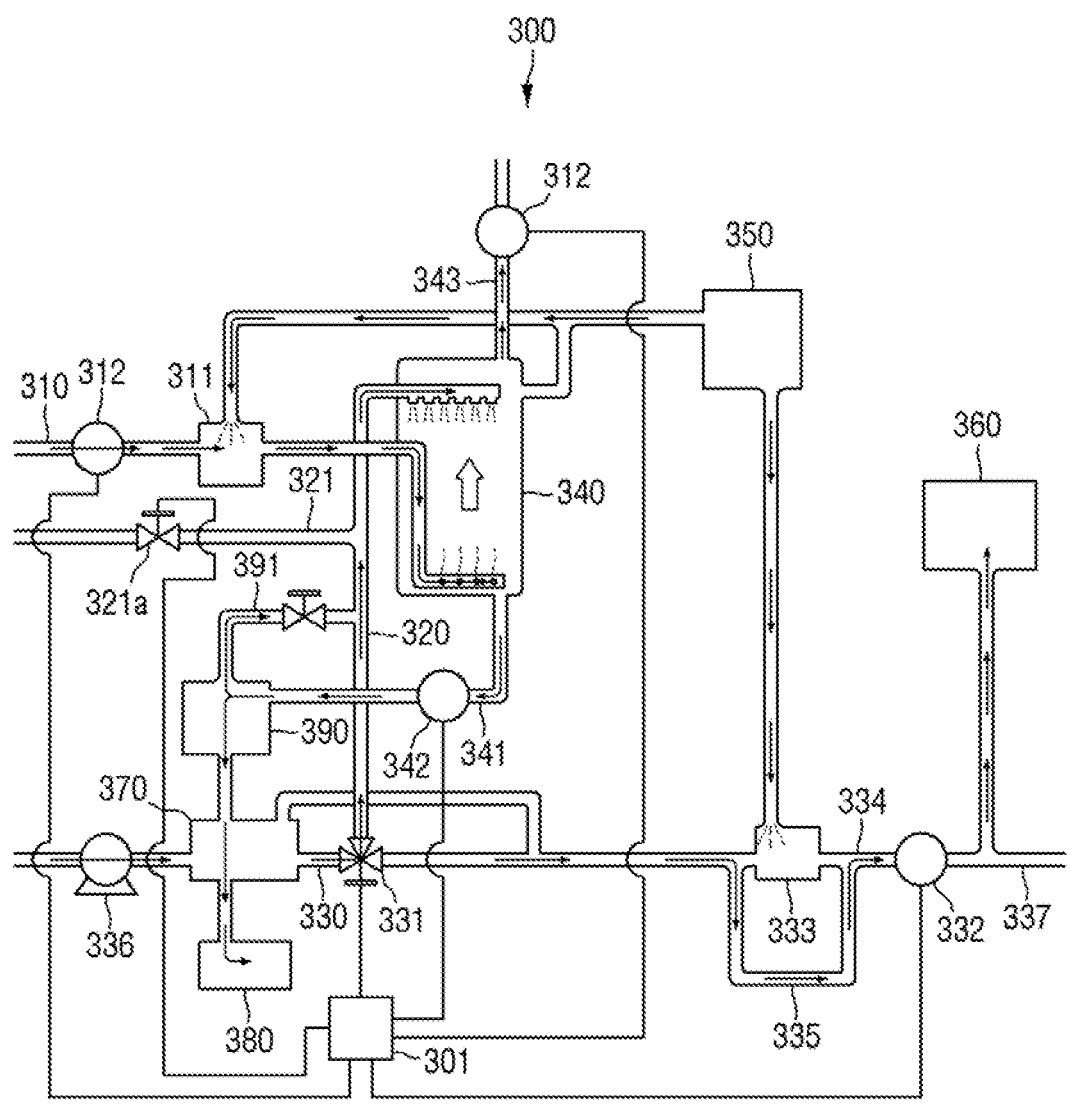

Referring to FIG. 23, seawater introduced through the seawater supply pipe 330 is supplied to the scrubber 340 through the cleaning water supply pipe 320. A portion of cleaning water that passes through the scrubber 340 may be recirculated to the scrubber 340 via the recirculation tank 390, the circulation pipe 391 and the cleaning water supply pipe 320, and the remaining portion of the cleaning water may move to the filter unit 370. That is, the process of FIG. 23 is substantially the same as the process of FIG. 22, except that a portion of the cleaning water that passes through the scrubber 340 is recirculated to the scrubber 340 via the recirculation tank 390, the circulation pipe 391 and the cleaning water supply pipe 320 without being discharged to the outside through the seawater discharge pipe 337.

Meanwhile, a sterilizing agent may be injected into a portion of the seawater flowing in the seawater supply pipe 330 by the injection unit 333, and the remaining portion of the seawater may bypass the injection unit 333 by flowing along the bypass pipe 335 and then may be mixed with seawater flowing in the mixing pipe 334.

As described above, the pollutant reduction device 300 can treat ballast water, treat pollutants, or simultaneously perform ballast water treatment and pollutant treatment. In this process, the control unit 301 may control the control valve 331 to increase or decrease the amount of cleaning water supplied to the scrubber 340, thereby very easily maintaining the pH value of the cleaning water that passes through the scrubber 340 at an appropriate level. In FIG. 22, the pollutant reduction device 300 operates in an open loop type manner to discharge the cleaning water be sea in a state where the seawater discharge pipe 337 is open. However, the pollutant reduction device 300 can also easily operate in a closed loop manner to circulate seawater, freshwater, mixed water, and the like within a ship in a state where a side of the seawater discharge pipe 337 is closed.

In addition, the exhaust pollutant treatment and the ballast water treatment can be performed by using the above treatment methods selectively or in combination according to the position of the ship, such as a harbor area where ballasting is relatively frequently used or an ECA where ballasting is required relatively less frequently but pollutant throughput is increased. In particular, the control unit 301 may control the control valve 331 to adjust the amount of seawater supplied to the scrubber 340 in the above situations. Accordingly, an optimal ratio of the amount of seawater required to treat ballast water and the amount of seawater used to treat pollutants can be determined.

That is, for example, in the harbor area where ballasting is frequently used, seawater may be allocated to treat only ballast water as described above, or a relatively large amount of seawater may be allocated for the ballast water treatment. When the ship is travelling in the ECA, seawater may be allocated to treat only pollutants as described above, or a relatively large amount of seawater may be allocated for the pollutant treatment. In this way, the exhaust and water pollutant treatment device 300 can be utilized very efficiently.

Hereinafter, a pollutant reduction device according to a seventh embodiment of the inventive concept will be described in detail with reference to FIGS. 24 through 31.

Figure 24:
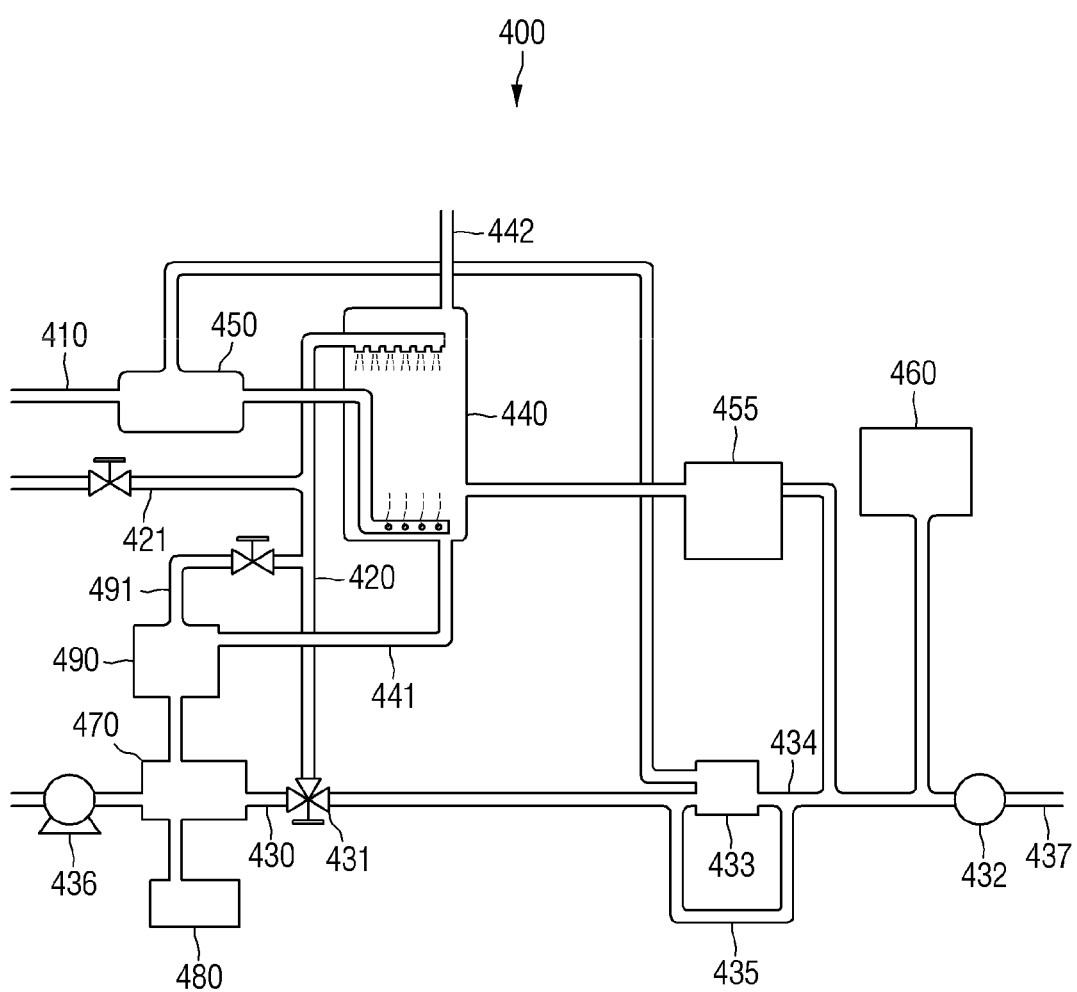
FIG. 24 is a schematic view of a pollutant reduction device according to a seventh embodiment of the inventive concept.

FIG. 24 is a schematic view of a pollutant reduction device according to a seventh embodiment of the inventive concept.

The pollutant reduction device 400 according to the inventive concept includes an exhaust gas pipe 410, a cleaning water supply pipe 420, a scrubber 440, a plasma purification unit 450, and a cleaning water discharge pipe 441.

The exhaust gas pipe 410 is a pipe through which exhaust gas moves from a combustion engine and is connected to the scrubber 440. The exhaust gas pipe 410 may be directly connected to an exhaust pipe of the combustion engine and serve as a passage through which hot exhaust gas moves or waste gas remaining after most of the exhaust heat is recycled by various heat exchangers moves. Generated exhaust gas contains a large amount of nitrogen oxides, sulfur oxides and dust and is supplied to the scrubber 440 through the exhaust gas pipe 410 connected to a side of the combustion engine.

The cleaning water supply pipe 420 is a pipe for supplying the scrubber 440 with cleaning water which is at least one of seawater, freshwater, and a mixture of seawater and freshwater. An end of the cleaning water supply pipe 420 may be connected to a seawater supply pipe 430 or a freshwater supply pipe 421, and the other end of the cleaning water supply pipe 420 may be connected to the scrubber 440. That is, the cleaning water supply pipe 420 can selectively receive seawater and freshwater.

Based on the assumption that the cleaning water is mostly limited to seawater, a process in which the seawater is supplied into the scrubber 440 through the cleaning water supply pipe 420 will be mainly described below.

A pump 236 may be installed on the seawater supply pipe 430 to smoothly supply the cleaning water to the scrubber 440. In particular, the cleaning water supply pipe 420 branches from the seawater supply pipe 430 and is connected to the scrubber 440, and a control valve 431 is installed at a connection portion between the cleaning water supply pipe 420 and the seawater supply pipe 430.

The scrubber 440 is a device for spraying the cleaning water supplied through the cleaning water supply pipe 420 to the exhaust gas introduced through the exhaust gas pipe 410 so that the exhaust gas and the cleaning water can contact each other. The scrubber 440 may be a wet scrubber. The exhaust gas supplied through the exhaust gas pipe 410 is initially purified by the plasma purification unit 450 and then purified again by the scrubber 440.

The plasma purification unit 450 is connected to the exhaust gas pipe 410 and performs pulse corona discharge to purify the exhaust gas. When the corona discharge is caused by a pulse high voltage, the exhaust gas becomes a plasma state to generate oxidative radicals such as $O_2$ and $OH$, thereby removing pollutants such as nitrogen oxides and sulfur oxides. To remove particulate matter contained in the exhaust gas, a pretreatment filter (not illustrated) may be placed between the exhaust gas pipe 410 and the plasma purification unit 450 to absorb or adsorb the particulate matter. Alternatively, during or after the pulse corona discharge, a high voltage may be applied to a pulse corona discharge electrode together with air/steam in order to remove particulate matter/liquid matter attached to the electrode.

The plasma purification unit 450 includes a first electrode 453 which is shaped like a container or plates disposed parallel to each other and second electrodes 452 which are shaped like wires arranged at intervals inside the container-shaped electrode or between the plates of the plate-shaped electrode to generate plasma. The specific structure of the plasma purification unit 450 will be described later.

The plasma purification unit 450 reduces pollutants in the exhaust gas by causing the exhaust gas to react according to the following reaction formula.

$$NO+O \rightarrow NO_2$$

$$NO+H_2O \rightarrow NO_2OH^-$$

$$NO+OH^- \rightarrow HNO_2$$

$$HNO_2+OH^- \rightarrow NO_2+H_2O$$

$$NO+O_3 \rightarrow NO_2+O_2$$

$$NO_2+OH^- \rightarrow HNO_3$$

$$SO_2 + OH^- \rightarrow HSO_3^-$$

$$HSO_3^- + OH^- \rightarrow H_2SO_4$$

$$SO_2 + O \rightarrow SO_3^{2-}$$

$$SO_3^{2-} + H_2O \rightarrow H_2SO_4 \qquad \text{<Reaction Formula>}$$

The plasma purification unit 450 can purify the exhaust gas passing between the first electrode 453 and the second electrodes 452. Here, ozone remaining after the purification of the exhaust gas flows into the scrubber 440 and kills microorganisms present in the cleaning water (seawater) introduced into the scrubber 440. That is, the plasma purification unit 450 can simultaneously perform the functions of purifying the flowing exhaust gas, oxidizing nitrogen oxides so that the nitrogen oxides can be easily dissolved within the scrubber 440, and supplying ozone to the scrubber 440 to kill the microorganisms present in the cleaning water. The plasma purification unit 450 can also kill the microorganisms by injecting the ozone into an injection unit 433 which will be described later.

An end of the cleaning water supply pipe 420 which is located in the scrubber 440 is disposed in multiple tiers in an upper part of the scrubber 440 and branches into a plurality of parts to spray the cleaning water in the form of fine particles. That is, the cleaning water supply pipe 420 disposed in the upper part of the scrubber 440 may spray the cleaning water toward a lower part of the scrubber 440, thereby effectively bringing the exhaust gas and the cleaning water into contact with each other. As the exhaust gas and the cleaning water come into contact with each other in the scrubber 440, pollutants such as nitrogen oxides, sulfur oxides and dust contained in the exhaust gas may be removed. The exhaust gas from which the pollutants such as the nitrogen oxides, the sulfur oxides and the dust have been removed may be discharged to the outside through a discharge pipe 442. Since the exhaust gas discharged through the discharge pipe 442 is without the pollutants such as the nitrogen oxides, the sulfur oxides and the dust, it meets the exhaust standard and thus can be discharged to the atmosphere as it is.

The cleaning water, which has absorbed the sulfur oxides, the nitrogen oxides and the dust through the contact with the pollutant-containing exhaust gas in the scrubber 440, is discharged through the cleaning water discharge pipe 441.

The scrubber 440 serves not only to clean the exhaust gas that passes through the plasma purification unit 450 but also to remove the microorganisms present in the cleaning water when seawater is used as the cleaning water. That is, the microorganisms present in the cleaning water are killed as the cleaning water passes through the scrubber. The cleaning water may be discharged to the outside of a ship or stored in a ballast water tank 460 and utilized as ballast water.

In the scrubber 440, the sulfur oxides and the nitrogen oxides contained in the exhaust gas are dissolved in the cleaning water to produce sulfuric acid ($H_2SO_4$) and nitric acid ($HNO_3$) which are strongly acidic. Therefore, the microorganisms present in the cleaning water can be killed. Here, the exhaust gas may include the ozone generated from the plasma purification unit 450. Therefore, the microorganisms present in the cleaning water can also be killed by the sterilizing power of the ozone.

The sulfuric acid ($H_2SO_4$) and ($HNO_3$) generated in the scrubber 440 may be neutralized by a neutralizing agent supplied from a neutralizing agent supply unit 455. For example, the neutralizing agent may be an alkaline solution, i.e., sodium hydroxide (NaOH) or sodium hypochlorite (NaOCl), and may be obtained by electrolysis of seawater. Therefore, the neutralizing agent apply unit 455 may simply include a neutralizing argent tank or may, include an electrolytic device to produce the neutralizing agent by itself.

The neutralizing agent supply unit 455 may supply the neutralizing agent to the scrubber 440 or to the cleaning water supply pipe 420 or a rear part of a mixing pipe 434. When the neutralizing agent supply unit 455 supplies the neutralizing agent directly to the scrubber 440, the cleaning water may be brought into contact with the neutralizing agent after contacting the exhaust gas. That is, the exhaust gas may first be brought into contact with the cleaning water to kill the microorganisms in the cleaning water with the sulfuric acid and the nitric acid, and then the neutralizing agent may be mixed with the cleaning water to neutralize the cleaning water to an appropriate pH. Therefore, the neutralizing agent supply unit 455 may inject the neutralizing agent into under an end of the cleaning water supply pipe 420 located in the upper or lower part of the scrubber 440.

The cleaning water which has contacted the exhaust gas may be collected in the lower part of the scrubber 440 and mixed with the neutralizing agent and thus neutralized before being discharged to the cleaning water discharge pipe 441. In this way, the processes of removing the pollutants in the exhaust gas, killing the microorganisms in the cleaning water, and neutralizing the cleaning water can be performed in the scrubber 440 at a time.

The cleaning water discharge pipe 441 is a pipe for discharging the cleaning water inside the scrubber 440 and may be connected back to the seawater supply pipe 430 by a filter unit 470.

A circulation pipe 491 may be connected to the cleaning water discharge pipe 441.

A recirculation tank 490 may be installed between the cleaning water discharge pipe 441 and the circulation pipe 491.

The cleaning water supply pipe 420 is connected to the seawater supply pipe 430, the freshwater supply pipe 421 and the circulation pipe 491.

The filter unit 470 is installed behind the scrubber 440 to separate solid-phase particles from the cleaning water discharged from the scrubber 440. The filter unit 470 stay separate the solid-phase particles using at least one of a centrifuge, a gravity separator and a filter and discharge the solid-phase particles to a sludge tank 480. Both the seawater introduced from the outside and the cleaning water that passes through the scrubber 440 can be filtered by one filter unit 470. Alternatively, the filter unit 470 may branch into two parts to filter the seawater and the cleaning water that pass through the scrubber, respectively. In addition, a junction pipe connected directly to the seawater supply pipe 430 behind the control valve 431 may be installed on a side of the filter unit 470. A sensor unit 432 is installed behind the injection unit 433. The plasma purification unit 450 and the neutralizing agent supply unit 455 appropriately adjust the amounts of the oxidizing agent, the neutralizing agent and the sterilizing agent supplied according to the result value of the sensor unit 432.

The cleaning water and the seawater discharged through the mixing pipe 434 may flow into the ballast water tank 460 or may be discharged to the outside.

The ballast water tank 460 stores the cleaning water discharged through the cleaning water discharge pipe 441. At least one ballast water tank 460 may be installed in the ship. Since the cleaning water flowing in the cleaning water discharge pipe 441 has been acidified by the sulfur oxides and the nitrogen oxides, the pH value of the cleaning water flowing in the cleaning water discharge pipe 441 is lower than that of the cleaning water flowing in the cleaning water supply pipe 420. Therefore, the survival rate of microorganisms present in the cleaning water flowing in the cleaning water discharge pipe 441 is lower than that of microorganisms present in the cleaning water flowing in the cleaning water supply pipe 420.

The plasma purification unit will now be described in more detail with reference to FIGS. 25 through 27.

Figure 25:
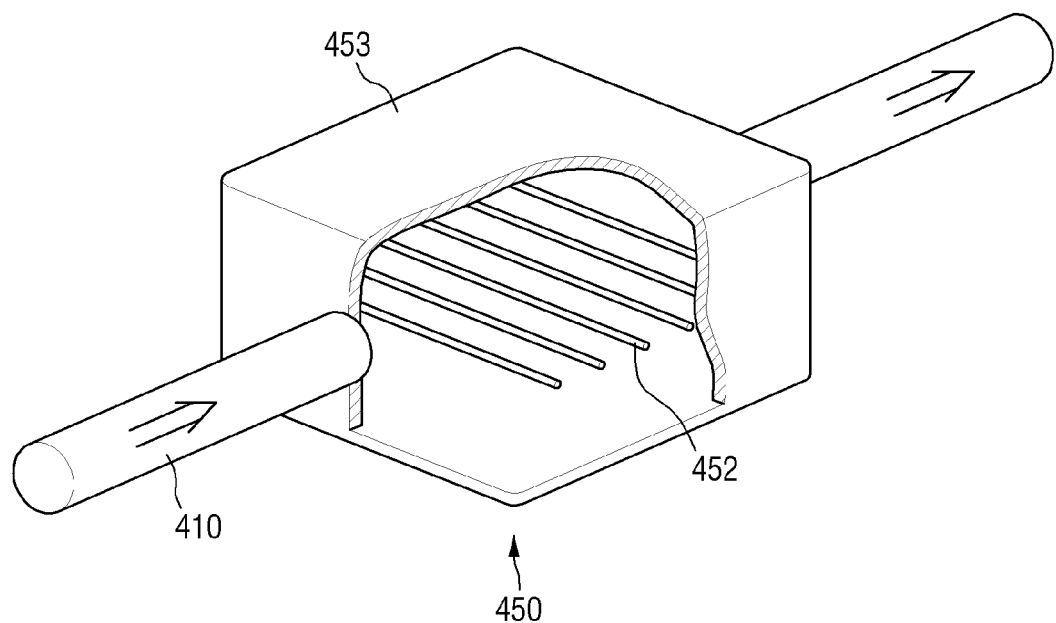
FIG. 25 is a cut-out perspective view for explaining an example of a plasma purification unit of FIG. 24.
Figure 26:
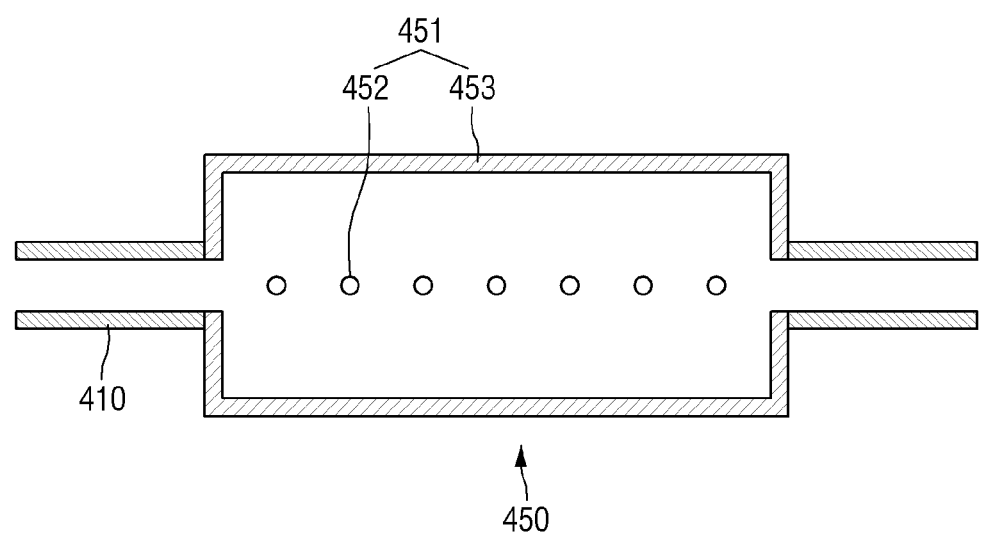
FIG. 26 is a cross-sectional view of the plasma purification unit of FIG. 25.

FIG. 25 is a cut-out perspective view for explaining an example of the plasma purification unit of FIG. 24. FIG. 26 is a cross-sectional view of the plasma purification unit of FIG. 25.

A plasma purification unit 450 includes a reaction module 451 including a first electrode 453 and a second electrode 452. The reaction module 451 refers to an independent plasma generation unit including the first electrode 453 and the second electrode 452. The reaction module 451 may be provided in a plurality, and the reaction modules 451 may be connected in series or in parallel.

The first electrode 453 is an electrode shaped like a container or a pair of plates and may serve as a ground plate. The second electrode 452 is an electrode shaped like a thin wire and may serve as a discharge electrode. When a high-voltage pulse is applied to the second electrode 452, corona discharge occurs between the first electrode 453 and the second electrode 452. Accordingly, exhaust gas passing between the first and second electrodes 453 and 452 becomes a plasma state to generate ozone and radical ions.

The first electrode 453 may be shaped like a polygonal or cylindrical container to form a space, in which the second electrode 452 can be disposed, in its center. In addition, when the first electrode 453 is shaped like a pair of plate electrodes, the plate electrodes may be separated from each other so that the second electrode 452 can be disposed between the plate electrodes.

The second electrode 452 may be provided in a plurality, and the second electrodes 452 may be arranged at intervals along the direction of flow of the exhaust gas. That is, as illustrated in FIG. 25, the second electrodes 452 may extend in a direction perpendicular to the flow direction of the exhaust gas and may be arranged side by side with each other along the flow direction of the exhaust gas. Since the second electrodes 452 extend in the direction perpendicular to the flow direction of the exhaust gas and are arranged along the flow direction of the exhaust gas, the contact area with the exhaust gas can be increased. In addition, the reaction cross-sectional area of the plasma purification unit 450 along the flow direction of the exhaust gas may be equal to the cross-sectional area of the exhaust gas pipe 410.

The second electrodes 452 may be disposed in the center of the first electrode 453 in order to perform corona discharge in various directions together with the first electrode 453.

Figure 27:
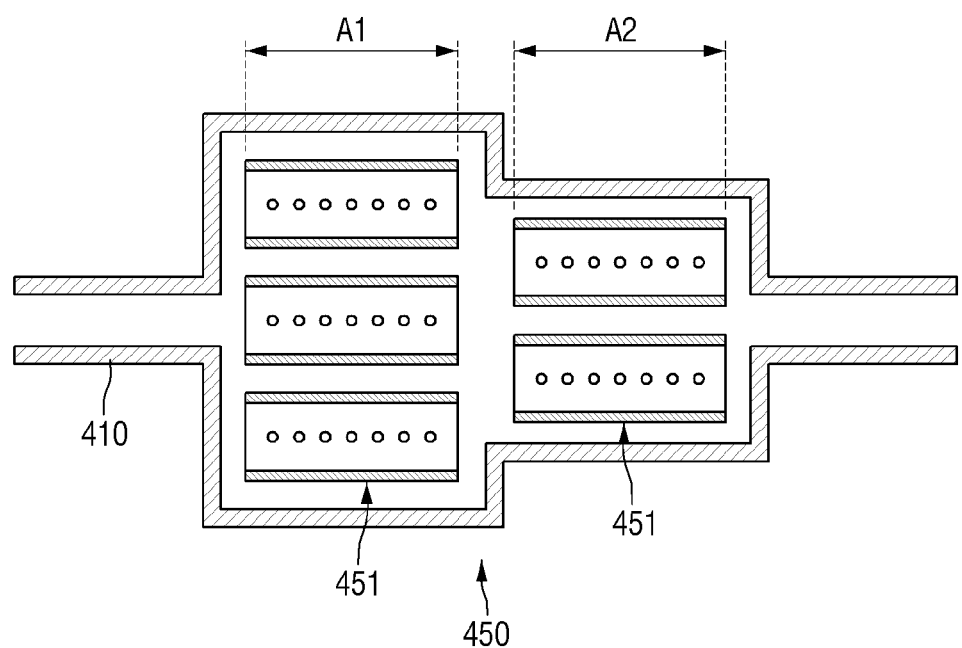
FIG. 27 is a cross-sectional view for explaining another example of the plasma purification unit of FIG. 24.

FIG. 27 is a cross-sectional view for explaining another example of the plasma purification unit of FIG. 24.

A plasma purification unit 450 may include a plurality of reaction modules 451. In FIG. 27, a plurality of reaction modules 451 disposed in series and in parallel are illustrated an example of the plasma purification unit 450. The reaction modules 451 included in the plasma purification unit 450 may operate simultaneously or separately as needed. For example, the reaction modules 451 arranged in parallel in different numbers can be arranged in series. In this case, the reaction modules 451 can be selectively operated according to any one of the concentration, flow velocity, flow rate, and temperature of exhaust gas. For example, when the concentration of the exhaust gas is high, the flow velocity is high, and the flow rate is high, all reaction modules in an A1 area and an A2 area are operated. When the concentration of the exhaust gas is relatively low, the flow velocity is low, and the flow rate is not high, the A1 area and the A2 area may be selectively operated.

The operation of the pollutant reduction device 400 will hereinafter be described in more detail with reference to FIGS. 28 through 31.

A process in which the pollutant reduction device 400 operates to remove only pollutants of exhaust gas will now be described with reference to FIGS. 28 and 29.

Figure 28:
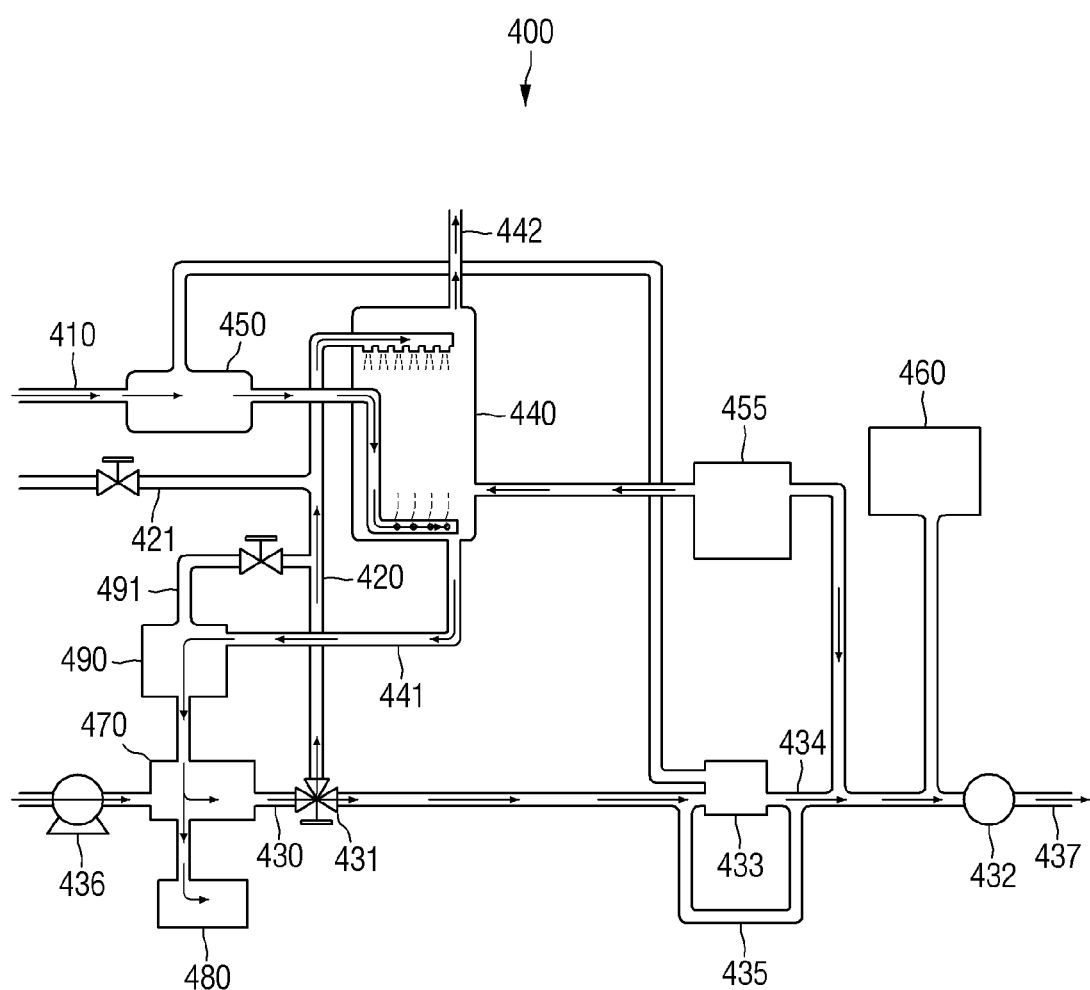
FIGS. 28 through 31 illustrate the operation of the pollutant reduction device according to the seventh embodiment of the inventive concept.

FIG. 28 illustrates a process in which seawater supplied to the seawater supply pipe 430 is directly discharged to the outside after passing through the scrubber 440. FIG. 29 illustrates a process in which seawater supplied to the seawater supply pipe 430 is recirculated through the circulation pipe 491 and reused after passing through the scrubber 440.

Referring to FIG. 28, seawater introduced through the seawater supply pipe 430 is supplied to the scrubber 440 through the cleaning water supply pipe 420.

At this time, exhaust gas supplied through the exhaust gas pipe 410 may be sprayed from the lower part of the scrubber 440. The plasma purification unit 450 may oxidize nitrogen monoxide of the exhaust gas into nitrogen dioxide by generating plasma before the exhaust gas is supplied to the scrubber 440.

Since the exhaust gas can be sprayed within the cleaning water filling the lower part of the scrubber 440, pollutants such as nitrogen oxides, sulfur oxides and dust can be removed within the cleaning water filling the lower part of the scrubber 440 addition, the pollutants can be removed again by the cleaning water sprayed from the upper part of the scrubber 440. Through this process, the pollutants in the exhaust gas are removed, and the exhaust gas from which the pollutants have been removed is discharged to the outside through the discharge pipe 442.

The cleaning water that passes through the scrubber 440 contains the pollutants such as the nitrogen oxides, the sulfur oxides and the dust and moves to the filter unit 470 through the cleaning water discharge pipe 441. The filter unit 470 separates pollutants such as solid-phase particles from the cleaning water and stores the separated pollutants in the sludge tank 480. The clean cleaning water is discharged to the outside through the mixing pipe 434 and a seawater discharge pipe 437. Here, if the pH value of the cleaning water passing through the mixing pipe 434 is outside a reference range, the neutralizing agent supply unit 455 adjusts the pH value to be within the reference range by injecting a neutralizing agent into the mixing pipe 434 and then discharges the cleaning water to the outside.

Figure 29:
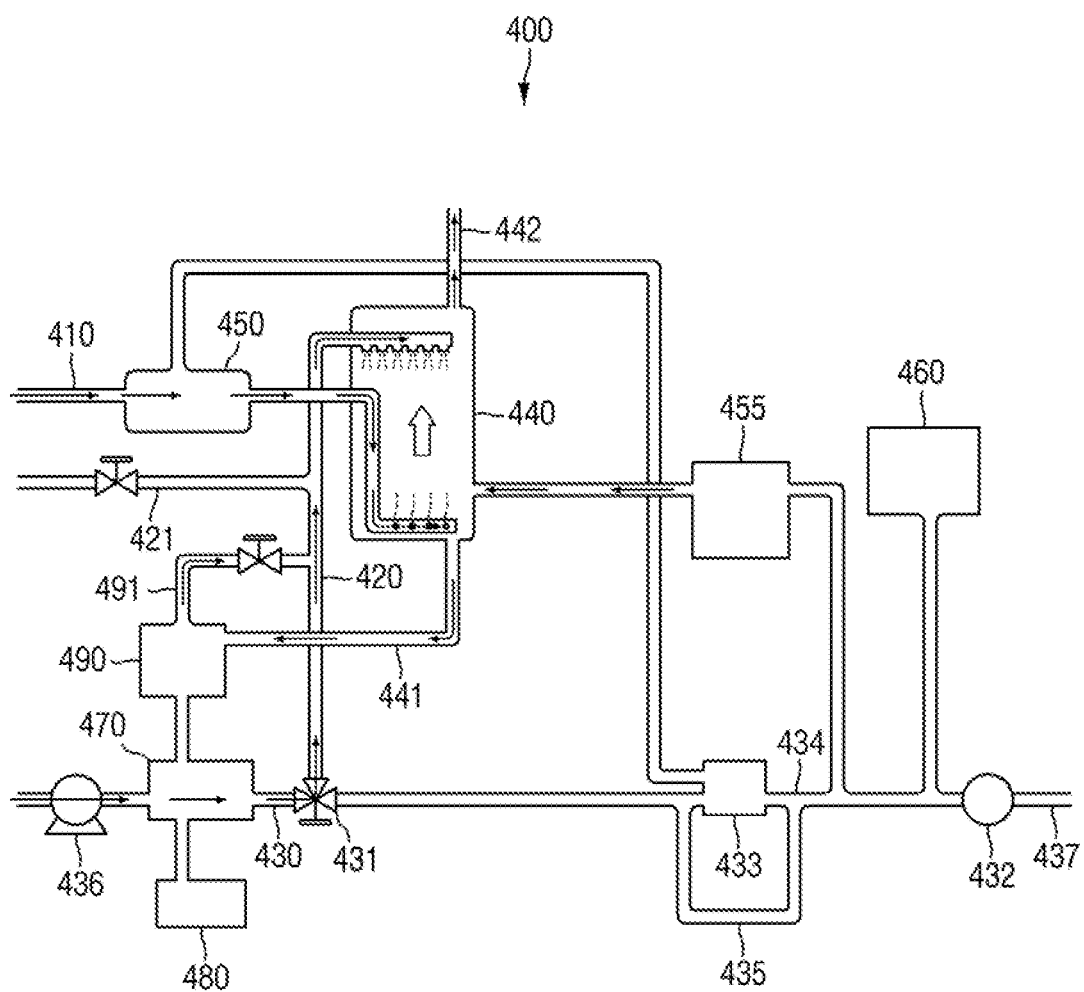

Referring to FIG. 29, seawater introduced through the seawater supply pipe 430 passes through the scrubber 440 to be discharged to the cleaning water discharge pipe 441, and cleaning water discharged to the cleaning water discharge pipe 441 is temporarily stored in the recirculation tank 490 and then circulated back to the cleaning water supply pipe 420 through the circulation pipe 491. That is, the process of FIG. 29 is substantially the same as the process of FIG. 28, except that the cleaning water is recirculated through the circulation pipe 491 to be reused.

The seawater introduced through the seawater supply pipe 430 is circulated sequentially through the cleaning water supply pipe 420, the scrubber 440, the cleaning water discharge pipe 441 and the circulation pipe 491. The process of FIG. 28 and the process of FIG. 29 may be performed together in view of the degree of contamination of the seawater, the pH value, etc. The process of FIG. 29 may be used when the seawater cannot be discharged to the outside, for example, when the ship is passing through an area where the discharge of the seawater is limited. If the cleaning water is highly contaminated due to several recirculations of the cleaning water, it may be discharged to the outside after solid-phase particles are removed from the cleaning water by the filter unit 470. Then, new seawater may be supplied again to the scrubber 440.

The process of FIG. 28 and the process of FIG. 29 can be selectively or sequentially used as needed.

A process in which the pollutant reduction device 400 removes pollutants from exhaust gas and treats ballast water will now be described with reference to FIGS. 30 and 31.

Figure 30:
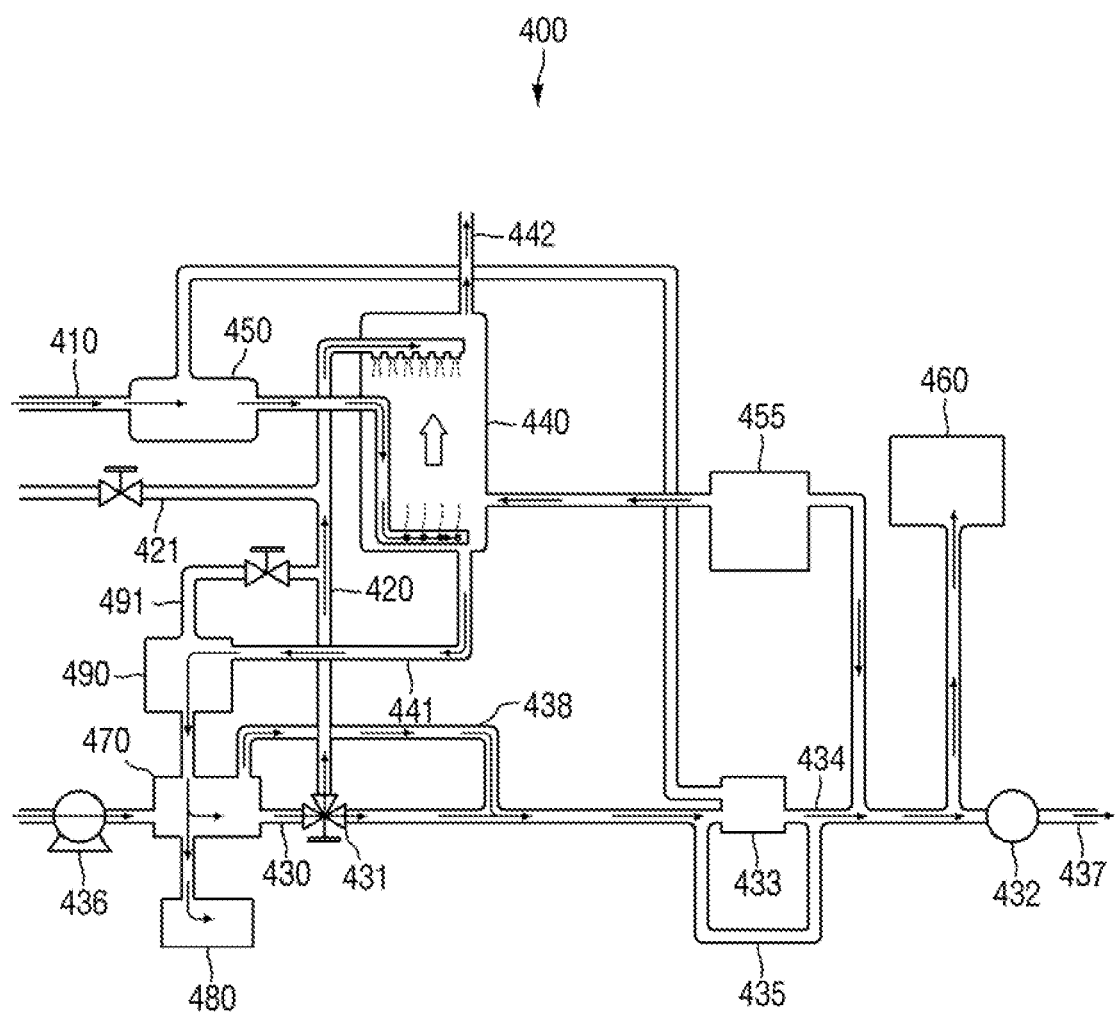

FIG. 30 illustrates an open loop type pollutant removal method and a direct sterilization type ballast water treatment process. FIG. 31 illustrates a closed loop type pollutant removal method and an indirect sterilization type ballast treatment process.

Referring to FIG. 30, seawater introduced through the seawater supply pipe 430 is supplied to the scrubber 440 through the cleaning water supply pipe 420.

At this time, exhaust gas supplied through the exhaust gas pipe 410 may be sprayed from the lower part of the scrubber 440. The plasma purification unit 450 may oxidize nitrogen monoxide of the exhaust gas into nitrogen dioxide by generating plasma before the exhaust gas is supplied to the scrubber 440. The neutralizing agent supply unit 455 may spray a neutralizing agent to the cleaning water supply pipe 420, to the scrubber 440, or to the rear part of the mixing pipe 434 in view of the pH value of cleaning water.

Since the exhaust gas can be sprayed within the cleaning water filling the lower part of the scrubber 440, pollutants such as nitrogen oxides, sulfur oxides and dust can be removed within the cleaning water filling the lower part of the scrubber 440. In addition, the pollutants can be removed again by the cleaning water sprayed from the upper part of the scrubber 440.

The cleaning water that passes through the scrubber 440 contains the pollutants such as the nitrogen oxides, the sulfur oxides and the dust and moves to the filter unit 470 through the cleaning water discharge pipe 441. The filter unit 470 separates pollutants such as solid-phase particles from the cleaning water and stores the separated pollutants in the sludge tank 480. The clean cleaning water may flow to the ballast water tank 460 through the seawater supply pipe 430 and the mixing pipe 434 or may be discharged to the outside through the seawater discharge pipe 437. Meanwhile, a sterilizing agent supplied from the plasma purification unit 450 may be injected into a mixture of the cleaning water and the seawater flowing in the seawater supply pipe 430 by the injection unit 433.

Figure 31:
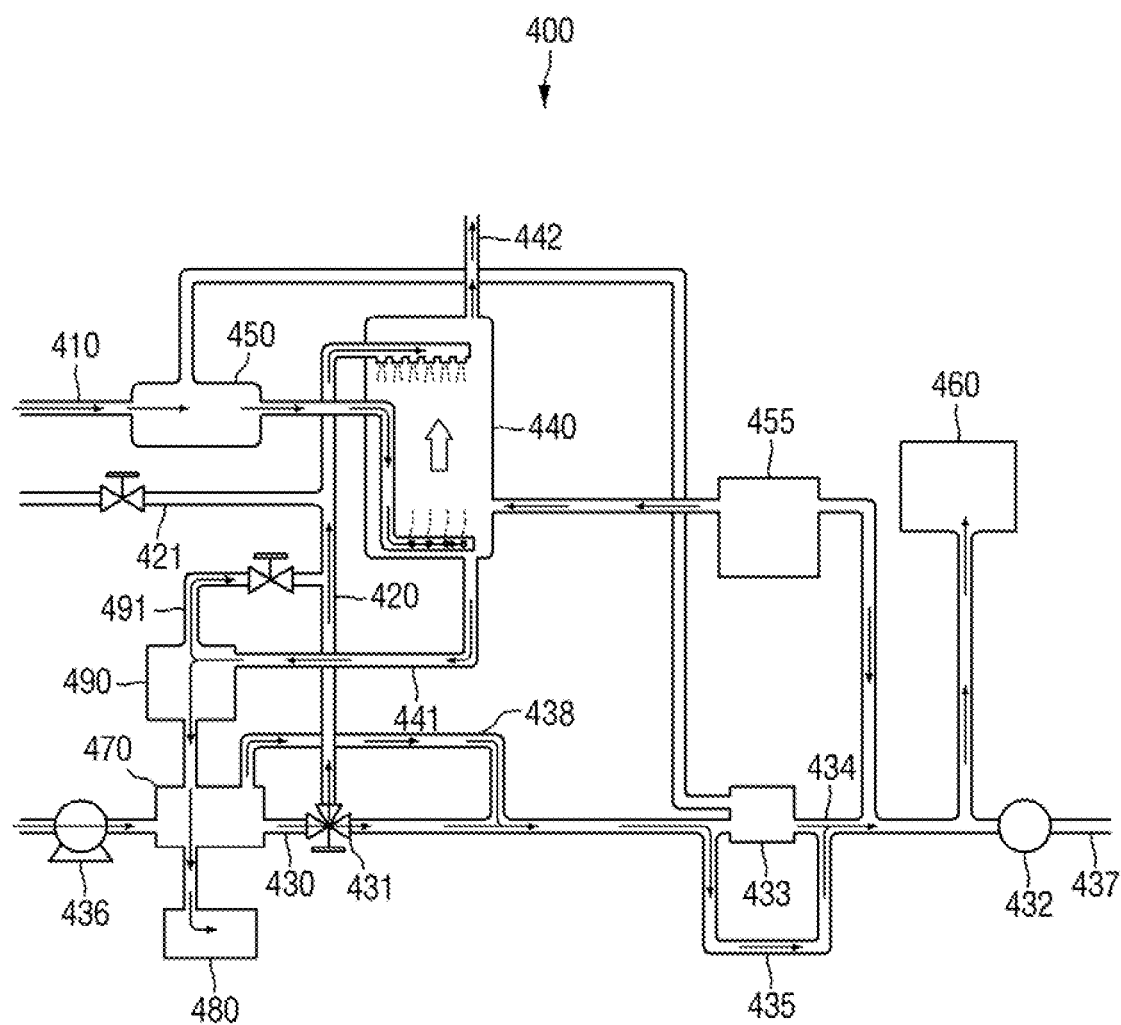

Referring to FIG. 31, seawater introduced through the seawater supply pipe 430 is supplied to the scrubber 440 through the cleaning water supply pipe 420. A portion of cleaning water that passes through the scrubber 440 may be recirculated to the scrubber 440 via the recirculation tank 490, the circulation pipe 491 and the cleaning water supply pipe 420, and the remaining portion of the cleaning water may move to the filter unit 470. That is, the process of FIG. 30 is substantially the same as the process of FIG. 31, except that a portion of the cleaning water that passes through the scrubber 440 is recirculated to the scrubber 440 via the recirculation tank 490, the circulation pipe 491 and the cleaning water supply pipe 420 without being discharged to the outside through the seawater discharge pipe 437.

The process of FIG. 30 and the process of FIG. 31 may be selectively performed in view of the amount or type of microorganisms present n the seawater, the time for adjusting the amount of ballast water required, the time for treating the exhaust gas, and the like.

Hereinafter, a pollutant reduction device according to an eighth embodiment of the inventive concept will be described in detail with reference to FIGS. 32 through 39.

Figure 32:
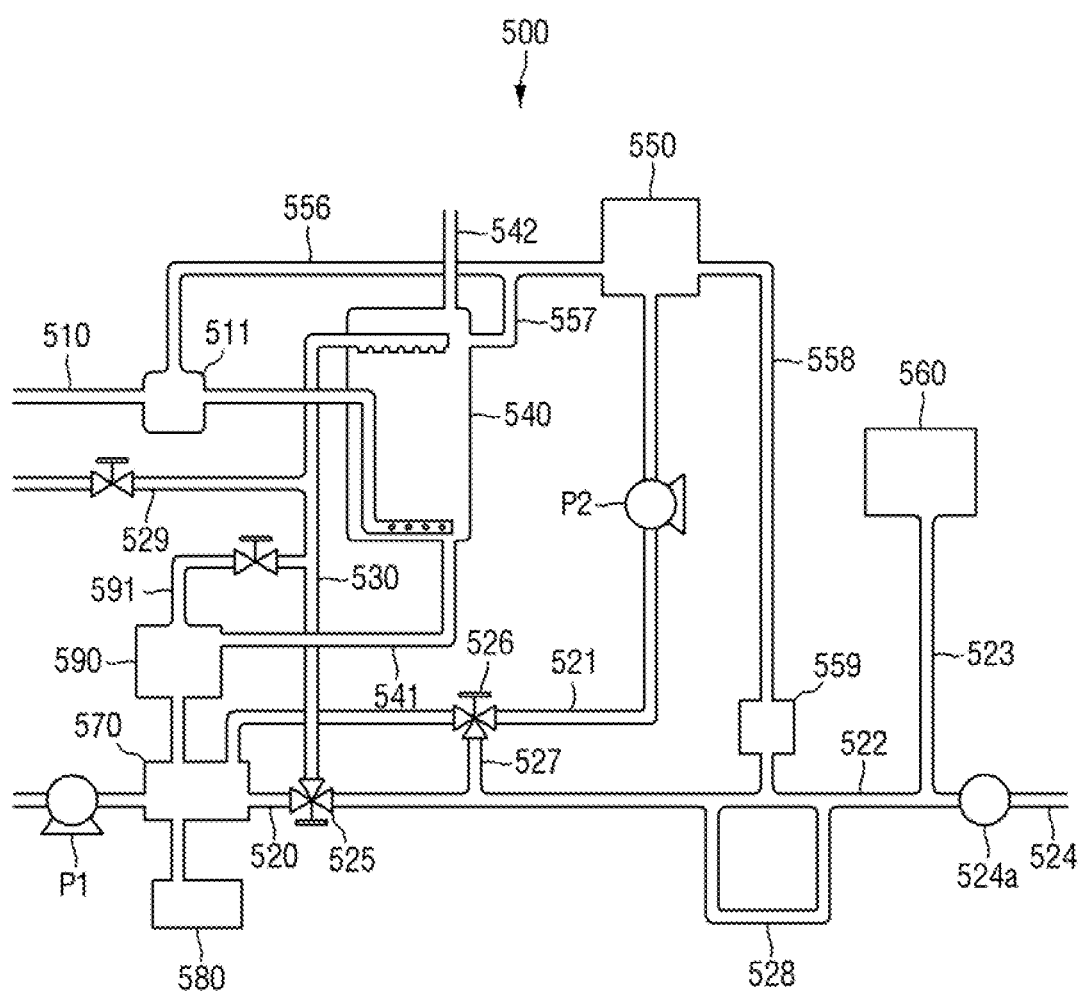
FIG. 32 is a schematic view of a pollutant reduction device according to an eighth embodiment of the inventive concept.
Figure 33:
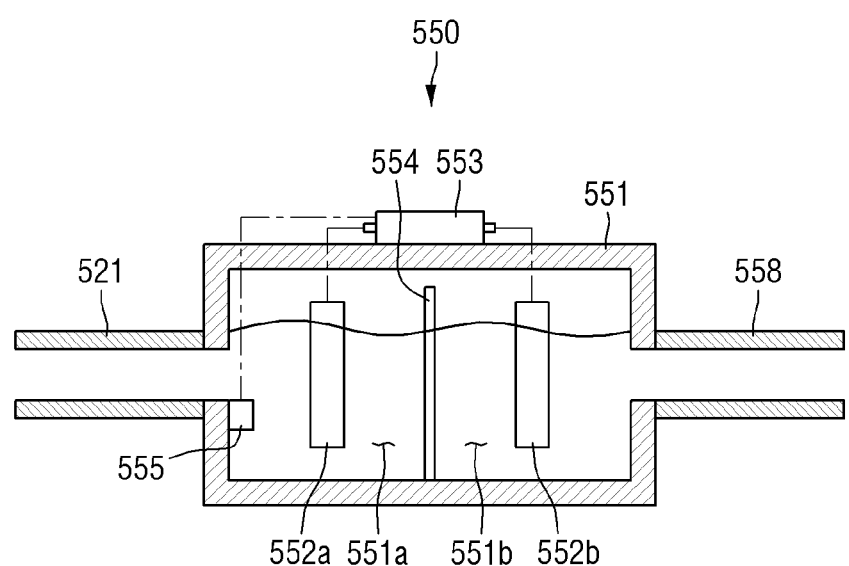
FIG. 33 is an enlarged cross-sectional view of a purification unit of FIG. 32.

FIG. 32 is a schematic view of a pollutant reduction device according to an eighth embodiment of the inventive concept. FIG. 33 is an enlarged cross-sectional view of a purification unit of FIG. 32.

The pollutant reduction device 500 according to the inventive concept includes an exhaust gas pipe 510, a seawater supply pipe 520, a cleaning water supply pipe 530, a scrubber 540, the purification unit 550, and a cleaning water discharge pipe 541.

The exhaust gas pipe 510 is a pipe through which exhaust gas moves from a combustion engine (not illustrated) and is connected to the scrubber 540 which will be described later.

The exhaust gas pipe 510 may be directly connected to an exhaust pipe of the combustion engine and serve as a passage through which hot exhaust gas moves or waste gas remaining after most of the exhaust heat is recycled by various heat exchangers moves. Generated exhaust gas contains a large amount of nitrogen oxides, sulfur oxides and dust and is supplied to the scrubber 540 through the exhaust gas pipe 510 connected to a side of the combustion engine.

The seawater supply pipe 520 is a pipe for receiving seawater from the outside and supplying the seawater to a ballast water tank 560 as ballast water. At least one pump P1 may be installed on the seawater supply pipe 520 to supply the seawater to the ballast water tank 560 and the scrubber 540. Here, the cleaning water supply pipe 530 may branch on a side of the seawater supply pipe 520 and may be connected to the scrubber 540, and a first control valve 525 may be installed at a connection portion between the seawater supply pipe 520 and the cleaning water supply pipe 530. The first control valve 525 may be formed as a three-way valve to control the amount of seawater supplied through the cleaning water supply pipe 530 or adjust a ratio of seawater supplied to the cleaning water supply pipe 530 to seawater supplied to the ballast water tank 560 through the seawater supply pipe 520. The seawater supply pipe 520 located behind the cleaning water supply pipe 530 branches into a ballast water supply pipe 523 and a seawater discharge pipe 524. The ballast water supply pipe 523 may supply ballast water to the ballast water tank 560, and the seawater discharge pipe 524 may discharge seawater to the outside.

The cleaning water supply pipe 530 is a pipe for supplying the scrubber 540 with cleaning water which is at least one of seawater, freshwater, and a mixture of seawater and freshwater. An end of the cleaning water supply pipe 530 may be connected to the seawater supply pipe 520 or a freshwater supply pipe 529, and the other end of the cleaning water supply pipe 530 may be connected to the scrubber 540. That is, the cleaning water supply pipe 530 can selectively receive seawater and freshwater. Based on the assumption that the cleaning water is mostly limited to seawater, a process in which the seawater is supplied into the scrubber 540 through the cleaning water supply pipe 530 will be more specifically described below Seawater introduced from the outside through the seawater supply pipe 520 flows into the scrubber 540 through the cleaning water supply pipe 530. The scrubber 540 is a device for spraying cleaning water supplied through the cleaning water supply pipe 530 to exhaust gas introduced through the exhaust gas pipe 510 so that the exhaust gas and the cleaning water can contact each other. The scrubber 540 may be a wet scrubber.

The cleaning water, which has absorbed nitrogen oxides, sulfur oxides and dust through the contact with the pollutant-containing exhaust gas in the scrubber 540, is discharged from the scrubber 540 through the cleaning water discharge pipe 541.

The purification unit 550 generates an oxidizing agent for oxidizing nitrogen-based oxides, a neutralizing agent for neutralizing acidified cleaning water, or a sterilizing agent for killing microorganisms present in seawater by electrolyzing seawater. The purification unit 550 may be connected to the exhaust gas pipe 510, the seawater supply pipe 520, or the scrubber 540. In other words, the purification unit 550 may supply the oxidizing agent, the neutralizing agent, or the sterilizing agent to the exhaust gas pipe 510, the seawater supply pipe 520, or the scrubber 540. The purification unit 550 includes an electrolytic bath 551, a positive electrode plate 552a, a negative electrode plate 552b, and a rectifier 553.

Referring to FIG. 33, the electrolytic bath 551 is a container or chamber having a receiving space therein, and seawater supplied through the seawater supply pipe 520 is accommodated in the electrolytic bath 551. A side of the electrolytic bath 551 is connected to a seawater inlet pipe 521 branching from the seawater supply pipe 520, so that seawater can be supplied to the electrolytic bath 551. At least one pump P2 may be installed on the seawater inlet pipe 521 to smoothly supply seawater to the electrolytic bath 551. The positive electrode plate 552a and the negative electrode plate 552b are installed in the electrolytic bath 551.

The positive electrode plate 552a and the negative electrode plate 552b are arranged in the electrolytic bath 551 in the flow direction of seawater and are separated from each other by a predetermined distance to face each other. A barrier 554 made of a hydrophilic porous membrane is installed between the positive electrode plate 552a and the negative electrode plate 552b to divide the inside of the electrolytic bath 551 into a first area 551a in which the positive electrode plate 552a is located and a second area 551b in which the negative electrode plate 552b is located. However, the barrier 554 is not necessarily made of a hydrophilic porous membrane. The barrier 554 can also be deformed into membranes having various structures or can be omitted if necessary. Each of the positive electrode plate 552a and the negative electrode plate 552b is electrically connected to the rectifier 553 by a cable.

The rectifier 553 supplies a rectified current to each of the positive electrode plate 552a and the negative electrode plate 552b. In the drawing, the rectifier 553 is installed outside the electrolytic bath 551. However, the rectifier 553 is not necessarily installed outside the electrolytic bath 551. For example, the rectifier 553 can be installed inside the electrolytic bath 551.

In the electrolytic bath 551, sodium chloride (NaCl) contained in seawater is electrolyzed by a current supplied from the rectifier 553. Accordingly, an oxidation reaction occurs in the positive electrode plate 552a to produce a chlorine gas ($Cl_2$). In addition, a hydrogen gas ($H_2$) and a hydroxyl group ($OH^-$) are produced in the negative electrode plate 552b. At this time, the chlorine gas ($Cl_2$) and the hydroxyl group ($OH^-$) react with each other to produce sodium hypochlorite (NaOCl) and hypochlorous acid (HOCl) having strong oxidizing power. A concentration measuring sensor 555 is provided inside the electrolytic bath 551 to measure the concentration of the oxidizing agent, the sterilizing agent or the neutralizing agent generated. Therefore, the rectifier 553 can adjust the intensity of the current supplied based on the concentration value measured by the concentration measuring sensor 555.

Specifically, the following reaction occurs in the positive ode plate 552a:

$$2H_2O \rightarrow O_2 + 4H^+ + 4e^-$$

$$2Cl^- \rightarrow Cl_2 + 2e^-.$$

In addition, the following reaction occurs in the negative electrode plate 552b:

$$2H_2O + 2e^- \rightarrow H_2 + 2OH^-$$

$$2Na^+ + 2e^- \rightarrow 2Na$$

$$Na + H_2O \rightarrow NaOH.$$

In conclusion, $$Cl_2 + 2OH^- \rightarrow OCl^- + Cl^- + H_2O$$

$$Na^+ + OCl^- \rightarrow NaOCl$$

$$NaOCl + H_2O \rightarrow HOCl.$$

That is, the oxidizing agent may be sodium hypochlorite (NaOCl) or hypochlorous acid (HOCl) produced by the electrolysis of seawater, and the purification unit 550 may atomize the oxidizing agent into a liquid phase and spray the atomized oxidizing agent to the exhaust gas pipe 510 through a first injection pipe 556.

In addition, the sterilizing agent may be sodium hypochlorite (NaOCl) or hypochlorous acid (HOCl) produced by the electrolysis of seawater or may be nitric acid ($HNO_3$) and sulfuric acid ($H_2SO_4$) produced by the reaction of the sodium hypochlorite (NaOCl) or the hypochlorous acid (HOCl) with exhaust gas and seawater. The purification unit 550 may inject the sterilizing agent into the scrubber 540 through a second injection pipe 557 or inject the sterilizing agent into the seawater supply pipe 520 through a third injection pipe 558. Here, the purification unit 550 may adjust the amount of hypochlorous acid (HOCl) injected in order to maintain the pH value of the sterilizing agent at 5 to 7, so that the sterilizing power for killing microorganisms can be maximized. For example, if the pH value of the cleaning water is 2.7 or less, it can be dangerous because toxic chlorine is produced.

In addition, the neutralizing agent may be sodium hypochlorite (NaOCl) produced by the electrolysis of seawater or may be a diluted solution of the sodium hypochlorite (NaOCl), and the purification unit 550 may inject the neutralizing agent into the scrubber 540 through the second injection pipe 557 or inject the neutralizing agent into the seawater supply pipe 520 through the third injection pipe 558.

The purification unit 550 may oxidize nitrogen monoxide contained in the exhaust gas into nitrogen dioxide by spraying the oxidizing agent to the exhaust gas pipe 510. The nitrogen dioxide is easily dissolved in water as compared with the nitrogen monoxide. Therefore, the nitrogen dioxide can be easily dissolved in the cleaning water in the scrubber 540 and thus can be easily removed. The first injection pipe 556 may atomize a liquid oxidizing agent and spray the atomized liquid oxidizing agent to the exhaust gas pipe 510 or spray a liquid, oxidizing agent to the exhaust gas through a spray unit 511 installed on the exhaust gas pipe 510.

Here, the purification unit 550 may also spray the neutralizing agent to the scrubber 540 through the second injection pipe 557 or may spray the neutralizing agent c the seawater supply pipe 520 through the third injection pipe 558. The neutralizing agent can neutralize the cleaning water acidified by the reaction of nitrogen oxides (NOx) and sulfur oxides (SOx) with the cleaning water. Since the nitrogen oxides (NOx) and the sulfur oxides (SOx) react with seawater to produce nitric acid ($HNO_3$) and sulfuric acid ($H_2SO_4$), respectively, the purification unit 550 may neutralize the acidified cleaning water by spraying sodium hypochlorite (NaOCl) to the scrubber 540. The following reaction occurs in the scrubber 540:

$$2NaOCl + 2HNO_3 \rightarrow 2NaNO_3 + 2HOCl$$

$$2NaOCl + H_2SO_4 \rightarrow Na_2SO_4 + 2HOCl.$$

The sodium hypochlorite (NaOCl) reacts with the nitric; acid ($HNO_3$) and the sulfuric acid ($H_2SO_4$) to additionally produce hypochlorous acid (HOCl). Therefore, microorganisms present in the cleaning water can be killed additionally. Here, since the hypochlorous acid (HOCl) is weakly acidic, a neutralizing agent such as sodium thiosulfate ($Na_2S_2O_3$) and sodium hydroxide (NaOH) can be added.

The purification unit 550 may also sterilize and neutralize the ballast water and the seawater by injecting the sterilizing agent or the neutralizing agent into the ballast water supply pipe 523 or the seawater discharge pipe 524 through the third injection pipe 558.

The purification unit 550 can inject the neutralizing agent (NaOH) directly through the second injection pipe 557. If the cleaning water is not sufficiently neutralized by the neutralizing agent supplied from the purification unit 550, a neutralizing agent injection unit (not illustrated) may be added to perform an additional neutralization operation.

The cleaning water discharge pipe 541 is a pipe for discharging the cleaning water inside the scrubber 540 and may be connected back to the seawater supply pipe 520 by a filter unit 570.

A circulation pipe 591 may be connected to the cleaning water discharge pipe 541. The circulation pipe 591 is a pipe for recirculating the cleaning water discharged through the cleaning water discharge pipe 541 to the cleaning water supply pipe 530. When the cleaning water not used as the ballast water or it is not necessary to discharge the cleaning water to the outside, the cleaning water may be circulated to the scrubber 540 for reuse.

A recirculation tank 590 may be installed between the cleaning water discharge pipe 541 and the circulation pipe 591.

The cleaning water supply pipe 530 is connected to the seawater supply pipe 520, the freshwater supply pipe 529 and the circulation pipe 591.

The filter unit 570 is installed behind the scrubber 540 to separate solid-phase particles from the cleaning water discharged from the scrubber 540. Like the recirculation tank 590, the filter unit 570 may separate be solid-phase particles using at least one of a centrifuge, a gravity separator and a filter and discharge the solid-phase particles to a sludge tank 580. The filter unit 570 may be connected to the seawater supply pipe 520 between the pump P1 and the first control valve 525.

In addition, a junction pipe 527 directly connected to the seawater supply pipe 520 behind the first control valve 525 may be installed on a side of the filter unit 570.

The neutralizing agent e sterilizing agent may be sprayed to the cleaning water or the seawater, which passed through the filter unit 570, through the third injection pipe 558. A pipe 522 to which a mixture of the seawater and the cleaning water is discharged may be installed between the filter unit 570 and the seawater discharge pipe 524, and the third injection pipe 558 may be connected to the seawater supply pipe 520 or the mixing pipe 522. An injection unit 559 which injects the neutralizing agent or the sterilizing agent supplied from the purification unit 550 may be installed on the third injection pipe 558. The injection unit 559 may inject the neutralizing agent or the sterilizing agent into the seawater and the cleaning water in a liquid or gaseous state. A sensor unit 524a may be installed on the seawater discharge pipe 524 to identify, in real time, total residual oxidant, pH value, microbial concentration, etc. in the discharged cleaning water and seawater. The purification unit 550 may adjust the amounts of the oxidizing agent, the neutralizing agent and the sterilizing agent supplied according to the result value of the sensor unit 524a.

The cleaning water and the seawater discharged through the mixing pipe 522 flow into the ballast water tank 560 through the ballast water supply pipe 523 or discharged to the outside through the seawater discharge pipe 524.

The ballast water tank 560 stores the cleaning water discharged through the cleaning water discharge pipe 541.

The operation of the pollutant reduction device 500 will now be described in more detail with reference to FIGS. 34 through 39.

Figure 34:
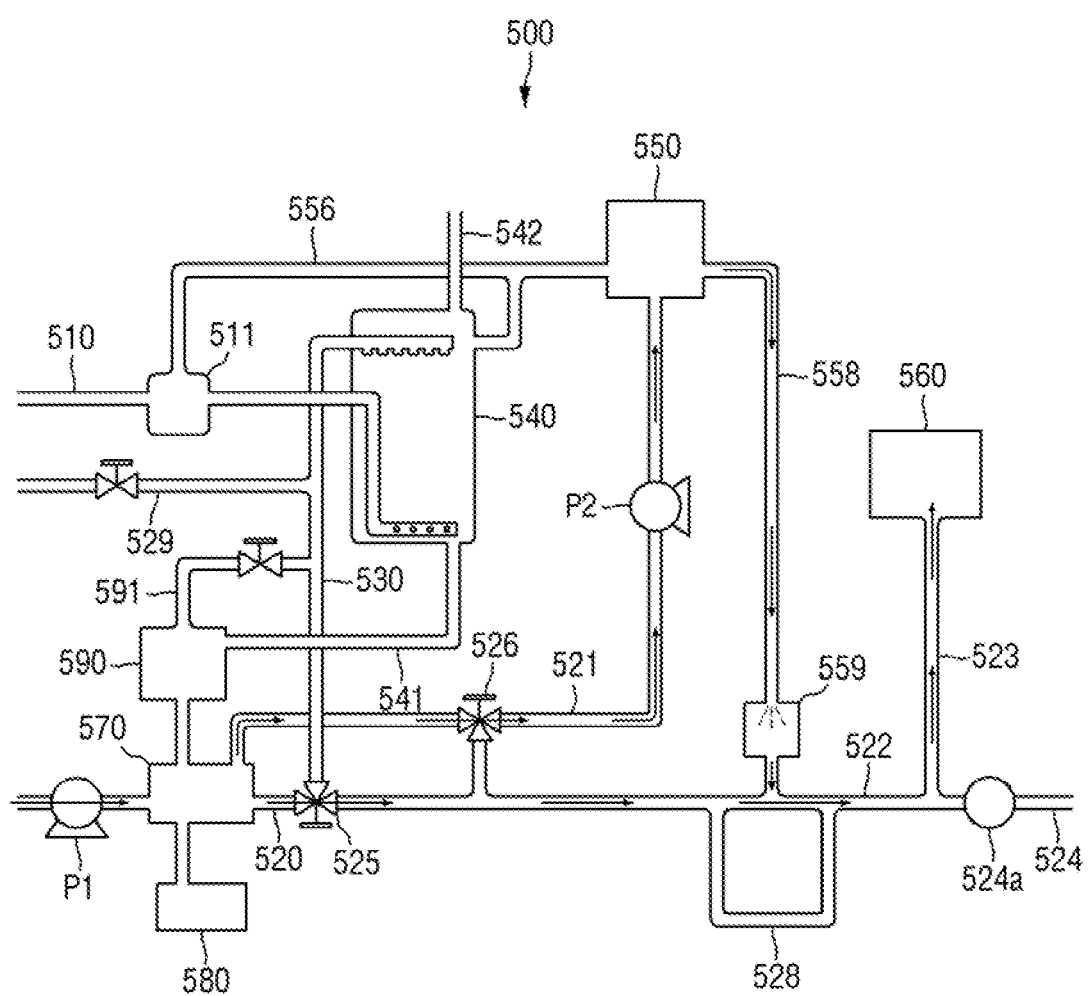
FIGS. 34 through 39 illustrate the operation of the pollutant reduction device according to the eighth embodiment of the inventive concept.
Figure 35:
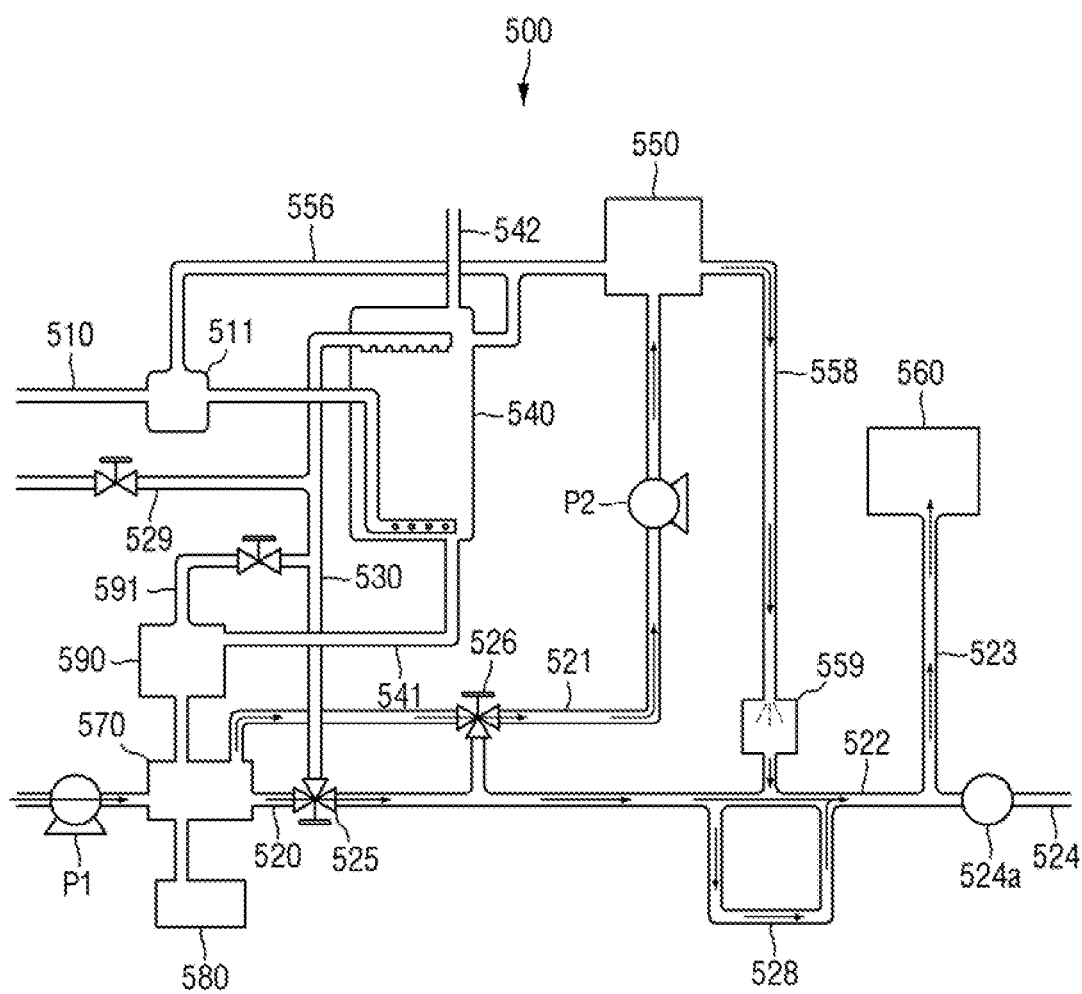

FIGS. 34 and 35 illustrate a process in which seawater introduced through the seawater supply pipe is supplied as ballast water. FIG. 34 illustrates a direct sterilization method in which a sterilizing material is injected into the entire seawater supplied as ballast water. FIG. 35 illustrates an indirect sterilization method in which a sterilizing material is injected into a portion of seawater supplied as ballast water, and the portion of the seawater is mixed with seawater supplied from the outside.

Referring to FIG. 34, as seawater supplied through the seawater supply pipe 520 passes through the filter unit 570, microorganisms having large particles are removed.

A portion of the seawater that passed through the filter unit 570 may be supplied to the purification unit 550 through the seawater inlet pipe 521 to generate a sterilizing agent, and the remaining portion of the seawater may flow along the seawater supply pipe 520 and the mixing pipe 522. The sterilizing agent generated by the purification unit 550 may be sprayed to the seawater flowing in the seawater supply pipe 520 and the mixing pipe 522 through the third injection pipe 558 and the injection unit 559. The seawater whose microorganisms have been killed by the spraying of the sterilizing agent may be supplied to the ballast water tank 560 and used as ballast water.

Referring to FIG. 35, as seawater supplied through the seawater supply pipe 520 passes through the filter unit 570, microorganisms having large particles are removed. A portion of the seawater flows along the seawater supply pipe 520, and a portion of the seawater flows along a bypass pipe 528. The seawater supply pipe 520 is a pipe to which a sterilizing agent is sprayed from the purification unit 550, and the bypass pipe 528 is a pipe through which the seawater that passes through the filter unit 570 directly flows into the ballast water tank 560.

The seawater flowing along the seawater supply pipe 520 and the seawater flowing along the bypass pipe 528 are mixed in the mixing pipe 522 and supplied to the ballast water tank 560.

As described above with reference to FIGS. 34 and 35, the pollutant reduction device 500 can treat ballast water independently without using the exhaust removal function.

A process in which the pollutant reduction device 500 operates to remove only pollutants of exhaust gas will now be described with reference to FIGS. 36 and 37.

Figure 36:
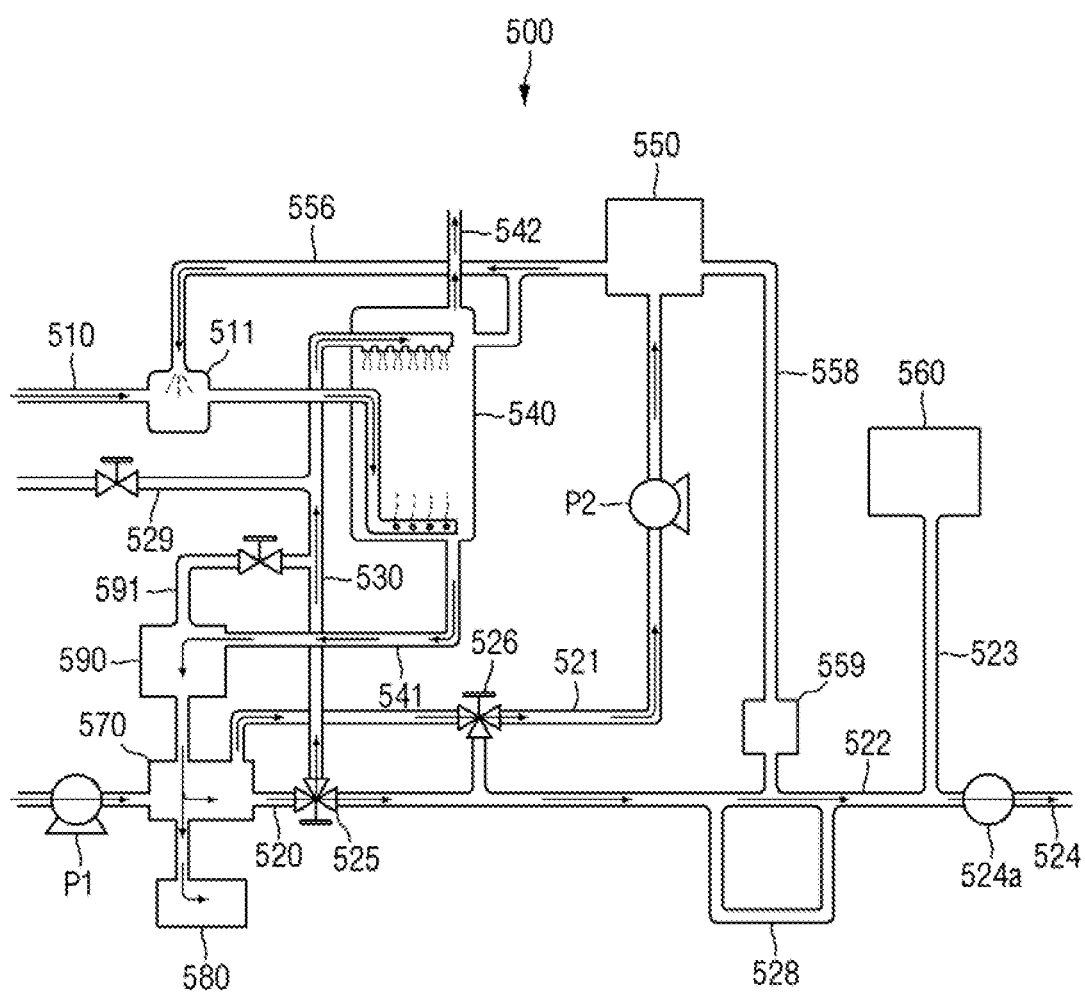

FIG. 36 illustrates a process in which seawater supplied to the seawater supply pipe is directly discharged to the outside after passing through the scrubber. FIG. 37 illustrates process in which seawater supplied to the seawater supply pipe is recirculated through the circulation pipe after passing through the scrubber.

Referring to FIG. 36, a portion of seawater introduced through the seawater supply pipe 520 is supplied to the scrubber 540 through the cleaning water supply pipe 530, and the remaining portion of the seawater is supplied to the purification unit 550 through the seawater inlet pipe 521. Exhaust gas supplied through the exhaust gas pipe 510 may be sprayed from the lower part of the scrubber 540.

The purification unit 550 may oxidize nitrogen monoxide of the exhaust gas into nitrogen dioxide by spraying an oxidizing agent generated by electrolyzing the seawater before the exhaust gas is supplied to the scrubber 540. The purification unit 550 may also spray a neutralizing agent to the seawater supply pipe 520 or the scrubber 540 in view of the pH value of cleaning water.

Since the exhaust gas can be sprayed within the cleaning water filling the lower part of the scrubber 540, pollutants such as nitrogen oxides, sulfur oxides and dust can be removed. In addition, the pollutants can be removed again by the cleaning water sprayed from the upper part of the scrubber 540.

Figure 37:
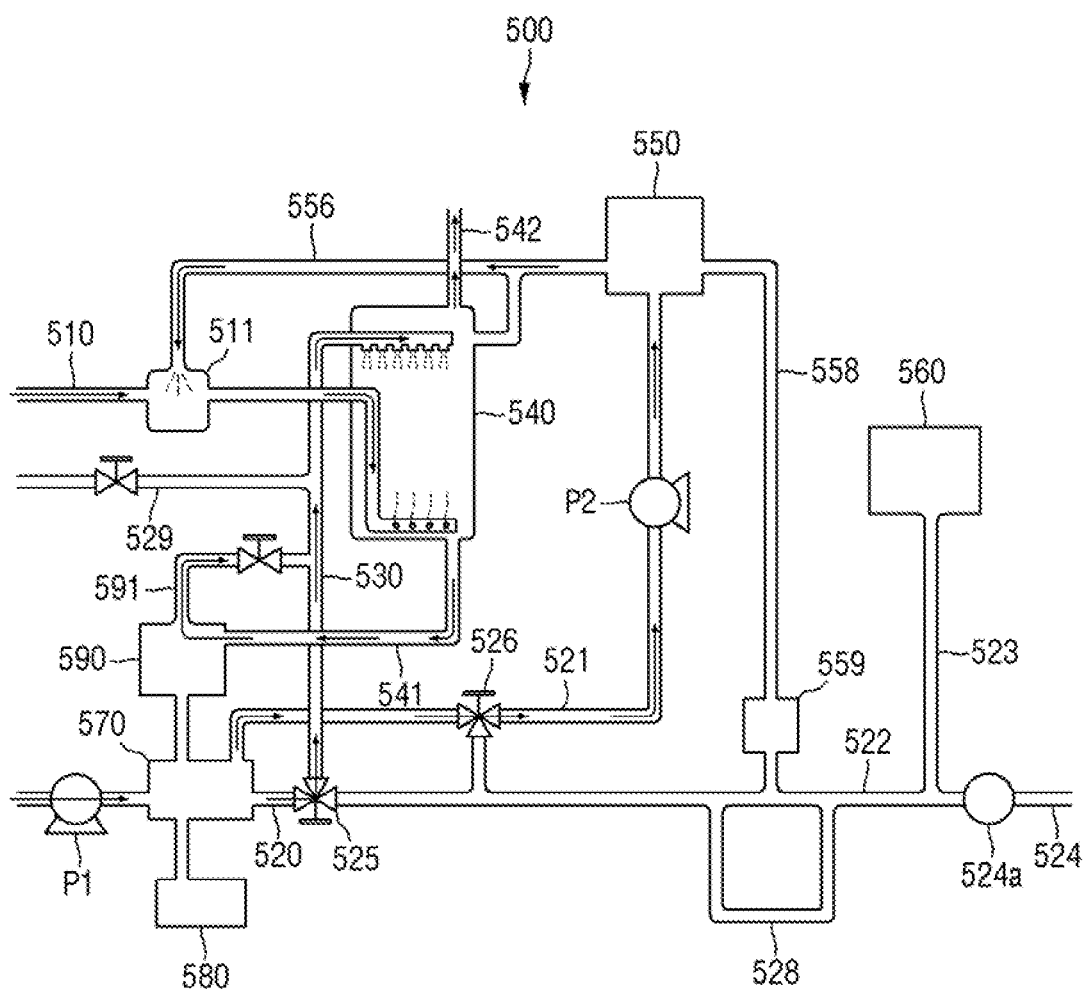

Referring to FIG. 37, a portion of seawater introduced through the seawater supply pipe 520 is supplied to the scrubber 540, and a portion of the seawater is supplied to the purification unit 550. Cleaning water discharged from the scrubber 540 to the cleaning water discharge pipe 541 is temporarily stored in the recirculation tank 590 and then circulated back to the cleaning water supply pipe 530 through the circulation pipe 591. That is, the process of FIG. 37 is substantially the same as the process of FIG. 36, except that the cleaning water is recirculated through the circulation pipe 591.

The seawater introduced through the seawater supply pipe 520 is circulated sequentially through the cleaning water supply pipe 530, the scrubber 540, the cleaning water discharge pipe 541, the recirculation tank 590 and the circulation pipe 591. The process of FIG. 36 and the process of FIG. 37 may be performed together in view of the degree of contamination of the seawater, the pH value, etc. The process of FIG. 37 may be used when the seawater cannot be discharged to the outside, for example, when the ship is passing through an area where the discharge of the seawater is limited. If the cleaning water is highly contaminated due to several recirculations of the cleaning water, it may be discharged to the outside after solid-phase particles are removed from the cleaning water by the filter unit 570. Then, new seawater may be supplied again to the scrubber 540.

The process of FIG. 36 and the process of FIG. 37 may be selectively or sequentially used as needed.

A process in which the pollutant reduction device 500 removes pollutants from exhaust gas and treats ballast water at the same time will now be described with reference to FIGS. 38 and 39.

Figure 38:
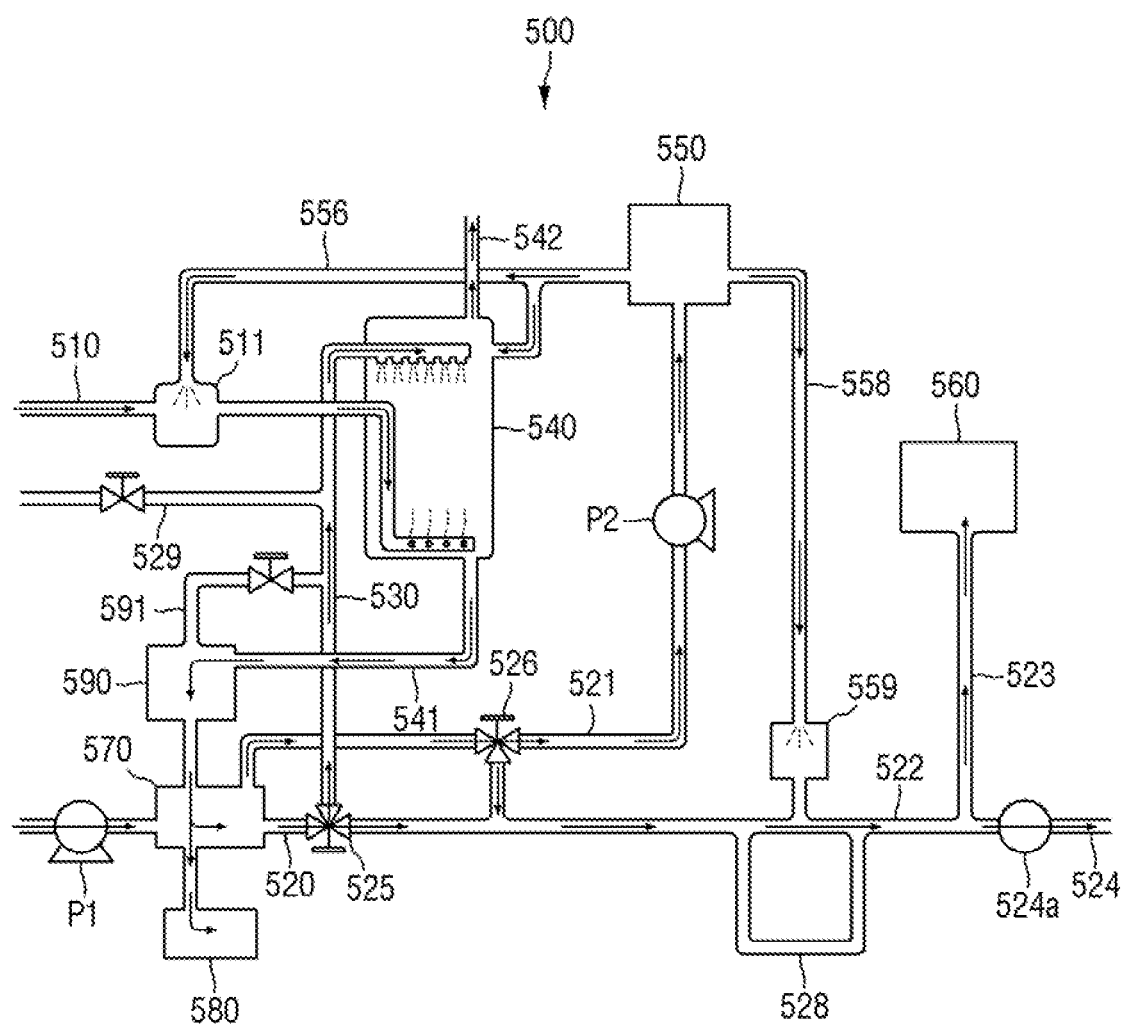

FIG. 38 illustrates an open loop type pollutant removal method and a direct sterilization type ballast water treatment process. FIG. 39 illustrates a closed loop type pollutant removal method and an indirect sterilization type ballast water treatment process.

Referring to FIG. 38, a portion of seawater introduced through the seawater supply pipe 520 is supplied to the scrubber 540 through the cleaning water supply pipe 530, and the remaining portion of the seawater is supplied to the purification unit 550 through the seawater inlet pipe 521.

Exhaust gas supplied through the exhaust gas pipe 510 may be sprayed from the lower part of the scrubber 540, and the purification unit 550 may oxidize nitrogen monoxide of the exhaust gas into nitrogen dioxide by spraying an oxidizing agent before the exhaust gas is supplied to the scrubber 540. The purification unit 550 may also spray a neutralizing agent to the scrubber 540 in view of the pH value of cleaning water.

Since the exhaust gas can be sprayed within the cleaning water filling the lower part of the scrubber 540, pollutants such as nitrogen oxides, sulfur oxides and dust can be removed. In addition, the pollutants can be removed again by the cleaning water sprayed from the upper part of the scrubber 540.

The cleaning water that passes through the scrubber 540 contains the pollutants such as the nitrogen oxides, the sulfur oxides and the dust and moves to the filter unit 570 through the cleaning water discharge pipe 541. The filter unit 570 separates pollutants such as solid-phase particles from the cleaning water and stores the separated pollutants in the sludge tank 580. The cleaning water from which the pollutants have been removed may flow to the ballast water tank 560 via the seawater supply pipe 520 and the mixing pipe 522 or may be discharged to the outside through the seawater discharge pipe 524. Here, the seawater which was introduced from the outside and has not passed through the scrubber 540 can flow to the seawater supply pipe 520 through the junction pipe 527 branching from the seawater inlet pipe 521 and can be mixed with the pollutant-free cleaning water flowing in the seawater supply pipe 520.

Meanwhile, a sterilizing agent supplied from the purification unit 550 may be injected into a mixture of the cleaning water and the seawater flowing in the seawater supply pipe 520 through the third injection pipe 558 and the injection unit 559.

Figure 39:
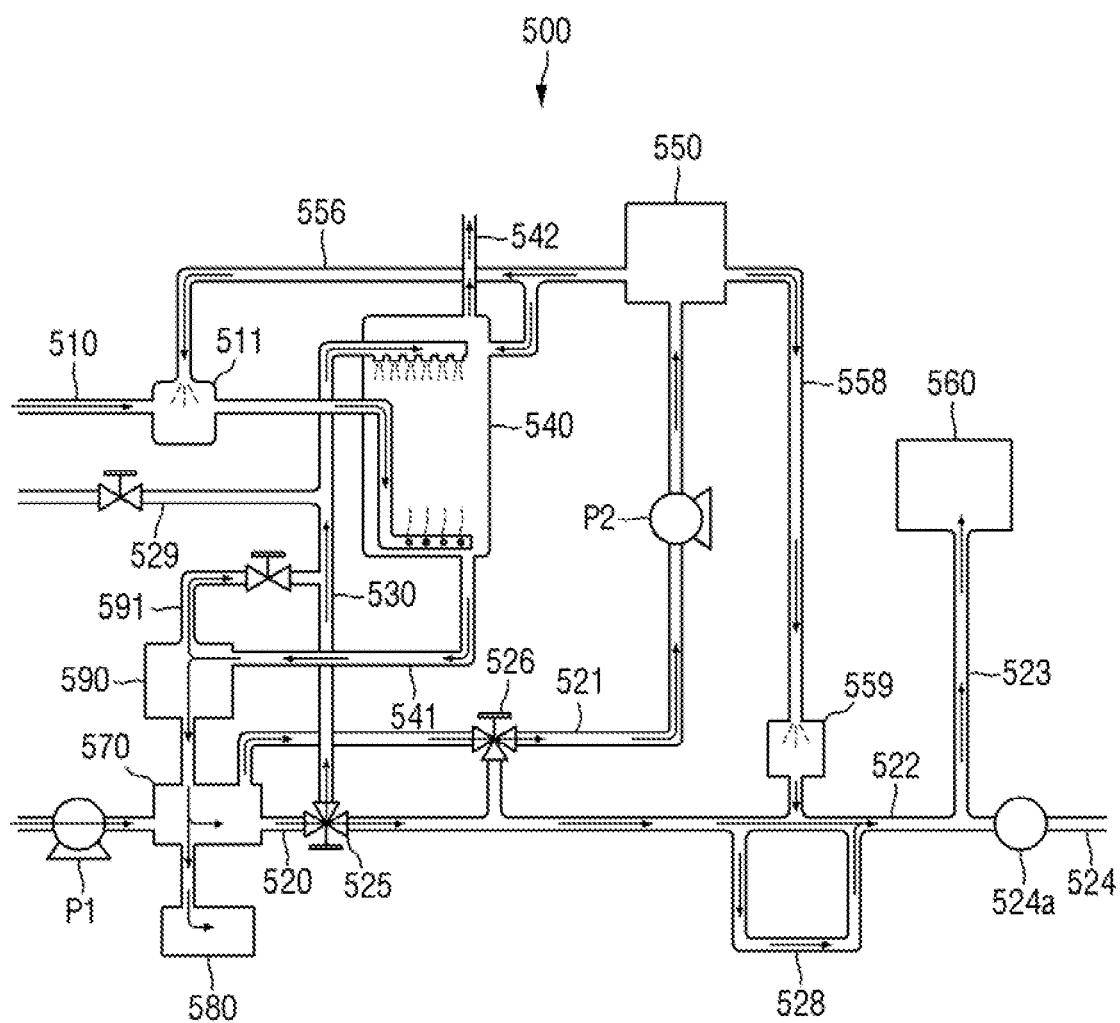

Referring to FIG. 39, a portion of seawater introduced through the seawater supply pipe 520 is supplied to the scrubber 540, and a portion of the seawater is supplied to the purification unit 550. A portion of cleaning water that passes through the scrubber 540 may be recirculated to the scrubber 540 via the recirculation tank 590, the circulation pipe 591 and the cleaning water supply pipe 530, and the remaining portion of the cleaning water may move to the filter unit 570. That is, the process of FIG. 39 is substantially the same as the process of FIG. 38, except that a portion of the cleaning water that passes through the scrubber 540 is recirculated to the scrubber 540 via the recirculation tank 590, the circulation pipe 591 and the cleaning water supply pipe 520 without being discharged to the outside through the seawater discharge pipe 524.

Meanwhile, a portion of the seawater flowing through the seawater supply pipe 520 may flow along the bypass pipe 528 and then may be mixed be the seawater into which a sterilizing agent has been injected.

The process of FIG. 38 and the process of FIG. 39 may be selectively performed in view of the amount or type of microorganisms present in the seawater, the amount of ballast water required, and the like.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

It is claimed:

1. A pollutant reduction device comprising:
   an exhaust gas pipe which discharges exhaust gas of a combustion engine;
   a cleaning water supply pipe which supplies cleaning water;
   a scrubber which sprays the cleaning water supplied through the cleaning water supply pipe to the exhaust gas introduced through the exhaust gas pipe; and
   a cleaning water discharge pipe which discharges the cleaning water inside the scrubber and supplies the cleaning water to a ballast water tank.

2. The device of claim 1, wherein a pH value of the cleaning water flowing in the cleaning water discharge pipe is lower than that of the cleaning water flowing in the cleaning water supply pipe.

3. The device of claim 1, further comprising a purification unit which is connected to the exhaust gas pipe or the scrubber to oxidize nitrogen-based oxides, neutralize acidified cleaning water, or kill microorganisms present in cleaning water.

4. The device of claim 3, further comprising a seawater supply pipe which receives seawater from the outside and supplies ballast water to the ballast water tank, wherein the cleaning water supply pipe branches from the seawater supply pipe.

5. The device of claim 4, further comprising:
   a control valve which controls the amount of seawater introduced to the scrubber through the cleaning water supply pipe; and
   a control unit which controls the control valve according to the concentration or the degree of contamination of the exhaust gas or the pH value of the cleaning water that passes through the scrubber.

6. The device of claim 5, wherein the concentration or the degree of contamination of the exhaust gas is determined based on the amount of at least one of sulfur oxides and nitrogen oxides in the exhaust gas.

7. The device of claim 5, wherein the control valve comprises a three-way valve which connects the seawater supply pipe and the cleaning water supply pipe and adjusts the amount or proportion of seawater supplied to the cleaning water supply pipe.

8. The device of claim 1, further comprising a circulation pipe which connects the cleaning water discharge pipe and the cleaning water supply pipe, wherein the cleaning water discharged through the cleaning water discharge pipe is recirculated to the cleaning water supply pipe through the circulation pipe.

9. The device of claim 8, further comprising:
   a recirculation tank which is disposed between the cleaning water discharge pipe and the circulation pipe;
   a filter unit which is connected to the recirculation tank and separates sold-phase particles from the discharged cleaning water; and
   a sludge tank which is connected to the filter unit and in which the solid-phase particles filtered out by the filter unit are collected.

10. The device of claim 3, wherein the purification unit is connected to the exhaust gas pipe, the seawater supply pipe or the scrubber to supply an oxidizing agent for oxidizing nitrogen-based oxides, a neutralizing agent for neutralizing acidified cleaning water, or a sterilizing agent for killing microorganisms present in seawater by electrolyzing seawater.

11. The device of claim 10, wherein the oxidizing agent is sodium hypochlorite or hypochlorous acid produced by the electrolysis of the seawater, the sterilizing agent is sodium hypochlorite or hypochlorous acid produced by the electrolysis of the seawater or nitric acid and sulfuric acid produced by the reaction of the sodium hypochlorite or the hypochlorous acid with the exhaust gas and the seawater, and the neutralizing agent is sodium hypochlorite produced by the electrolysis of the seawater or a diluted solution of the sodium hypochlorite.

12. The device of claim 1, further comprising a plasma purification unit which is connected to the exhaust gas pipe, performs pulse corona discharge to oxide the exhaust gas, and generates ozone and oxidative radicals to sterilize the cleaning water.

13. The device of claim 12, wherein the plasma purification unit comprises a reaction module comprising a first electrode which is shaped like a container or a pair of plates disposed parallel to each other and second electrodes which are shaped like wires, arranged at intervals inside the first electrode or between the plates of the first electrode, and extend in a direction perpendicular to a direction of flow of the exhaust gas.

14. The device of claim 12, further comprising a neutralizing agent supply unit which supplies a neutralizing agent to the scrubber or a rear part of a mixing pipe.

* * * * *

UNITED STATES PATENT AND TRADEMARK OFFICE
CERTIFICATE OF CORRECTION

PATENT NO. : 10,618,622 B2  
APPLICATION NO. : 15/555443  
DATED : April 14, 2020  
INVENTOR(S) : Lee et al.

Page 1 of 2

It is certified that error appears in the above-identified patent and that said Letters Patent is hereby corrected as shown below:

In the Specification

Column 1 Line 53: add --in-- after the word "provided";  
Column 2 Line 1: add the words --with seawater,-- after the word "contact";  
Column 4 Line 15: add the words --to a fourth-- after the word "according";  
Column 4 Line 65: add --a-- before the word "pollutant";  
Column 4 Line 66: add the word --the-- after "of";  
Column 5 Line 2: replace the word "lave" with --inventive--;  
Column 5 Line 4: replace the word "invention" with --inventive--;  
Column 10 Line 8: add the word --concept-- after the word "inventive";  
Column 11 Line 30: add --G1-- after the word "gas";  
Column 12 Line 58: add --G1-- after the word "gas";  
Column 13 Line 62: replace the word "be" with --the--;  
Column 14 Line 49: add --(nitrogen-- after the word "pollutants";  
Column 15 Line 40: replace "40" with --240--;  
Column 15 Line 41: add the word --come-- after the word "water";  
Column 18 Line 4: replace the word "law" with --low--  
Column 18 Line 19: add --. If-- before the words "the concentration";  
Column 22 Line 55: replace "f game" with --formed--;  
Column 23 Line 30: replace "H" with --pH--;  
Column 25 Line 13: add the word --unit-- after the word "purification";  
Column 25 Line 23: replace "s" with --is--;  
Column 27 Line 52: add --(c)-- after "and";  
Column 28 Line 3: add --(a)).-- after "operation";  
Column 30 Line 67: replace "frog" with --from--;  
Column 33 Line 21: replace "be" with --to the--;  
Column 36 Line 2: replace "apply" with --supply--;  
Column 36 Line 3: replace "argent" with --agent--;  
Column 36 Line 42: replace "stay" with --may--;  
Column 38 Line 33: add --. In-- after "440";

Signed and Sealed this  
Fourteenth Day of July, 2020

Andrei Iancu  
*Director of the United States Patent and Trademark Office*

Column 39 Line 20: add --water-- before "treatment";
Column 40 Line 3: replace "n" with --in--;
Column 42 Line 6: replace "ode" with --electrode--;
Column 43 Line 3: replace "c" with --to--;
Column 43 Line 57: replace "be" with --the--;
Column 43 Line 66: replace "e" with --or the--;
Column 46 Line 61: replace "be" with the word --with-- (Second Occurrence).